US010795117B2

(12) United States Patent
Nagaoka et al.

(10) Patent No.: US 10,795,117 B2
(45) Date of Patent: Oct. 6, 2020

(54) LENS BARREL AND CAMERA BODY

(71) Applicant: NIKON CORPORATION, Tokyo (JP)

(72) Inventors: Koji Nagaoka, Tokyo (JP); Kunihiko Shimizu, Tokyo (JP); Teppei Okuyama, Tokyo (JP); Noriyasu Kotani, Tokyo (JP); Hisanori Togawa, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 347 days.

(21) Appl. No.: 15/769,081

(22) PCT Filed: Oct. 24, 2016

(86) PCT No.: PCT/JP2016/081411
§ 371 (c)(1),
(2) Date: Jul. 11, 2018

(87) PCT Pub. No.: WO2017/069283
PCT Pub. Date: Apr. 27, 2017

(65) Prior Publication Data
US 2018/0307004 A1    Oct. 25, 2018

(30) Foreign Application Priority Data

Oct. 22, 2015 (JP) ................................. 2015-207790

(51) Int. Cl.
*G02B 7/02* (2006.01)
*G02B 7/16* (2006.01)
(Continued)

(52) U.S. Cl.
CPC ............... *G02B 7/16* (2013.01); *G02B 7/021* (2013.01); *G02B 7/102* (2013.01); *G02B 27/646* (2013.01);
(Continued)

(58) Field of Classification Search
CPC ........................................................ G02B 7/16
(Continued)

(56) References Cited

U.S. PATENT DOCUMENTS

2013/0176629 A1   7/2013 Nakayama et al.
2015/0212337 A1   7/2015 Nomura et al.
2016/0341974 A1*  11/2016 Kishine .................. G03B 43/00

FOREIGN PATENT DOCUMENTS

JP    2011-048186 A    3/2011
JP    2013-140285 A    7/2013
(Continued)

OTHER PUBLICATIONS

Jan. 17, 2017 International Search Report issued in International Patent Application No. PCT/JP2016/081411.
(Continued)

*Primary Examiner* — James C. Jones
(74) *Attorney, Agent, or Firm* — Oliff PLC

(57) ABSTRACT

A lens barrel is removeably attachable to an image pickup unit, wherein a large amount of shake can be corrected. This lens barrel includes a mounting part that is removeably attachable to an image pickup unit, including: an image forming optical system that forms a subject image for the image pickup unit; a support unit that supports at least a portion of the image forming optical system; and a fixed unit that is disposed outside of the support unit and that is fixed to the mounting unit. The support part is relatively rotatable and moveable with respect to the fixed unit, about at least two axes which are substantially orthogonal to the light axis of the image forming optical system.

25 Claims, 33 Drawing Sheets

(51) Int. Cl.
   *G03B 5/00*    (2006.01)
   *G03B 17/14*   (2006.01)
   *G03B 17/56*   (2006.01)
   *G02B 27/64*   (2006.01)
   *H04N 5/232*   (2006.01)
   *G02B 7/10*    (2006.01)
   *H04N 5/225*   (2006.01)

(52) U.S. Cl.
   CPC ............. *G03B 5/00* (2013.01); *G03B 17/14* (2013.01); *G03B 17/565* (2013.01); *H04N 5/2254* (2013.01); *H04N 5/23264* (2013.01); *H04N 5/23287* (2013.01); *G03B 2205/0007* (2013.01); *G03B 2206/00* (2013.01); *G03B 2217/005* (2013.01)

(58) Field of Classification Search
   USPC ......................................................... 359/819
   See application file for complete search history.

(56) References Cited

FOREIGN PATENT DOCUMENTS

| | | |
|---|---|---|
| JP | 2013-174639 A | 9/2013 |
| JP | 2015-121755 A | 7/2015 |
| JP | 2015-179231 A | 10/2015 |
| WO | 2015/093083 A1 | 6/2015 |

OTHER PUBLICATIONS

Oct. 29, 2019 Office Action issued in Japanese Patent Application No. 2015-207790.

\* cited by examiner

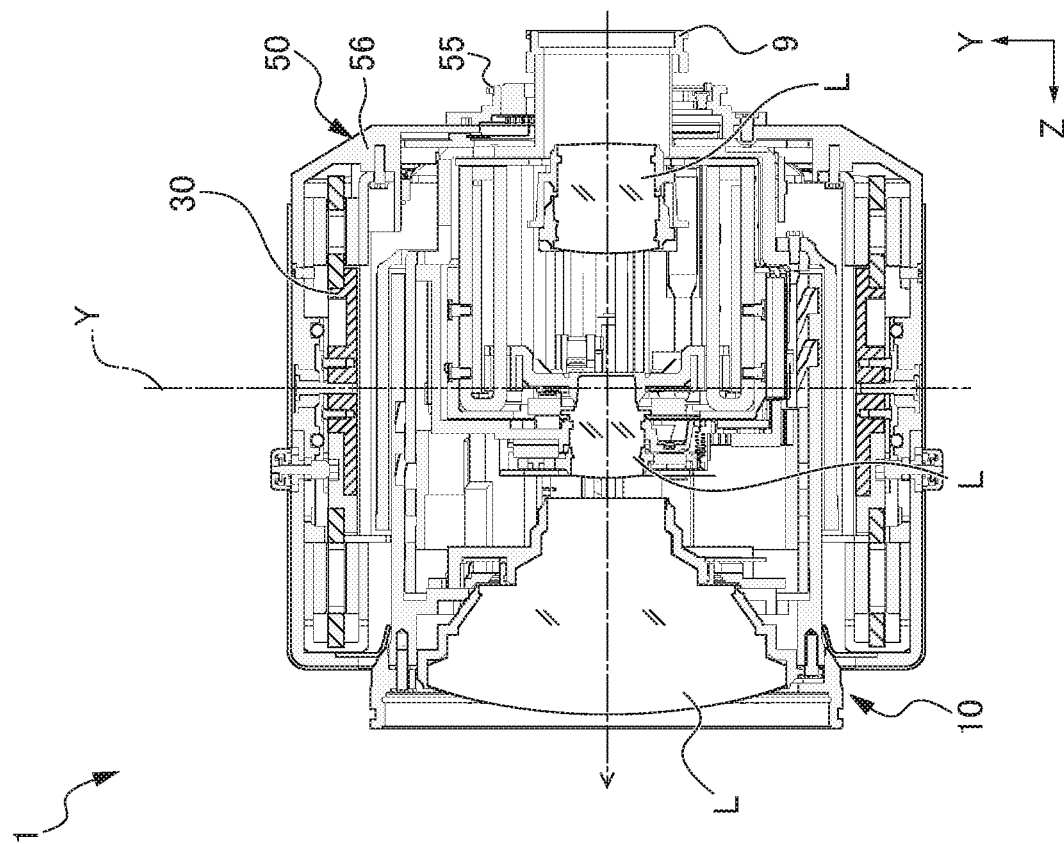
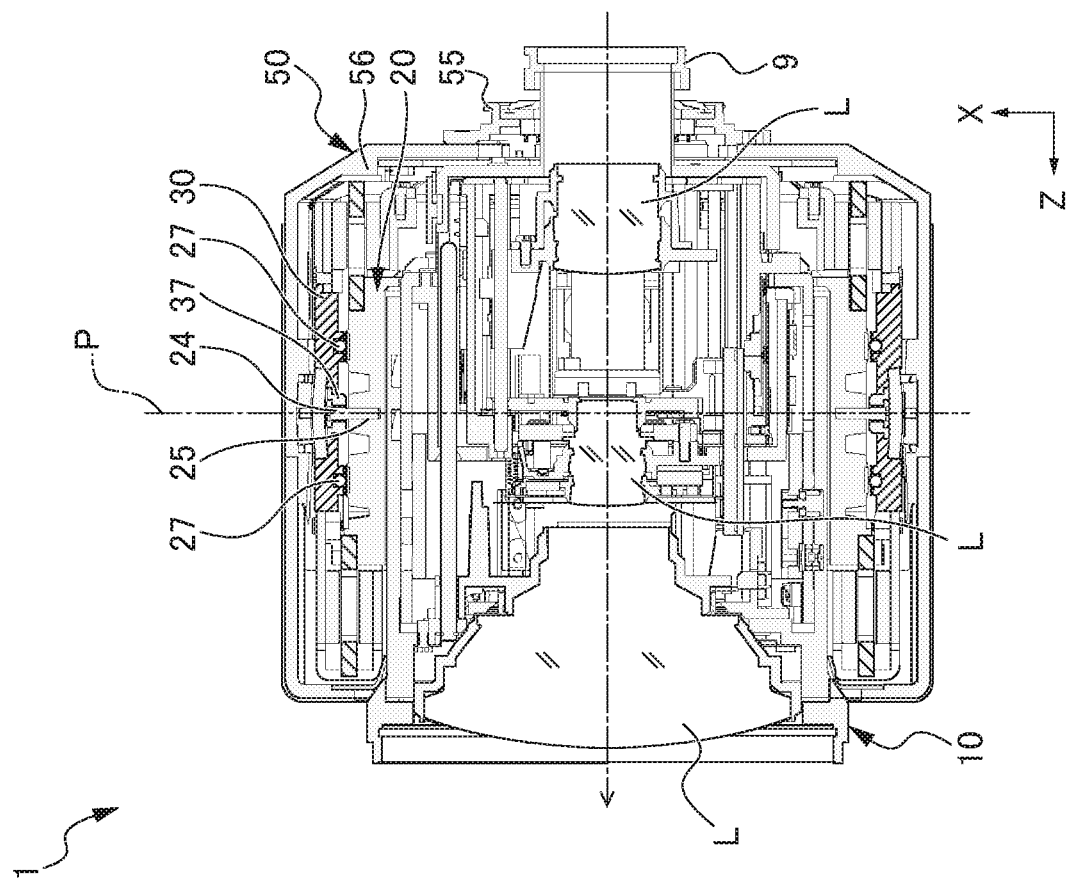

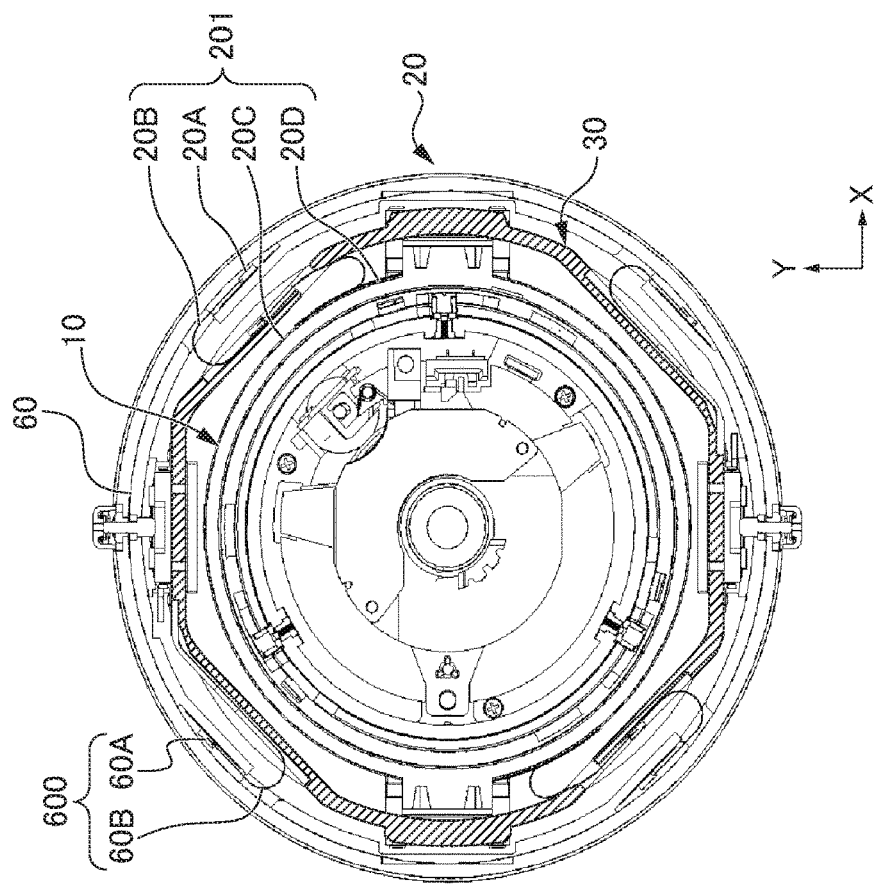
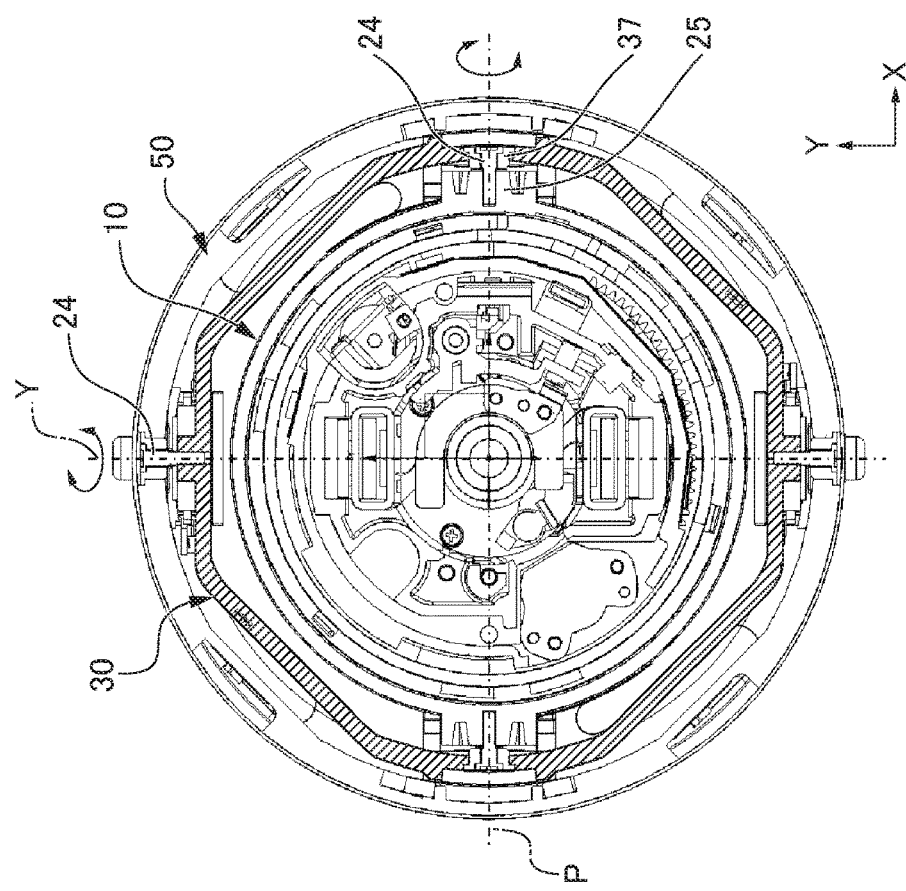
FIG. 5A
FIG. 5B

FIG. 6
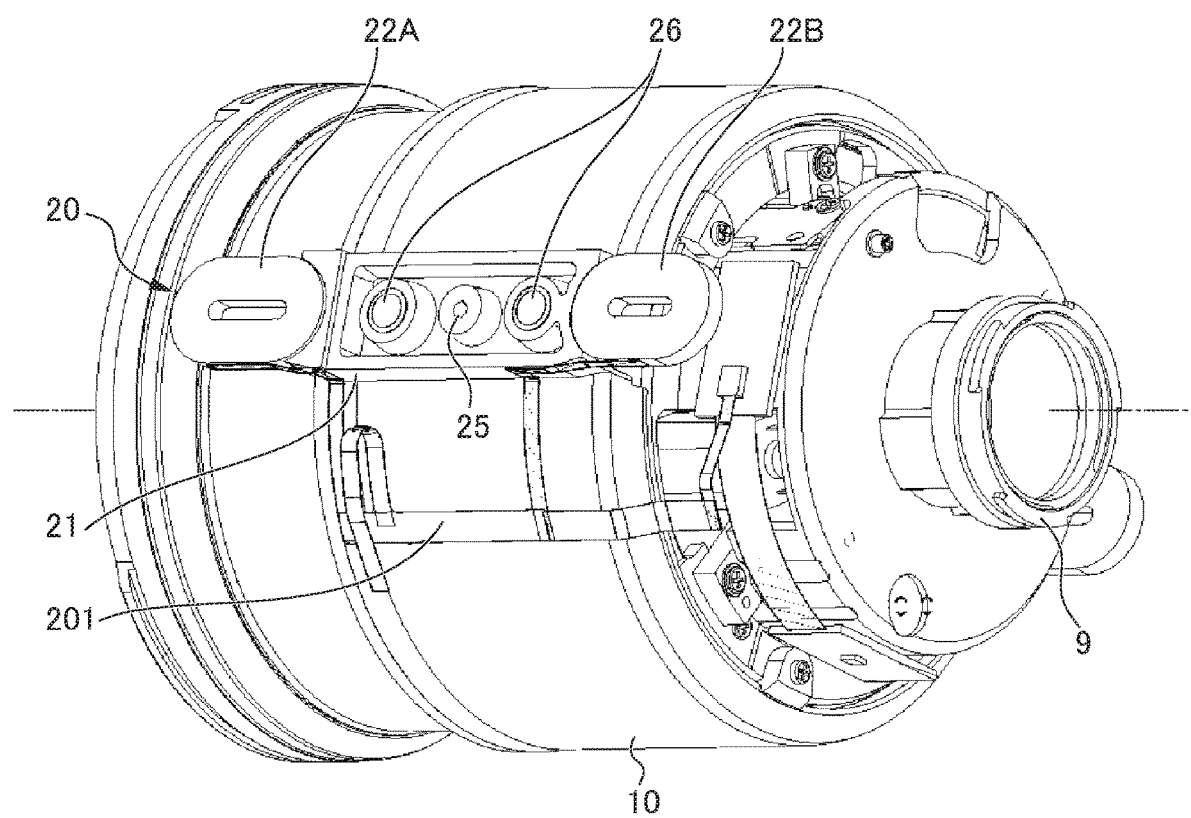
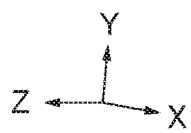

FIG. 11
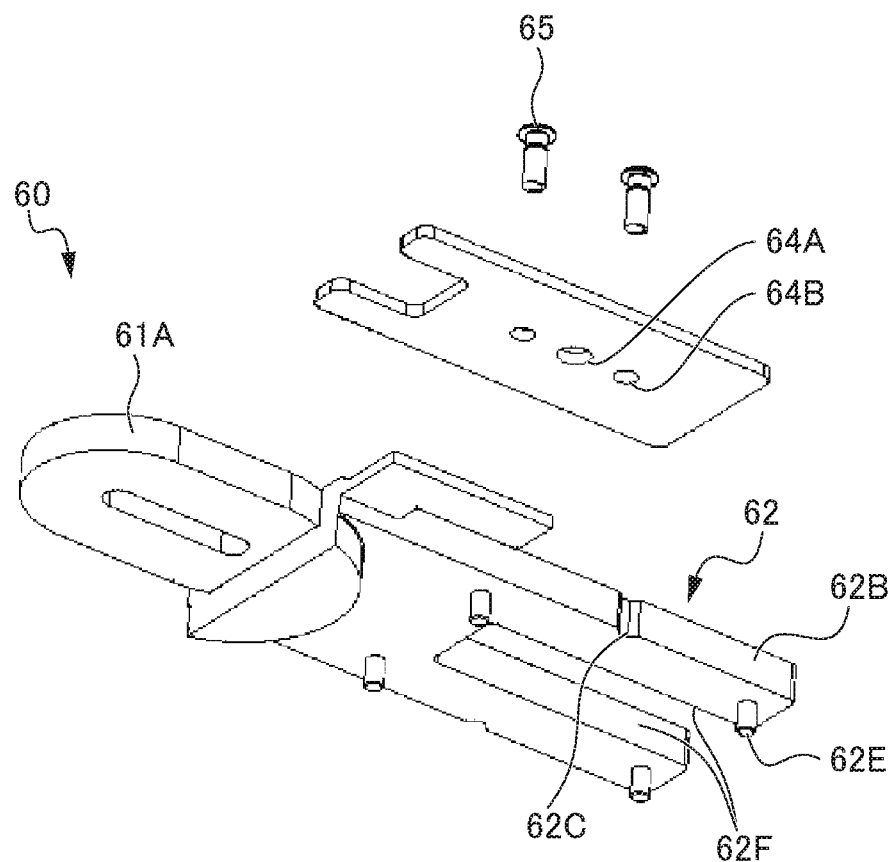
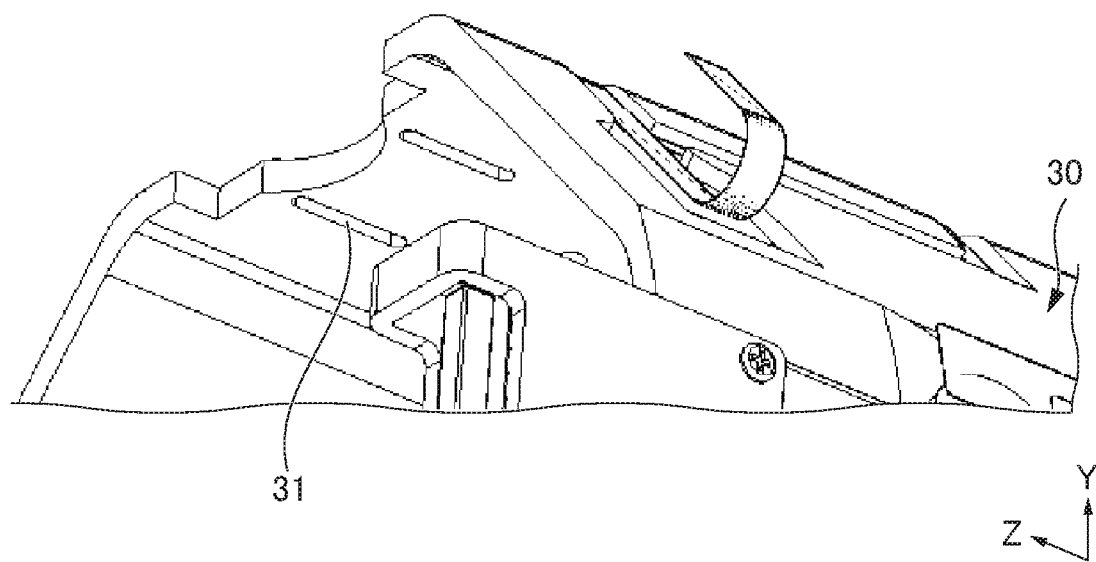

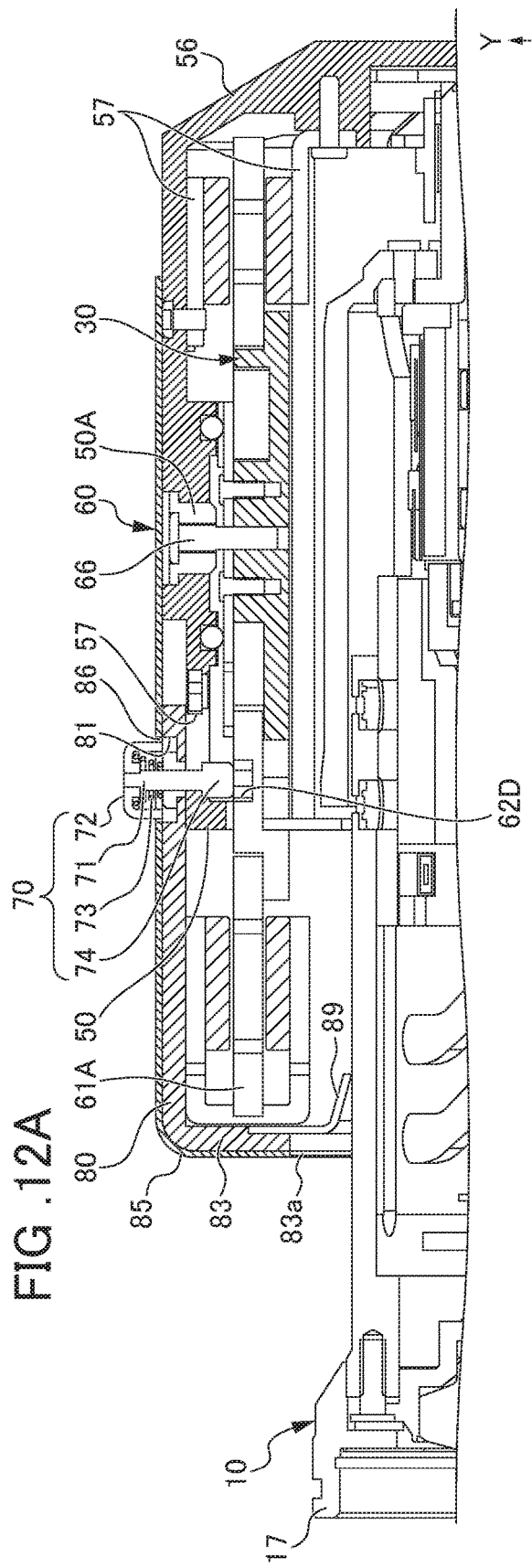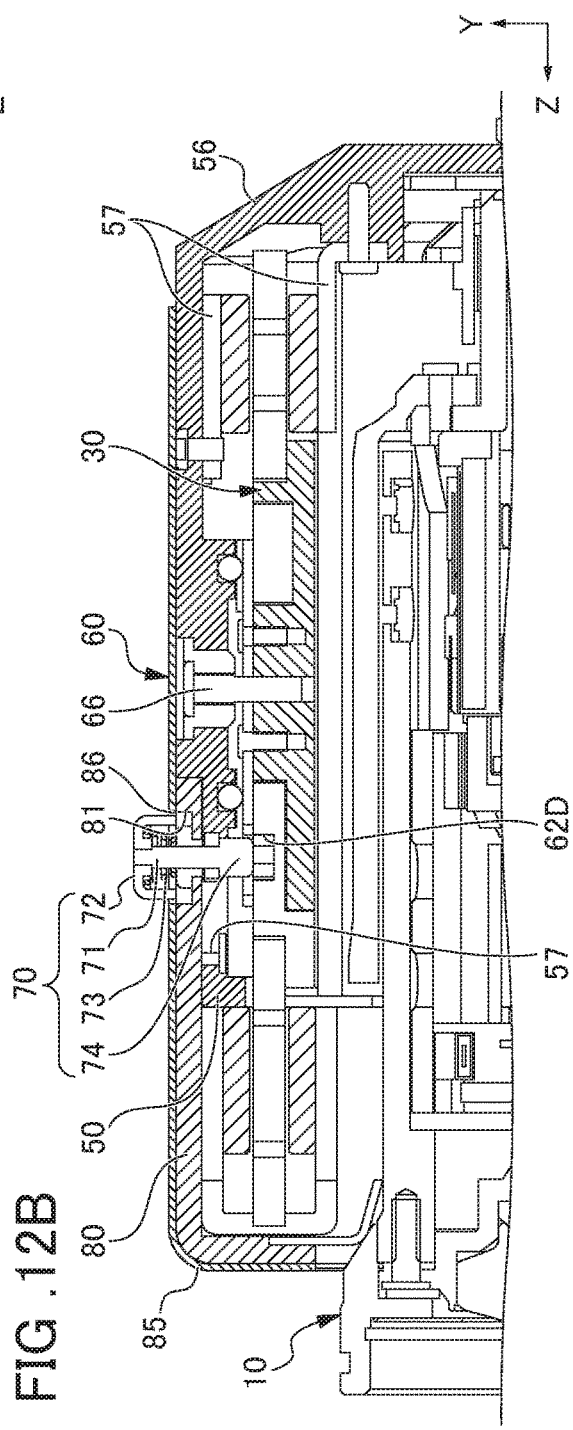

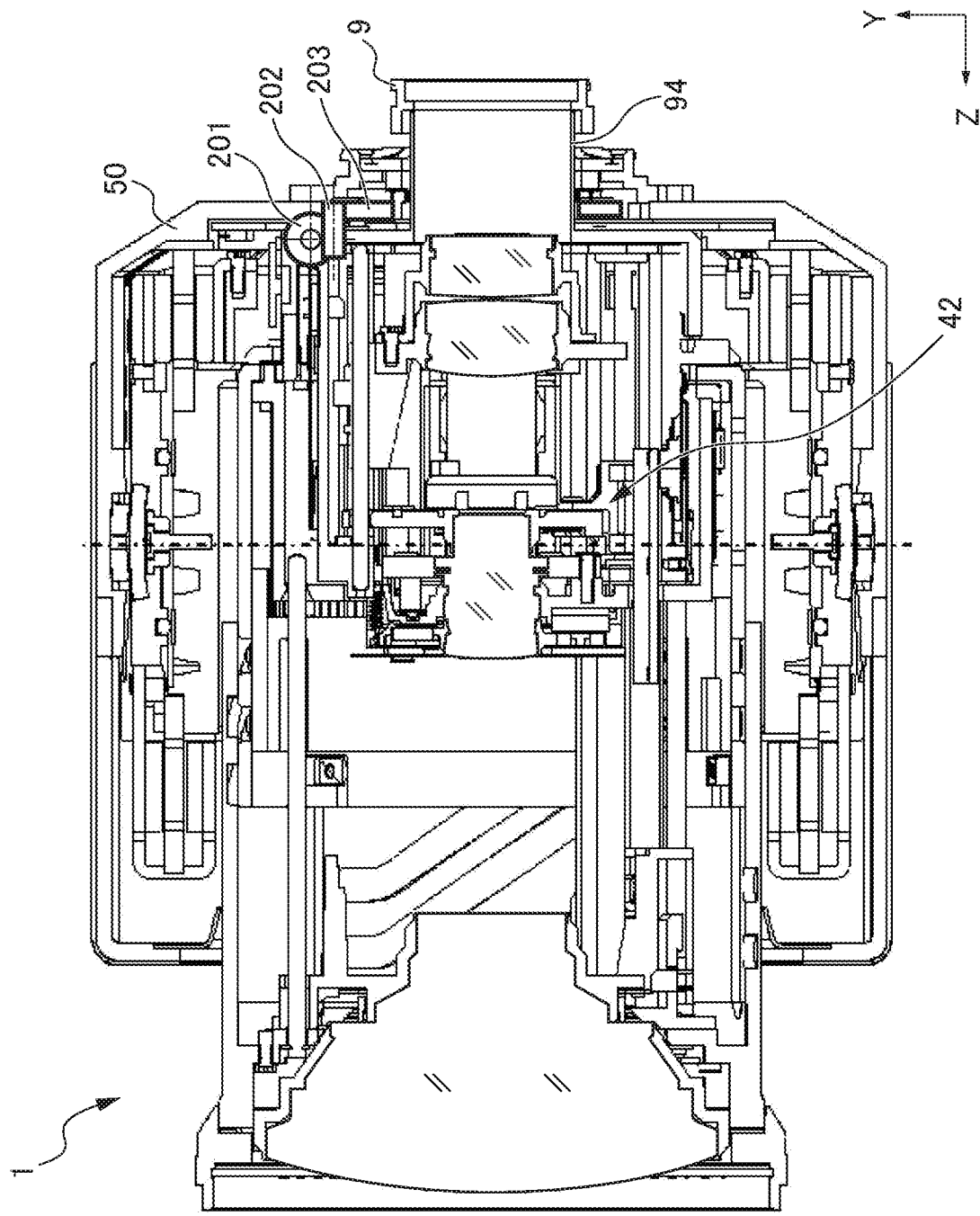

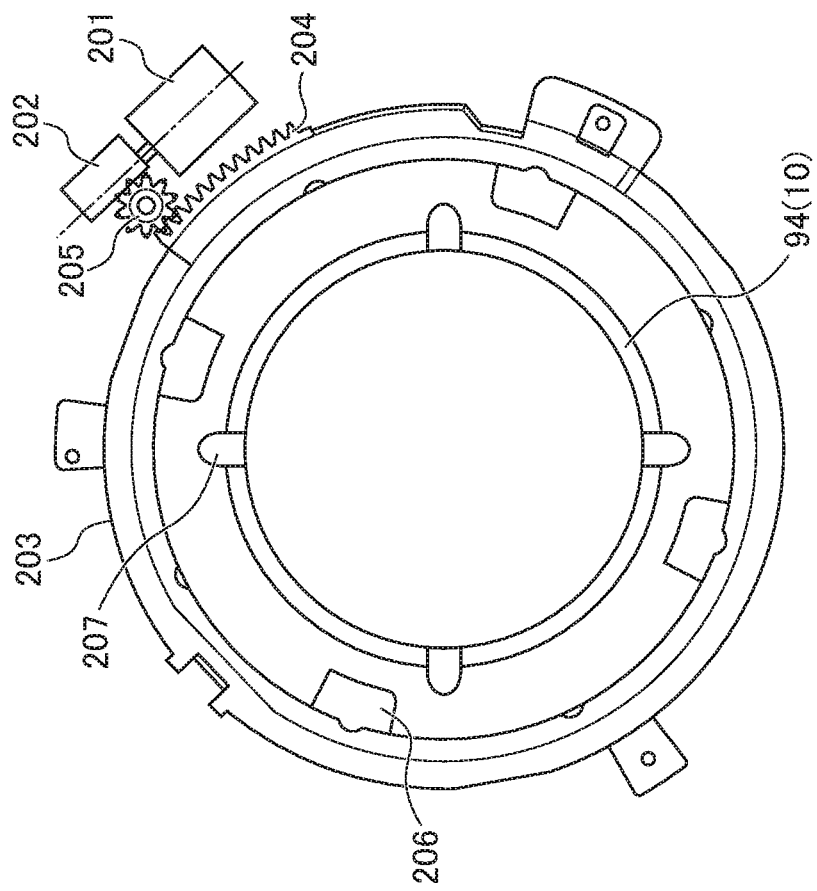
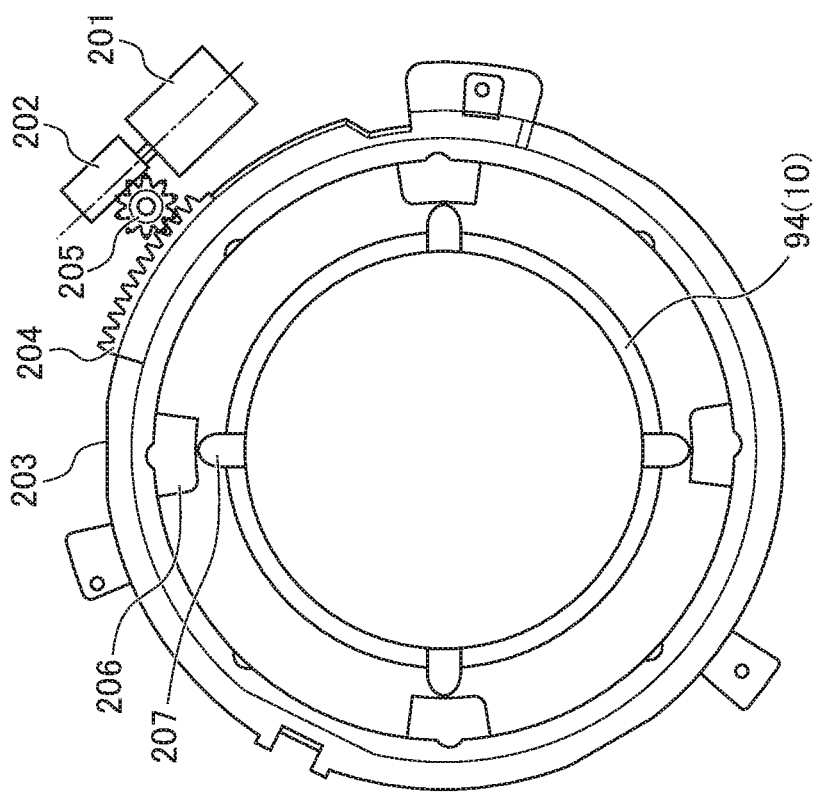

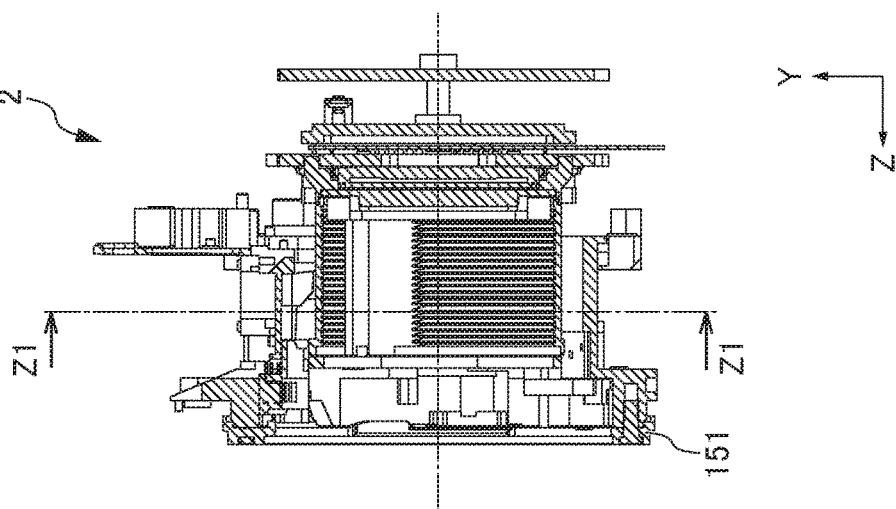
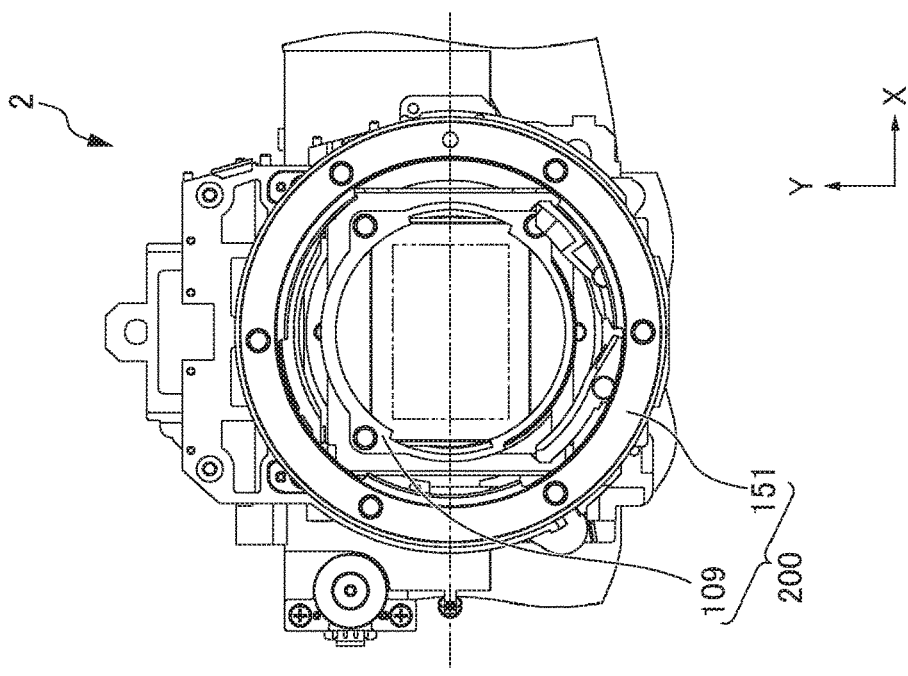
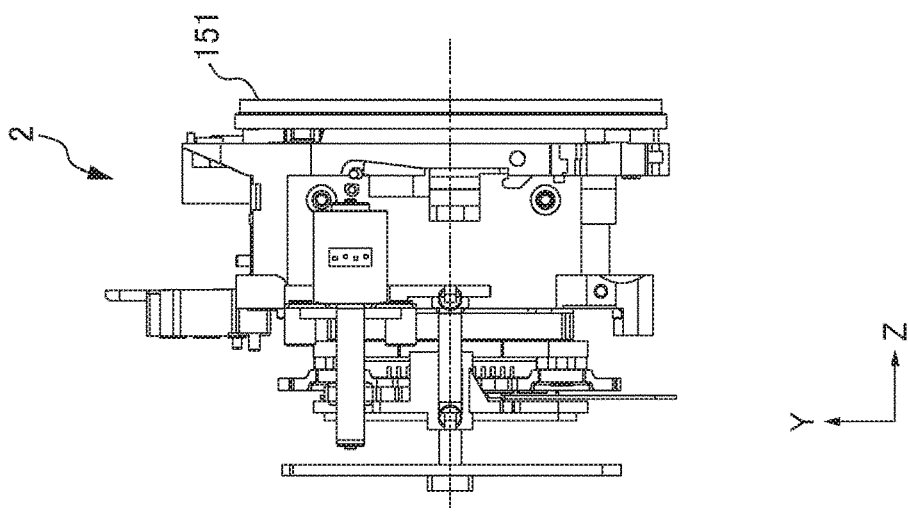

LENS BARREL AND CAMERA BODY

TECHNICAL FIELD

The present invention relates to a lens barrel and a camera body.

BACKGROUND ART

Heretofore, in order to correct shake over a wide range of shake correction angles in an imaging device capable of capturing images, a shake correction mechanism is provided with two driving units that have support axes orthogonal to a light axis and that are capable of swinging a lens barrel that is integral with an image pickup unit relative to an outer frame of the imaging device (see Patent Document 1).

However, in Patent Document 1, the lens barrel and the image pickup unit are integral. Patent Document 1 cannot be applied to a lens barrel that is removeably attachable to an image pickup unit.

Patent Document 1: Japanese Unexamined Patent Application, Publication No. 2013-140285

Effects of the Invention

One embodiment of the invention is a camera body to which a lens barrel is removeably attachable, the camera body including: a first casing that includes a first connecting part that is to be connected with a first tube of the lens barrel; a second casing that includes an imaging element and a second connecting part that is to be connected with a second tube of the lens barrel; and a switching unit that switches a movement range of the second casing relative to the first casing between a first range state and a second range state.

Another embodiment of the invention is a lens barrel including a mounting unit that is removeably attachable to an image pickup unit, the lens barrel including: an image forming optical system that forms a subject image for the image pickup unit; a support unit that supports at least a portion of the image forming optical system; and a fixed unit that is disposed at an outer side of the support unit and is fixed to the mounting unit, wherein the support unit is relatively moveable by rotation with respect to the fixed unit about at least two axes that are substantially orthogonal to a light axis of the image forming optical system.

Still another embodiment of the invention is a camera body including: an inner mounting unit to which at least a portion of a lens barrel is removeably attachable, the lens barrel including an image forming optical system; an image pickup unit that images a subject image formed by the image forming optical system; and a body fixed unit disposed at an outer side of the image pickup unit, wherein the image pickup unit is relatively moveable together with the inner mounting unit with respect to the body fixed unit about at least two axes that are substantially orthogonal to a light axis of the image forming optical system.

The structures described above may be appropriately modified, and one or more portions thereof may be replaced with alternative structures.

BRIEF DESCRIPTION OF THE DRAWINGS

FIG. 3A and FIG. 3B are sectional views cut along a light axis Z in a retracted state of the lens barrel 1. FIG. 3A is an X-Z sectional view (a sectional view through which a pitch axis P passes). FIG. 3B is a Y-Z sectional view (a sectional view through which a yaw axis Y passes).

FIG. 4A is an X-Z sectional view (a sectional view through which the pitch axis P passes). FIG. 4B is a Y-Z sectional view (a sectional view through which the yaw axis Y passes).

FIG. 5A and FIG. 5B are sectional views of the lens barrel 1. FIG. 5A is an X-Y sectional view through which the pitch axis P and the yaw axis Y pass. FIG. 5B is an X-Y sectional view through which a push button 70 passes.

FIG. 6 is a perspective view of a second casing 10 depicting a portion of a pitch driving unit 20.

FIG. 11 is an exploded view of the yaw driving unit 60 seen in a diagonal direction from an inner side.

FIG. 12A and FIG. 12B are partial sectional views depicting portions of the push button 70 of the lens barrel 1. FIG. 12A illustrates the extended state of the lens barrel 1. FIG. 12B illustrates the retracted state of the lens barrel 1.

FIG. 13A is a diagram in which a position of the push button 70 when a slider unit 62 is extended is seen from an inner side of the fixed tube 50. FIG. 13B is a diagram in which the position of the push button 70 when the slider unit 62 is extended is seen from an outer side of the fixed tube 50. FIG. 13C is a diagram in which a position of the push button 70 when the slider unit 62 is contracted is seen from the inner side of the fixed tube 50. FIG. 13D is a diagram in which the position of the push button 70 when the slider unit 62 is contracted is seen from the outer side of the fixed tube 50.

FIG. 19 is a diagram illustrating a variant example in which a support unit 40 at the lens barrel 1 side is completely fixed to the fixed tube 50.

FIG. 20A and FIG. 20B are diagrams describing lock states of the support unit 40 to the fixed tube 50. FIG. 20A illustrates a locked state and FIG. 20B illustrates an unlocked state.

FIG. 22A is a side view illustrating the interior of the camera body 2 according to the present embodiment. FIG. 22B is a front view illustrating the interior of the camera body 2 according to the present embodiment. FIG. 22C is a sectional view illustrating the interior of the camera body 2 according to the present embodiment.

FIG. 22B is a sectional view taken along line Z1-Z1 in FIG. 22C.

FIG. 25A illustrates a state in which the body inner shell 110 and a body outer shell 150 are locked. FIG. 25B illustrates a state in which the body inner shell 110 and the body outer shell 150 are unlocked.

FIG. 26A is viewed from a side of the lens side mount at which the camera body 2 is to be disposed. FIG. 26B is viewed in a diagonal direction from the side at which the camera body 2 is to be disposed.

PREFERRED MODE FOR CARRYING OUT THE INVENTION

Figure 1:
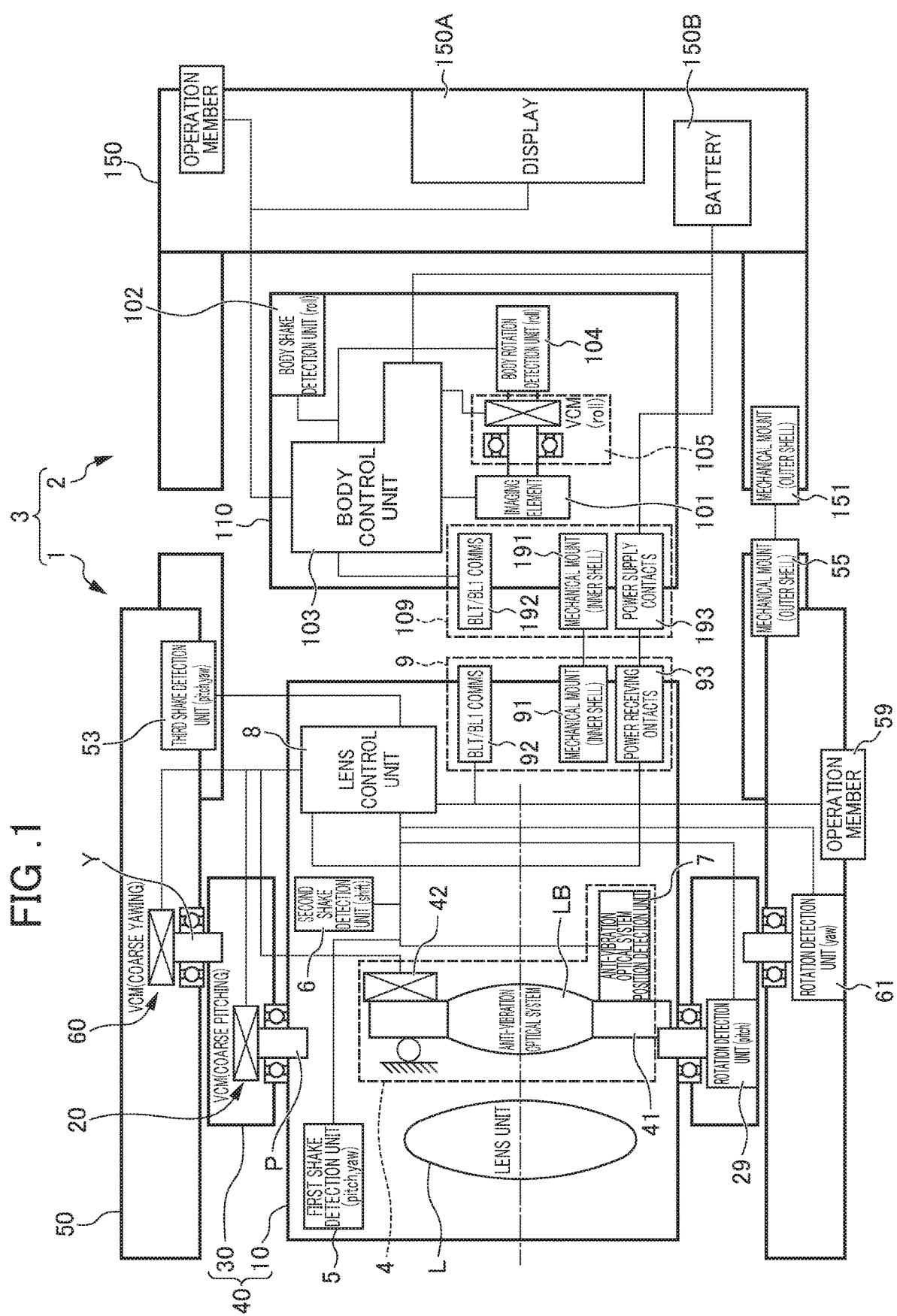
FIG. 1 is a system schematic diagram of a camera system 3 equipped with a lens barrel 1 and camera body 2 according to an embodiment.

Herebelow, an embodiment of the present invention is described with reference to the attached drawings and the like.

An XYZ orthogonal coordinate system is provided in the drawings described below, in order to facilitate descriptions and comprehension.

In this coordinate system, in a position of a camera body 2 when a lens barrel 1 is mounted to the camera body 2 and a photographer captures an image in landscape orientation with a light axis horizontal (below referred to as "the normal position"), a direction toward the right side as seen by the photographer is referred to as the +X direction.

The direction toward the upper side in the normal position is referred to as the +Y direction.

The direction toward the imaging subject in the normal position is referred to as the +Z direction (the light axis direction).

In the descriptions below, the terms pitch axis P and yaw axis Y are used as appropriate in order to facilitate comprehension. In the embodiments, the pitch axis P is in the same direction as the X axis, the yaw axis Y is in the same direction as the Y axis, and the pitch axis P and yaw axis Y are orthogonal to one another. The meaning of the term "orthogonal" is not strictly limited to 90° but encompasses a range of slight offsets from 90° caused by fabrication errors, assembly errors and the like.

Rotation about the pitch axis P is referred to as pitching, rotation about the yaw axis Y is referred to as yawing, a direction of pitching is referred to as the pitch direction, and a direction of yawing is referred to as the yaw direction.

First Embodiment

FIG. 1 is a system schematic diagram of a camera system 3 equipped with the lens barrel 1 and camera body 2 according to this embodiment.

Figure 2:
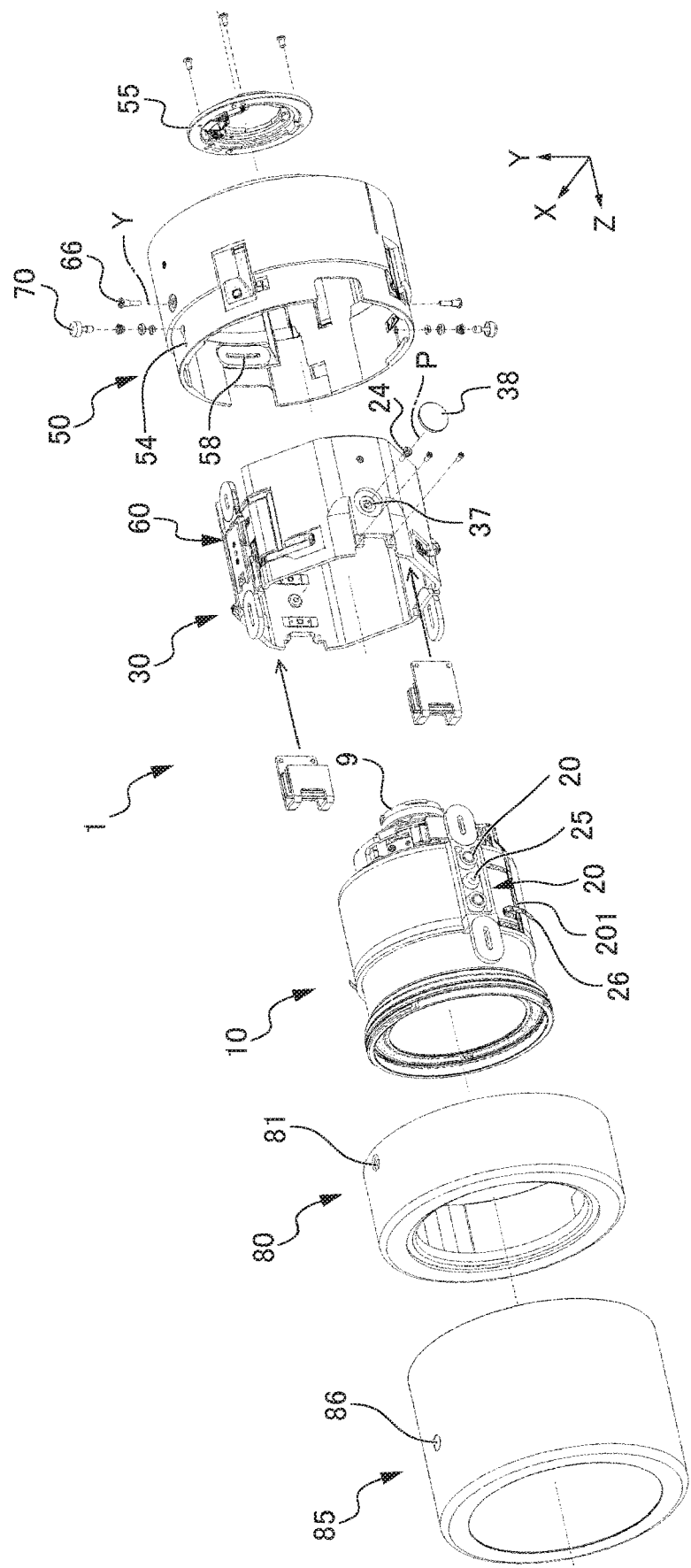
FIG. 2 is an exploded view of the lens barrel 1.

FIG. 2 is an exploded view of the lens barrel 1.

FIG. 3A and FIG. 3B are sectional views cut along the light axis Z in a retracted state of the lens barrel 1. FIG. 3A is an X-Z sectional view (a sectional view through which the pitch axis P passes). FIG. 3B is a Y-Z sectional view (a sectional view through which the yaw axis Y passes).

Figure 4A:
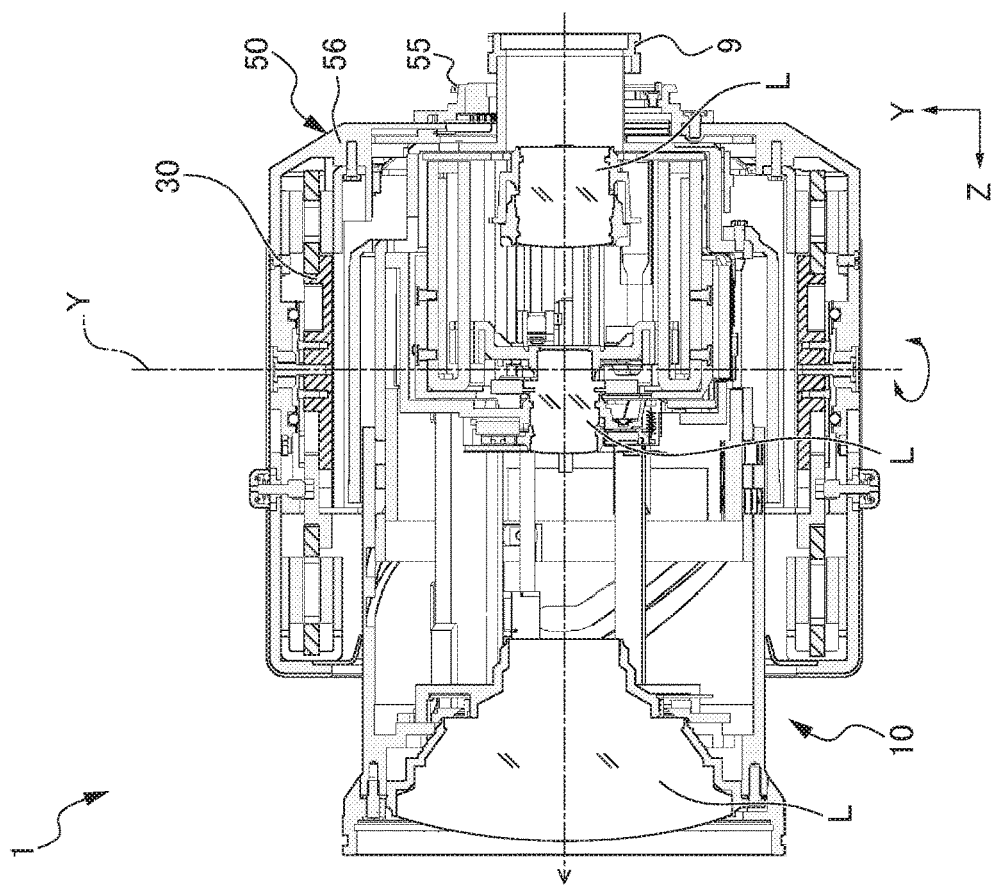
FIG. 4A and FIG. 4B are sectional views cut along the light axis Z in an extended state of the lens barrel 1.
Figure 4B:
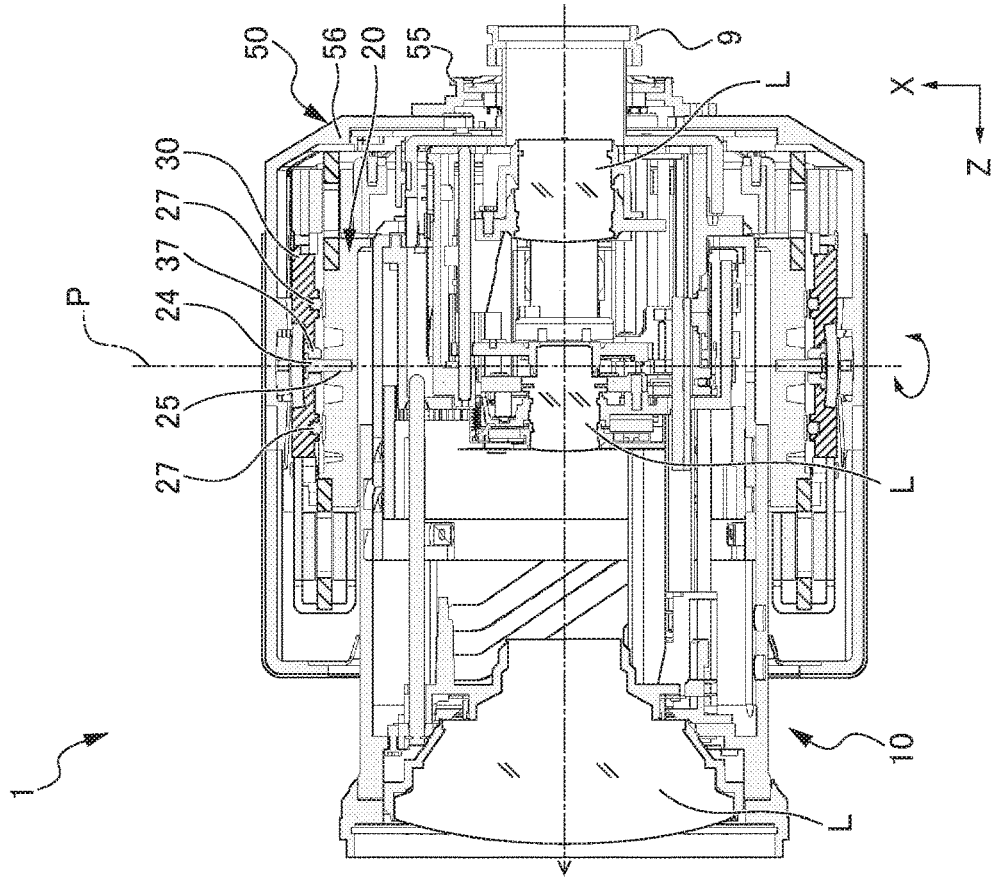

FIG. 4A and FIG. 4B are sectional views cut along the light axis Z in an extended state of the lens barrel 1. FIG. 4A is an X-Z sectional view (a sectional view through which the pitch axis P passes). FIG. 4B is a Y-Z sectional view (a sectional view through which the yaw axis Y passes).

FIG. 5A and FIG. 5B are sectional views of the lens barrel 1. FIG. 5A is an X-Y sectional view through which the pitch axis P and the yaw axis Y pass. FIG. 5B is an X-Y sectional view through which press slider pins 62E, which are described below, pass.

—Lens Barrel 1—

The lens barrel 1 according to the present embodiment is removeably attachable to the camera body 2. The lens barrel 1 is extensible and retractable between a retracted state (a non-imaging state, stowed state or collapsed state) and an extended state (an imaging state).

As illustrated in the system configuration diagram of FIG. 1, the lens barrel 1 is provided with a second casing 10 (a lens inner shell), a first casing 30, a fixed tube 50 (a lens outer shell) and so forth. The second casing 10 retains a lens unit L that is an image forming optical system thereinside. The first casing 30 is disposed at an outer periphery of the second casing 10. The fixed tube 50 is disposed at an outer periphery of the first casing 30. The second casing 10 and the first casing 30 together are referred to as a support unit 40.

In the present embodiment of the lens barrel 1, the second casing 10 is rotatable in the pitch direction about the pitch axis P relative to the first casing 30, and the first casing 30 is rotatable in the yaw direction about the yaw axis Y relative to the fixed tube 50.

As illustrated in FIG. 2, the lens barrel 1 is further provided with a third casing 80 that covers a distal end of the second casing 10 and an outer tube 85 that covers the outer periphery of the whole of the lens barrel 1.

If the overall external shape of the lens barrel 1 is a circular tube shape, it is preferable if each casing also has a circular tube shape. However, as in the first casing 30 according to the present embodiment, flat parts may be provided at inner periphery faces and outer periphery faces for the disposition of other components and the like. The circular tube shape of each casing may be modified as appropriate by the formation of flat parts, cutaways, parts with altered thickness and the like.

—Second Casing 10—

As illustrated in FIG. 1, the second casing 10 of the lens barrel 1 is provided with the lens unit L, a shift direction anti-vibration system 4, a first shake detection unit 5, a second shake detection unit 6, an anti-vibration optical system position detection unit 7, a lens control unit 8 and a lens side inner mount 9.

The second casing 10 is also provided with a portion of the pitch driving unit 20, which drives the second casing 10 in the pitch direction relative to the first casing 30.

It is preferable if the first shake detection unit 5 is disposed on the pitch axis P.

The lens unit L includes an anti-vibration optical system LB, and is an image forming optical system that forms a subject image on an imaging element 101 disposed in the camera body 2.

The first shake detection unit 5 is a gyro sensor or the like that detects pitching and yawing of the camera system 3.

The second shake detection unit 6 is a gyro sensor or the like that detects shakes of the camera system 3 in shift directions, which are movements in the X-axis direction and the Y-axis direction.

Although not described in detail, the shift direction anti-vibration system 4 is provided with the anti-vibration optical system LB, a moveable frame 41, the anti-vibration optical system position detection unit 7, and a shift direction driving voice coil motor (shift direction driving VCM 42). The anti-vibration optical system LB moves in the X and Y directions (the shift directions), the moveable frame 41 retains the anti-vibration optical system LB, the anti-vibration optical system position detection unit 7 detects positions of the anti-vibration optical system LB, and the shift direction driving VCM 42 drives the moveable frame 41 in the shift directions. The term "voice coil motor" is below shortened to "VCM".

The lens control unit 8 controls the shift direction driving VCM 42 in accordance with signals inputted from the second shake detection unit 6. The anti-vibration optical system LB is driven by the shift direction driving VCM 42 in directions to cancel image shake of the subject image caused by shaking of a photographer's hands and the like. Thus, the shift direction driving VCM 42 corrects image shake in the shift directions.

The lens side inner mount 9 is provided at a body side end part of the second casing 10. The lens side inner mount 9 is provided with a mechanical mount 91, communication contacts 92, and power receiving contacts 93.

Figure 7:
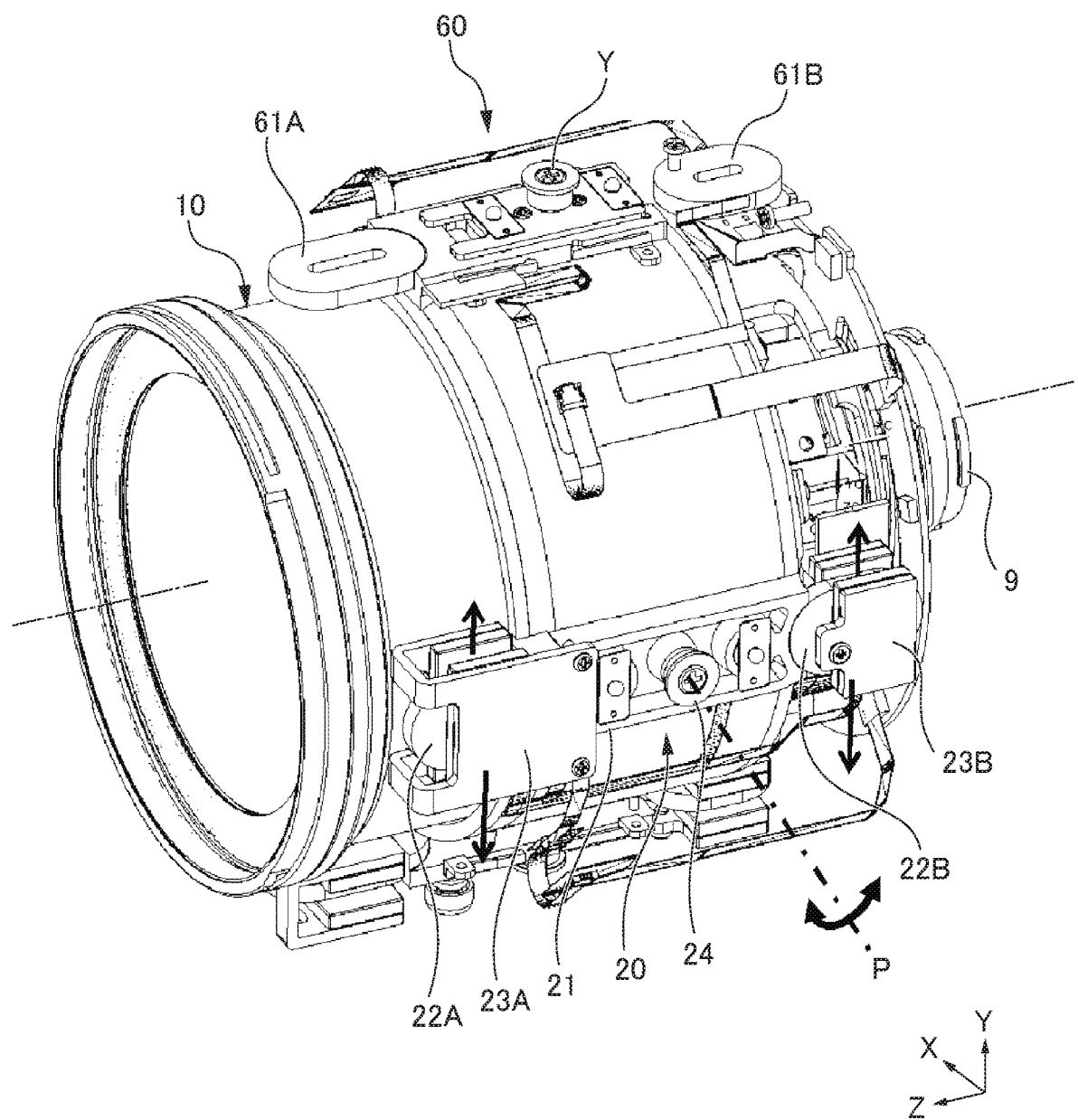
FIG. 7 is a perspective view of the second casing 10 depicting portions of the pitch driving unit 20 and a yaw driving unit 60.

The second casing 10 is provided with a portion of the pitch driving unit 20 that drives in the pitch direction. FIG. 6 is a perspective view of the second casing 10 depicting the portion of the pitch driving unit 20. FIG. 7 is a perspective view of the second casing 10 depicting portions of the pitch driving unit 20 and a yaw driving unit 60.

—Pitch Driving Unit 20—

The pitch driving unit 20 that drives the second casing 10 in the pitch direction is provided at the outer periphery of the second casing 10.

As illustrated in FIG. 6, the pitch driving unit 20 is provided with a pitch driving coil-retaining unit 21 and two pitch driving coils 22A and 22B. The pitch driving coil-retaining unit 21 is fixed at the second casing 10. The pitch driving coils 22A and 22B are attached to the pitch driving coil-retaining unit 21.

As illustrated in FIG. 7, a pitch driving magnet and yoke 23A at the light axis direction subject side and a pitch driving magnet and yoke 23B at the light axis direction body side are attached to the first casing 30 (which is not illustrated in FIG. 7).

Figure 8:
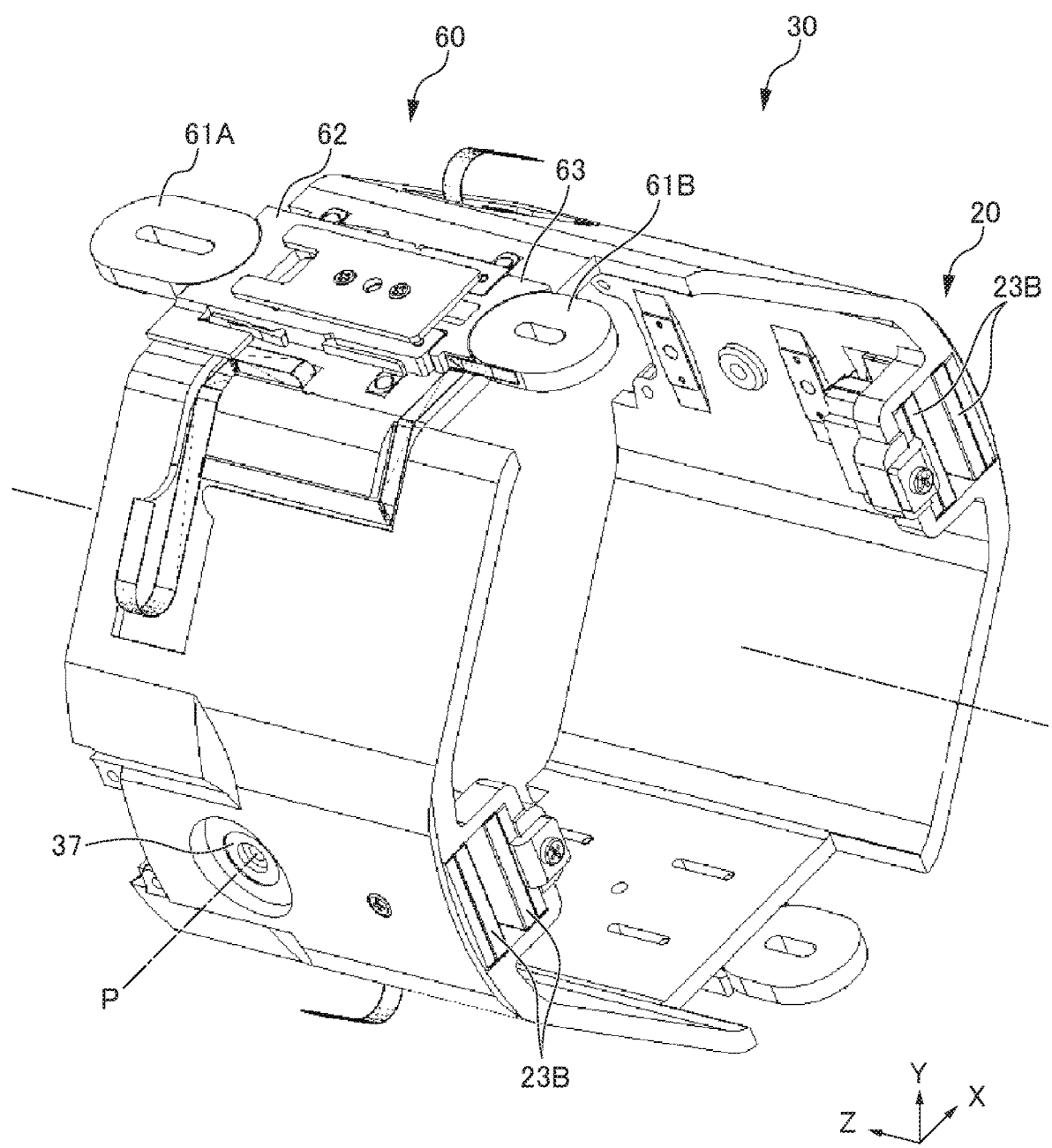
FIG. 8 is a perspective view of a first casing 30 depicting a portion of the yaw driving unit 60.

Attachment states of the pitch driving magnets and yokes 23A and 23B to the first casing 30 are illustrated in FIG. 8, which is described below.

The pitch driving coils 22A and 22B have elliptical annular shapes and are attached to the subject side and the body side of the pitch driving coil-retaining unit 21 such that long axes thereof are in the light axis Z direction.

A pitch bearing 25 (FIG. 6) is provided at the center of the pitch driving coil-retaining unit 21. A pitch axle member 24 (FIG. 7) is rotatably inserted into the pitch bearing 25. Relative rotation of the second casing 10 with respect to the first casing 30 about the pitch axis P is enabled by the insertion of the pitch axle member 24 into the pitch bearing 25.

Ball-backing plates 26 are provided at the pitch driving coil-retaining unit 21, between the pitch bearing 25 and the subject side pitch driving coil 22A, and between the pitch bearing 25 and the body side pitch driving coil 22B.

Balls 27 illustrated in FIG. 3A and FIG. 4A are disposed at the ball-backing plates 26. Smooth relative rotation of the second casing 10 with respect to the first casing 30 about the pitch axis P is enabled by the balls 27 being disposed between the first casing 30 and the second casing 10.

As illustrated in FIG. 3, the pitch axle member 24 penetrates through a first casing bearing 37 of the first casing 30 from the outer side of the first casing 30 and is inserted into the pitch bearing 25 of the second casing 10.

When electrical power is supplied to the pitch driving coils 22A and 22B through a flexible printed circuit (FPC) 201, which is described below, forces in the directions of the arrows in FIG. 7 are applied to the pitch driving coils 22A and 22B. Thus, the second casing 10 rotates about the pitch axis P.

—Yaw Driving Unit 60 and First Casing 30—

As illustrated in FIG. 1, the lens barrel 1 is provided with, inside the first casing 30, a pitch direction rotation detection unit 29 and a portion of the yaw driving unit 60. The pitch direction rotation detection unit 29 detects rotation in the pitch direction. The yaw driving unit 60 drives the first casing 30 in the yaw direction relative to the fixed tube 50.

FIG. 8 is a perspective view of the first casing 30 depicting a portion of the yaw driving unit 60.

Figure 9A:
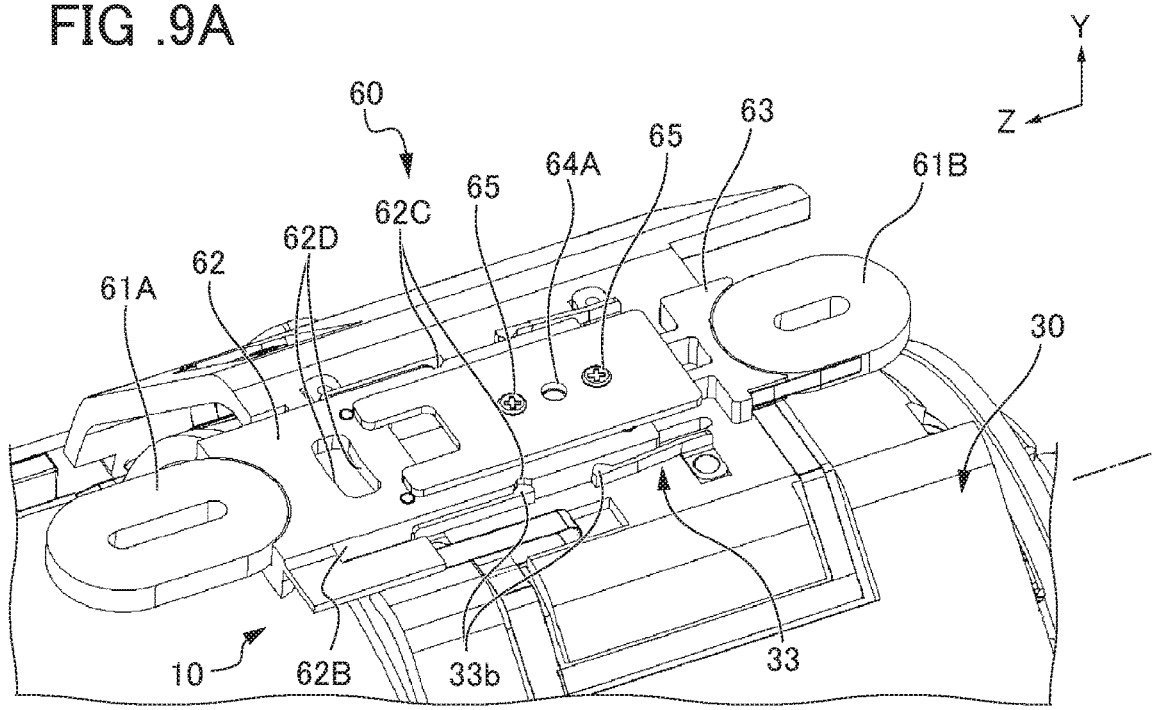
FIG. 9A is a magnified view of the yaw driving unit 60 in a state in which a spacing between a subject side yaw driving coil 61A and a body side yaw driving coil 61B of the yaw driving unit 60 is extended.
Figure 9B:
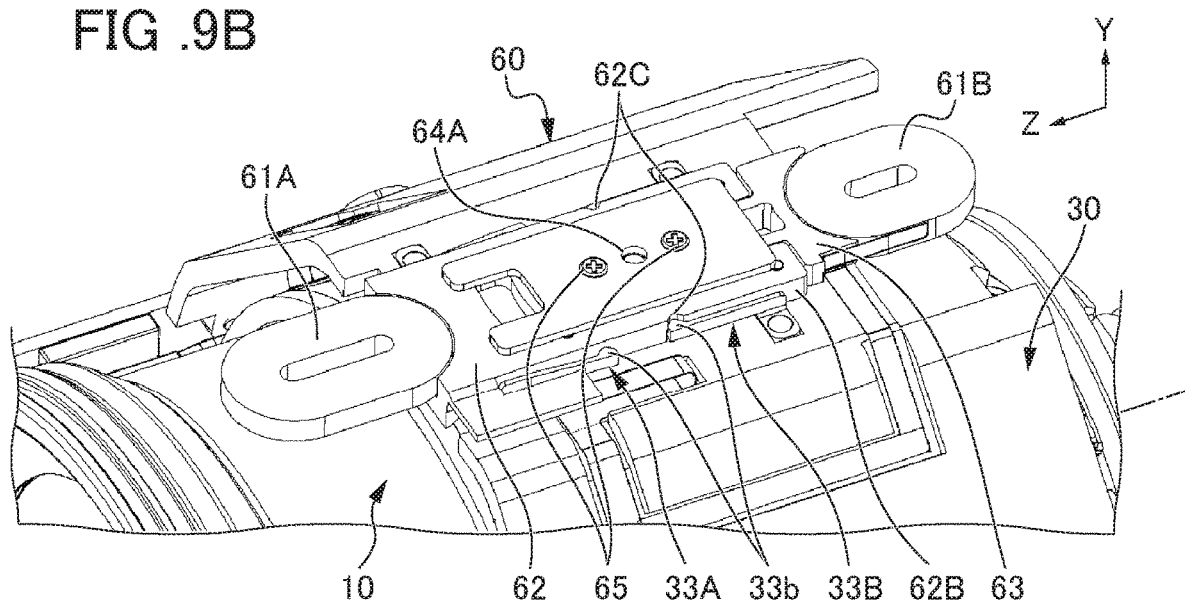
FIG. 9B is a magnified view of the yaw driving unit 60 in a state in which the spacing between the subject side yaw driving coil 61A and the body side yaw driving coil 61B is contracted.

FIG. 9A is a magnified view of the yaw driving unit 60 in a state in which a spacing between a subject side yaw driving coil 61A and a body side yaw driving coil 61B is extended. FIG. 9B is a magnified view of the yaw driving unit 60 in a state in which the spacing between the subject side yaw driving coil 61A and the body side yaw driving coil 61B is contracted.

Figure 10:
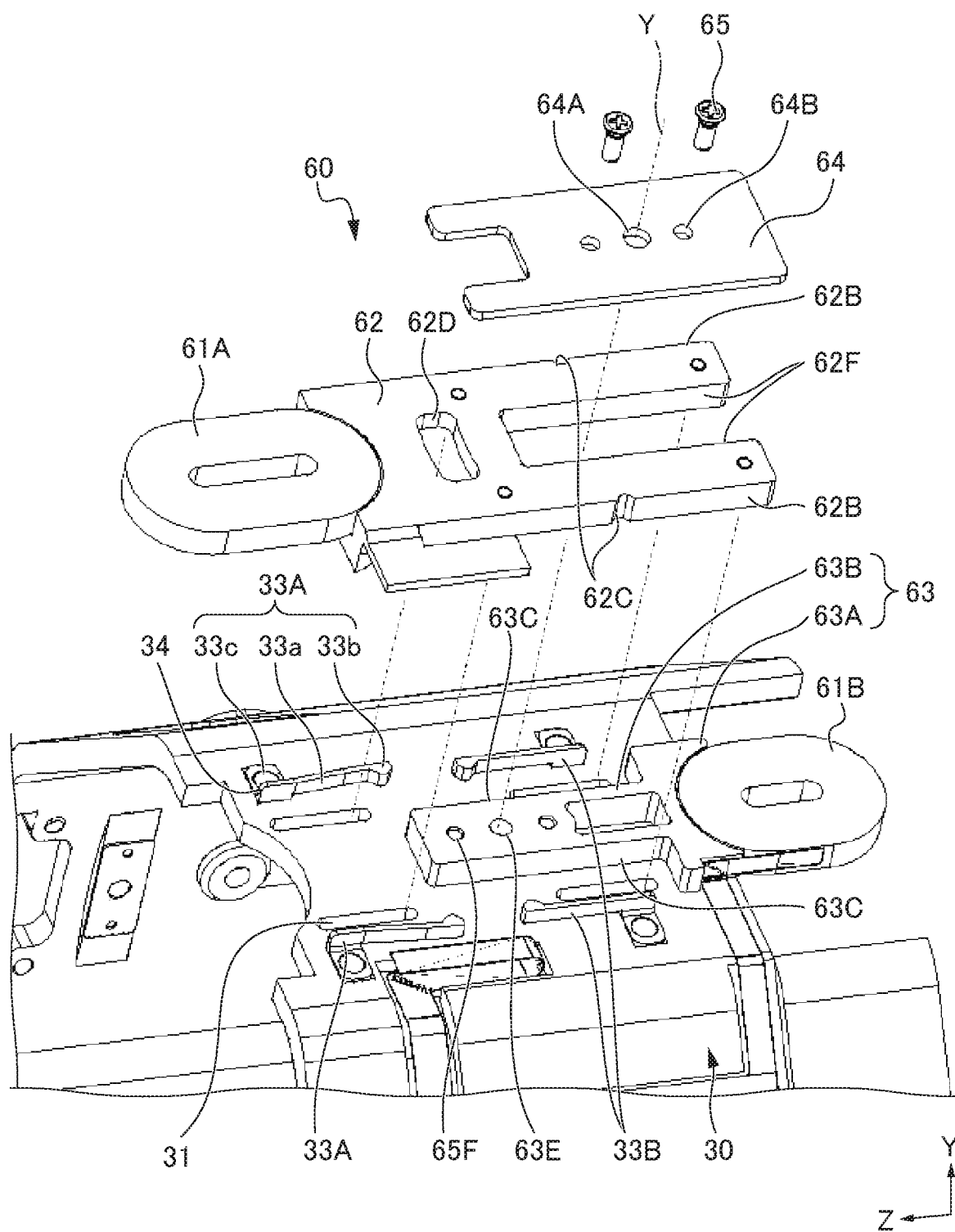
FIG. 10 is an exploded view of the yaw driving unit 60 seen in a diagonal direction from an outer side.

FIG. 10 is an exploded view of the yaw driving unit 60 seen in a diagonal direction from an outer side.

FIG. 11 is an exploded view of the yaw driving unit 60 seen in a diagonal direction from an inner side.

As illustrated in FIG. 8, the first casing 30 has a substantially octagonal shape. One pair of faces thereof that oppose one another across the pitch axis P are not flat but curved.

The pitch driving magnets and yokes 23A and 23B illustrated in FIG. 7 and FIG. 8, which are described above, are attached to the inner sides of these curved faces.

The yaw driving unit 60 is provided with the subject side yaw driving coil 61A that is disposed at the subject side, a slider unit 62 that retains the subject side yaw driving coil 61A, the body side yaw driving coil 61B that is disposed at the body side, and a yaw driving coil retaining unit 63 that retains the body side yaw driving coil 61B.

As illustrated in FIG. 10, the yaw driving coil retaining unit 63 is provided with a coil attachment part 63A, at which the body side yaw driving coil 61B is attached, and a fixed part 63B, which extends toward the subject side from the coil attachment part 63A and is fixed to the first casing 30.

The fixed part 63B has a substantially rectangular shape and is disposed with the longer direction thereof along the light axis Z. The fixed part 63B includes two side faces 63C along the light axis Z.

The slider unit 62 has a "U" shape. The inner periphery of the "U" shape of the slider unit 62 includes two sliding side faces 62F along the light axis Z direction that are parallel with one another. A distance between the two sliding side faces 62F is substantially the same as a distance between the side faces 63C of the yaw driving coil retaining unit 63 (a width of the fixed part 63B of the yaw driving coil retaining unit 63 in a direction orthogonal to the light axis Z direction).

The subject side yaw driving coil 61A is attached to the subject side of the slider unit 62.

The slider unit 62 is disposed such that the opening side of the "U" shape is at the body side thereof and the long sides of the slider unit 62 are along the light axis Z direction. The slider unit 62 is disposed so as to sandwich the fixed part 63B of the yaw driving coil retaining unit 63 within the "U" shape.

Thus, the side faces 63C of the yaw driving coil retaining unit 63 touch against the sliding side faces 62F of the slider unit 62, and the sliding side faces 62F can slide along the side faces 63C of the fixed part 63B.

The outer periphery of the "U" shape of the slider unit 62 includes two outer side faces 62B that extend in the light axis Z direction and are parallel with one another. The two outer side faces 62B are each provided with a pawl-engaging recess part 62C.

A push button-engaging recess part 62D is provided in the base portion of the "U" shape of the slider unit 62. A distal end of a push button 70, which is described below, is inserted into the push button-engaging recess part 62D.

Four of the slider pins 62E are provided at the inner diameter side of the slider unit 62, at distal ends at the camera body 2 side and at proximal portions.

Correspondingly, guiding long holes 31 are provided in the periphery face of the first casing 30. The four slider pins 62E are inserted into the guiding long holes 31.

Four of the guiding long holes 31 are provided in correspondence with the positions of the slider pins 62E. Two of the guiding long holes 31 are provided at both sides of the yaw driving coil retaining unit 63 in the circumferential direction. Relative to those two guiding long holes 31, the other two of the guiding long holes 31 are provided so as to extend in the light axis Z direction at positions that are separated by constant distances in the light axis Z direction from the two guiding long holes 31.

The four slider pins 62E are inserted into the guiding long holes 31 and move along the guiding long holes 31. Thus, movement of the slider unit 62 in the light axis Z direction relative to the first casing 30 is guided.

A press plate 64 is disposed at the outer side of the slider unit 62. Three holes are formed along the light axis Z in a central portion of the press plate 64.

The holes in the press plate 64 are a hole 64A in a middle portion of the press plate 64 and two holes 64B provided at both sides of the hole 64A.

A yaw axle member 66 is inserted into a yaw bearing 63E provided at the yaw driving coil retaining unit 63, through a bearing 50A attached to the fixed tube 50, the hole 64A in the press plate 64 as illustrated in FIG. 10, and the opening of the "U" shape of the slider unit 62.

Screws 65 are inserted into the holes 64B at the two ends of the press plate 64. The screws 65 are inserted and screwed into screw holes 65F provided in the yaw driving coil retaining unit 63.

As illustrated in FIG. 9A and FIG. 9B, the yaw driving unit 60 attached to the first casing 30 moves between the state illustrated in FIG. 9A and the state illustrated in FIG. 9B.

The state illustrated in FIG. 9A is a state in which the slider unit 62 is extended in the light axis Z direction with respect to the yaw driving coil retaining unit 63. A spacing between the subject side yaw driving coil 61A and the body side yaw driving coil 61B is longest in this state.

The state illustrated in FIG. 9B is a state in which the spacing between the subject side yaw driving coil 61A and the body side yaw driving coil 61B is contracted. The spacing between the subject side yaw driving coil 61A and the body side yaw driving coil 61B is shortest in this state.

—Snap-Fit Structure—

A snap-fit structure is provided in order to restrict a movement range of the slider unit 62 in the light axis Z direction to a fixed range between FIG. 9A and FIG. 9B.

The snap-fit structure is provided with the two pawl-engaging recess parts 62C, which are provided at the two outer side faces 62B of the slider unit 62 described above, and four plate spring parts 33 (33A and 33B), at distal end portions of which protruding pawl parts 33b are provided. The pawl parts 33b engage with the pawl-engaging recess parts 62C.

The plate spring parts 33 are fabricated of members with elasticity, for example, metal members.

As illustrated in FIG. 10, each plate spring part 33 is provided with a protruding part 33a extending along the light axis Z, the pawl part 33b, and a first casing attachment part 33c.

The first casing attachment part 33c is provided at a proximal end of the protruding part 33a, is parallel with a periphery face of the first casing 30, and is fixed to the periphery face by a screw 34.

The protruding part 33a inflects perpendicularly from the first casing attachment part 33c, and a length direction of the protruding part 33a extends along the light axis Z in a state in which the protruding part 33a stands from the peripheral surface of the first casing 30.

The pawl part 33b is provided at the distal end of the protruding part 33a.

The plate spring parts 33 are disposed adjacent to the aforementioned guiding long holes 31 in the circumferential direction, so as to sandwich the yaw driving coil retaining unit 63 and the slider unit 62. Two of the plate spring parts 33 (the subject side plate spring parts 33A) are disposed at the subject side, and two of the plate spring parts 33 (the body side plate spring parts 33B are disposed at the body side.

The subject side plate spring parts 33A are attached at the subject side of the first casing 30 such that the first casing attachment parts 33*c* are at the subject sides thereof, the pawl parts 33*b* are at the body sides, and the pawl parts 33*b* oppose one another.

The body side plate spring parts 33B are attached at the body side of the first casing 30 such that the first casing attachment parts 33*c* are at the body sides thereof, the pawl parts 33*b* are at the subject sides, and the pawl parts 33*b* oppose one another.

The pawl parts 33*b* engage with the pawl-engaging recess parts 62C provided at the side portions of the slider unit 62.

The pawl parts 33*b* of the subject side plate spring parts 33A engage with the pawl-engaging recess parts 62C when the slider unit 62 is at the extended position illustrated in FIG. 9A.

The pawl parts 33*b* of the body side plate spring parts 33B engage with the pawl-engaging recess parts 62C when the slider unit 62 is at the contracted position illustrated in FIG. 9B.

—Push Button 70—

The push button 70 is provided at the lens barrel 1 in order to slide the slider unit 62. As illustrated in FIG. 2, holes 86 and 81 for the push button 70 are provided in, respectively, the outer tube 85 and the third casing 80. A push button-guiding long hole 54 is provided in the fixed tube 50.

FIG. 12A and FIG. 12B are partial sectional views depicting portions of the push button 70 of the lens barrel 1. FIG. 12A illustrates a state in which the lens barrel 1 is extended and the slider unit 62 is extended. FIG. 12B illustrates a state in which the lens barrel 1 is retracted and the slider unit 62 is contracted.

Figure 13A:
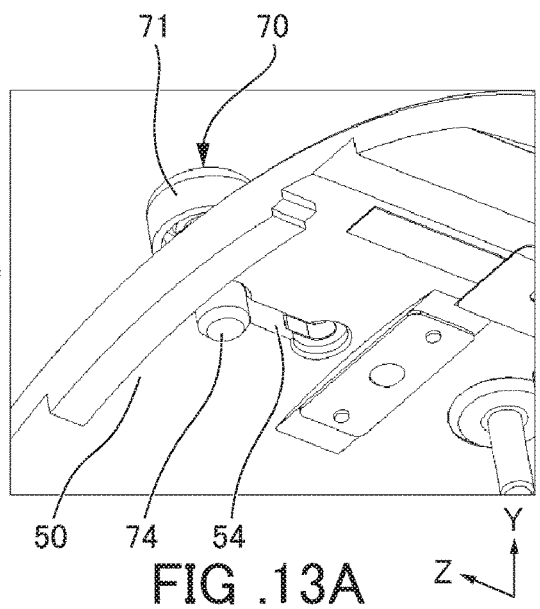
FIG. 13A to FIG. 13D are diagrams illustrating positional relationships between the push button 70 and a push button-guiding long hole 54 of a fixed tube 50.
Figure 13B:
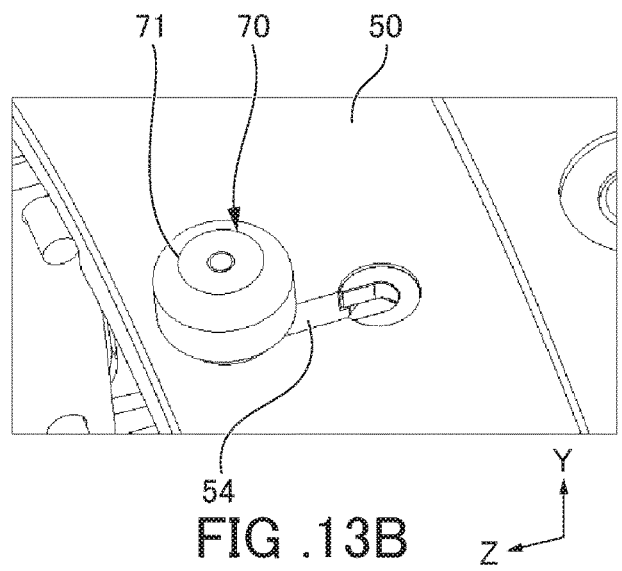
Figure 13C:
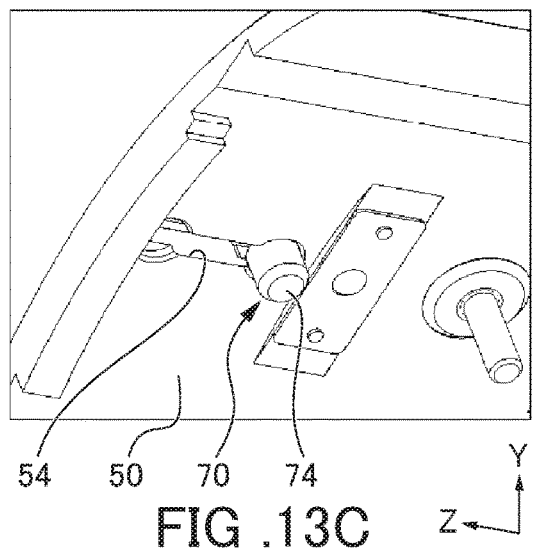
Figure 13D:
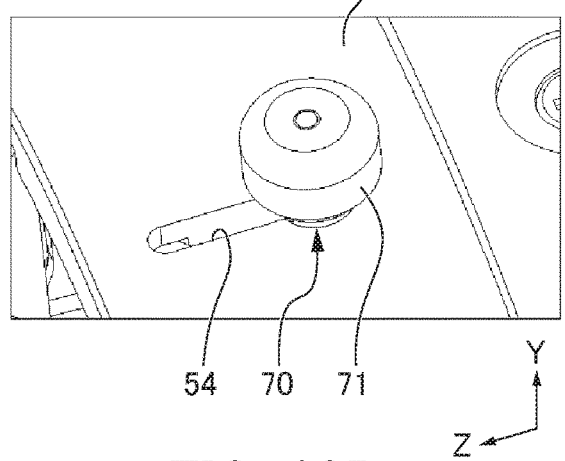

FIG. 13A to FIG. 13D are diagrams illustrating positional relationships between the push button 70 and the push button-guiding long hole 54 of the fixed tube 50. FIG. 13A is a diagram in which a position of the push button 70 when the slider unit 62 is extended is seen from an inner side of the fixed tube 50. FIG. 13B is a diagram in which the position of the push button 70 when the slider unit 62 is extended is seen from an outer side of the fixed tube 50. FIG. 13C is a diagram in which a position of the push button 70 when the slider unit 62 is contracted is seen from the inner side of the fixed tube 50. FIG. 13D is a diagram in which the position of the push button 70 when the slider unit 62 is contracted is seen from the outer side of the fixed tube 50.

Figure 14:
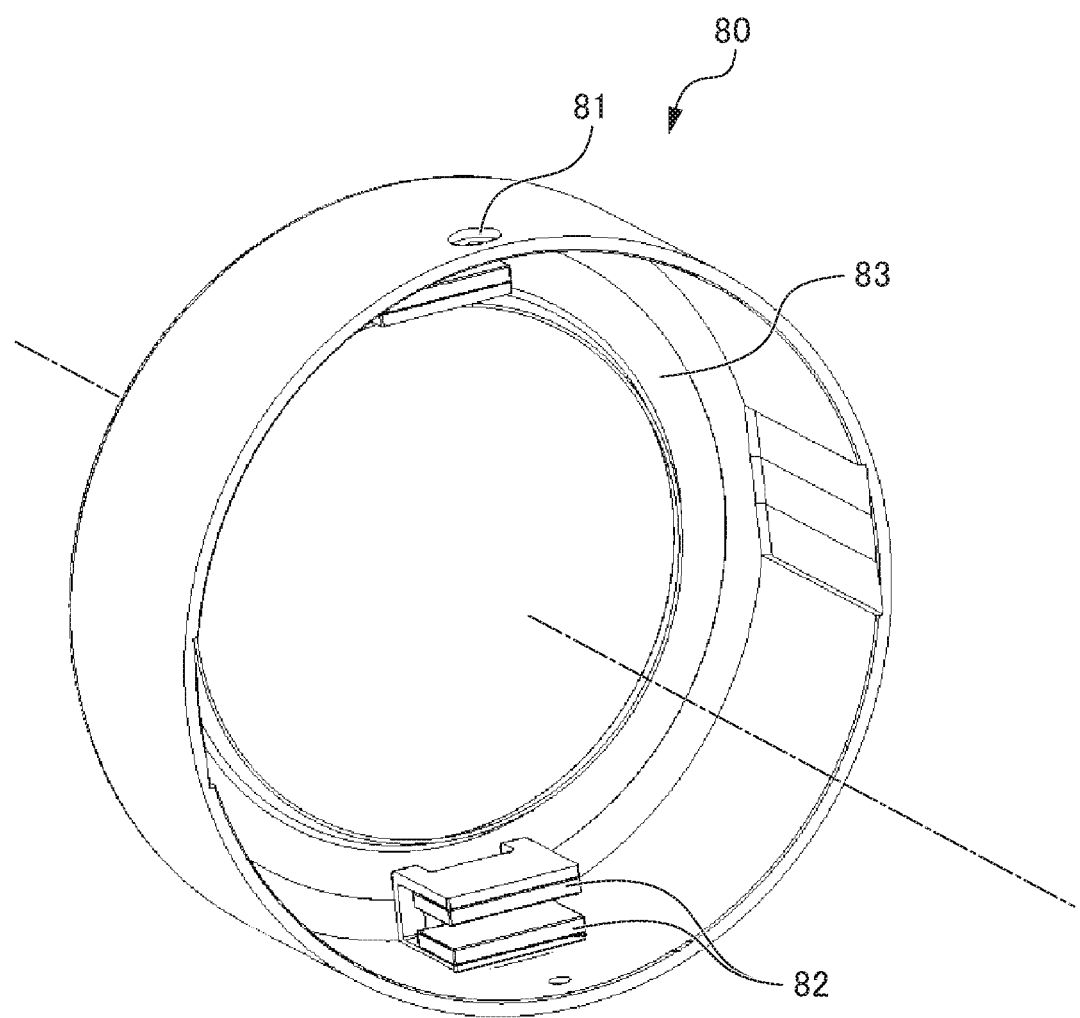
FIG. 14 is a perspective view of a third casing 80.

FIG. 14 is a perspective view of the third casing 80.

Figure 15:
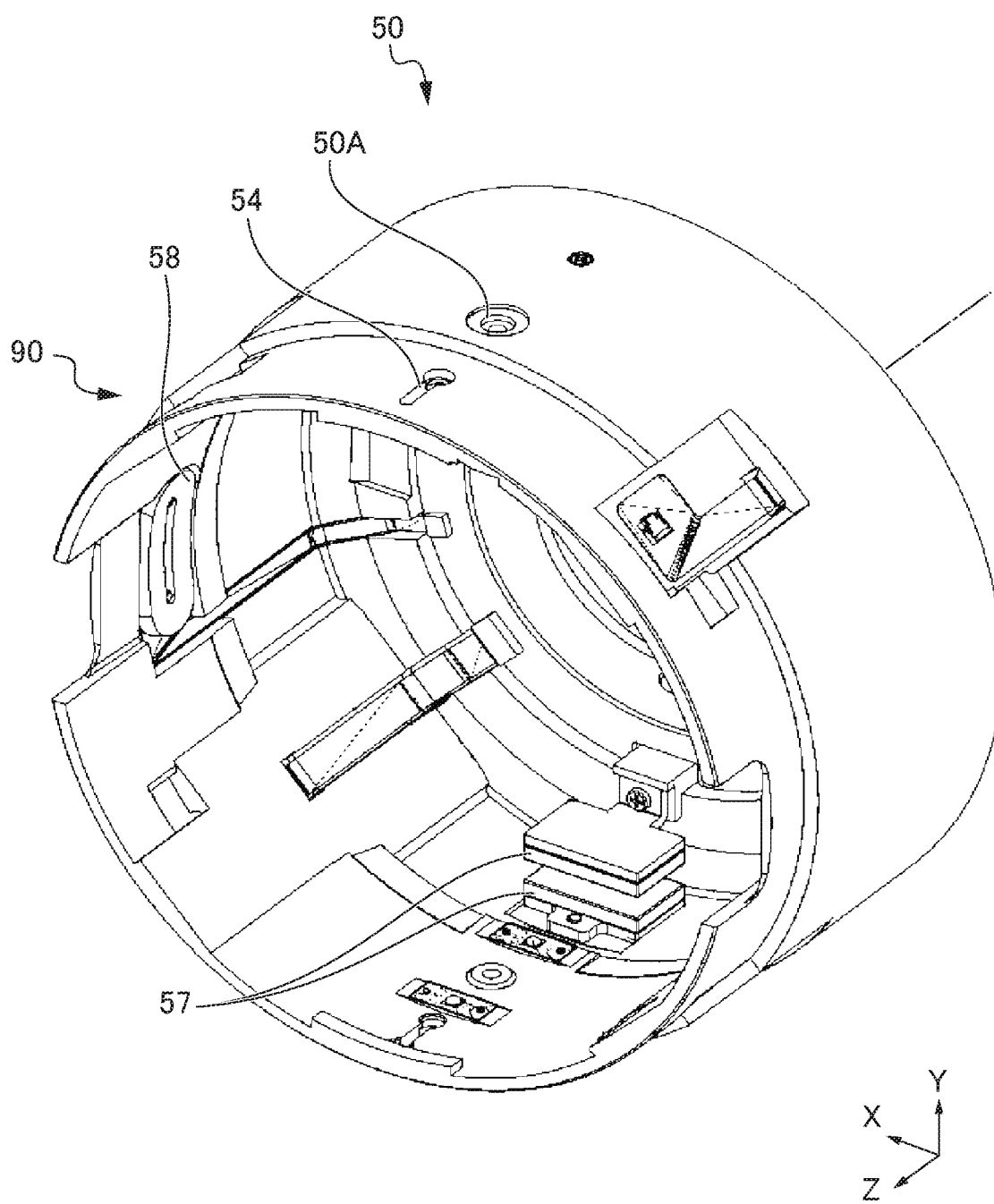
FIG. 15 is a perspective view of the fixed tube 50.

FIG. 15 is a perspective view of the fixed tube 50.

As illustrated in FIG. 12A to FIG. 13D, the push button 70 is provided with a shaft part 71, a press part 72, a spring part 73 and an engaging part 74. The press part 72 covers an end portion at one end of the shaft part 71 (at the diametric direction outer side of the lens barrel 1). The spring part 73 is attached to the inner side of the press part 72 at the one end side of the shaft part 71. The engaging part 74 is provided at the other end of the shaft part 71 (at the diametric direction inner side of the lens barrel 1).

The shaft part 71 of the push button 70 penetrates through the hole 86 of the outer tube 85, the hole 81 of the third casing 80, and the push button-guiding long hole 54 of the fixed tube 50. The engaging part 74 provided at the other end of the shaft part 71 is insertable into the push button-engaging recess part 62D of the slider unit 62 that is attached to the first casing 30.

When the press part 72 of the push button 70 is pressed from the outer side, the spring part 73 is compressed and the shaft part 71 descends (moves toward the diametric direction inner side). Accordingly, the engaging part 74 is inserted into the push button-engaging recess part 62D of the slider unit 62.

When the lens barrel 1 is in the retracted state as illustrated in FIG. 12B, then as illustrated in FIG. 9B, the slider unit 62 is contracted and the pawl parts 33*b* of the body side plate spring parts 33B are engaged with the pawl-engaging recess parts 62C.

When the lens barrel 1 is to be switched from this state to the extended state, the push button 70 is pressed and the engaging part 74 of the push button 70 is inserted into the push button-engaging recess part 62D of the slider unit 62.

If the push button 70 is moved toward the subject side in this state, the outer tube 85, the third casing 80 and the slider unit 62 move toward the subject side in the light axis Z direction along the guiding long holes 31 of the first casing 30.

At this time, the pawl parts 33*b* of the body side plate spring parts 33B ride out from the pawl-engaging recess parts 62C, and the sliding side faces 62F of the slider unit 62 slide along the side faces 63C of the fixed part 63B.

When the slider unit 62 moves toward the subject side, the subject side yaw driving coil 61A also moves toward the subject side. Thus, the spacing between the subject side yaw driving coil 61A and the body side yaw driving coil 61B increases.

When the pawl-engaging recess parts 62C reach the positions of the pawl parts 33*b* of the subject side plate spring parts 33A, the pawl-engaging recess parts 62C engage with these pawl parts 33*b*.

When the push button 70 is released, the push button 70 is lifted by an urging force from the spring part 73. Thus, the engaging part 74 of the push button 70 becomes disengaged from the push button-engaging recess part 62D of the slider unit 62. However, because the pawl parts 33*b* are engaged with the pawl-engaging recess parts 62C, the slider unit 62 is fixed.

When the slider unit 62 extends in this manner, the spacing between the subject side yaw driving coil 61A and the body side yaw driving coil 61B is increased.

Consequently, a turning moment about the yaw axle member 66 that is produced when electrical power is supplied to the subject side yaw driving coil 61A and the body side yaw driving coil 61B is increased. Therefore, if, for example, the same electrical power is supplied, driving of the first casing 30 and the second casing 10 in the yaw direction relative to the fixed tube 50 may be implemented with greater force.

Conversely, when the lens barrel 1 is in the retracted state as illustrated in FIG. 12A, then as illustrated in FIG. 9A, the slider unit 62 is extended and the pawl parts 33*b* of the subject side plate spring parts 33A are engaged with the pawl-engaging recess parts 62C.

The push button 70 is pressed and the engaging part 74 of the push button 70 is inserted into the push button-engaging recess part 62D of the slider unit 62.

If the push button 70 is moved toward the body side in this state, the outer tube 85, the third casing 80 and the slider unit 62 move toward the body side along the guiding long holes 31 of the first casing 30.

At this time, the pawl parts 33*b* of the subject side plate spring parts 33A disengage from the pawl-engaging recess parts 62C, and the sliding side faces 62F of the slider unit 62 slide along the side faces 63C of the fixed part 63B.

When the slider unit 62 moves toward the body side, the subject side yaw driving coil 61A also moves toward the body side. Thus, the spacing between the subject side yaw driving coil 61A and the body side yaw driving coil 61B decreases.

When the pawl-engaging recess parts 62C reach the positions of the pawl parts 33b of the body side plate spring parts 33B, the pawl-engaging recess parts 62C engage with these pawl parts 33b.

The engaging part 74 of the push button 70 becomes disengaged from the push button-engaging recess part 62D of the slider unit 62.

Although the push button 70 is in the disengaged state at this time, because the pawl parts 33b are engaged with the pawl-engaging recess parts 62C, the slider unit 62 is fixed.

When the slider unit 62 contracts in this manner, the spacing between the subject side yaw driving coil 61A and the body side yaw driving coil 61B is decreased, and the lens barrel 1 may be put into the retracted state.

—Third Casing 80—

The third casing 80 has a tubular shape in which a circular plate member 83 is integrally molded at the subject side of the third casing 80 as illustrated in FIG. 14. The circular plate member 83 includes an opening into which the second casing 10 is insertable.

A first casing-driving subject side magnet and yoke 82 is attached to the subject side of the inner periphery of the third casing 80.

—Fixed Tube 50—

As illustrated in FIG. 1, the lens barrel 1 is provided with a yaw direction rotation detection unit 61 that detects rotation in the yaw direction, a third shake detection unit 53 and an operation member 59. The third shake detection unit 53 is a gyro sensor or the like that detects pitching and yawing of the camera system 3. It is preferable if the third shake detection unit 53 is disposed on the yaw axis Y.

As illustrated in FIG. 15, FIG. 2 to FIG. 4, FIG. 12A and FIG. 12B, the fixed tube 50 is provided with a tubular portion and with a tubular member 56 that is formed integrally with the tubular portion. A lens side outer mount 55 is attached to the tubular member 56.

A first casing-driving body side magnet and yoke 57 is attached to the body side of the inner periphery of the fixed tube 50.

—Spherical Surface Coil 58—

Figure 16:
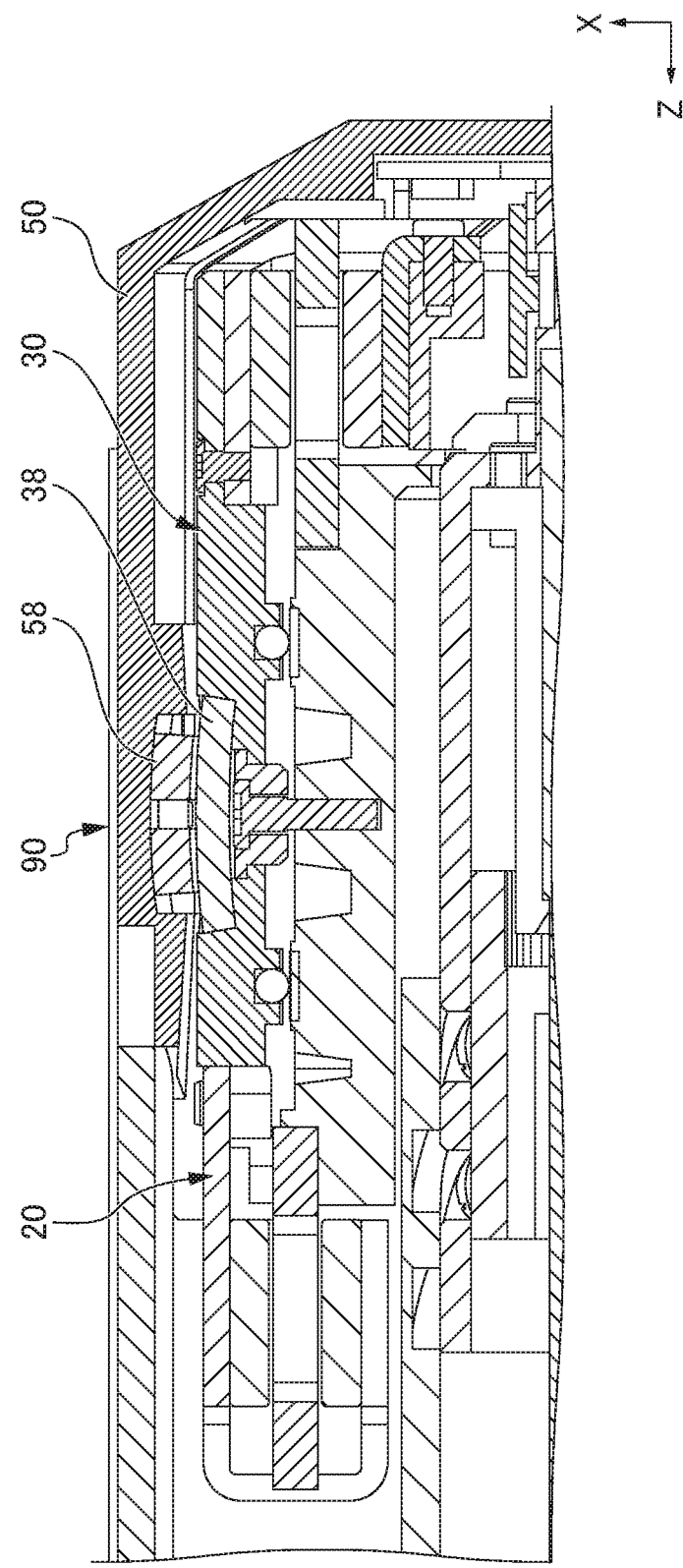
FIG. 16 is a partial sectional view of the lens barrel 1.
Figure 17:
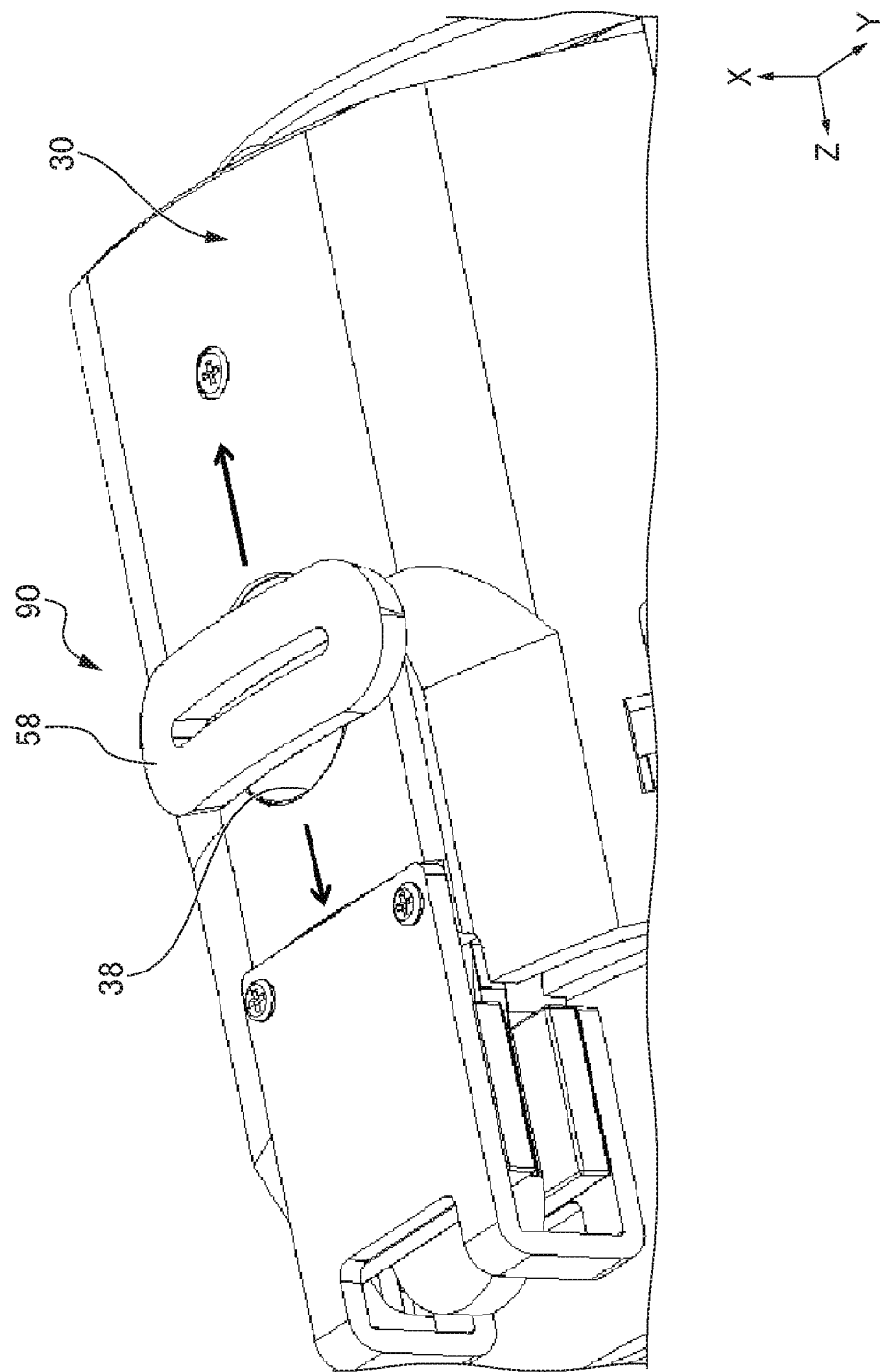
FIG. 17 is a perspective view illustrating the first casing 30 and a spherical surface coil 58 provided at the fixed tube 50.

FIG. 16 is a partial sectional view of the lens barrel 1. FIG. 17 is a perspective view illustrating the first casing 30 and a spherical surface coil 58 provided at the fixed tube 50.

As illustrated in the above-described FIG. 8, the first casing 30 has a substantially octagonal shape and one pair of faces thereof that oppose one another via the pitch axis P are not flat but curved.

The first casing bearing 37 into which the aforementioned pitch axle member 24 is inserted is provided in one of the curved surfaces. As illustrated in FIG. 2, in the state in which the pitch axle member 24 is inserted into the first casing bearing 37, a spherical surface magnet 38 is attached to the outer side of the pitch axle member 24.

As illustrated in FIG. 2, FIG. 16 and FIG. 17, the spherical surface coil 58 is attached to the inner face of the fixed tube 50 at a position opposing the spherical surface magnet 38.

Positions at which each of the spherical surface coil 58 and spherical surface magnet 38 are attached are substantially 90° from positions at which the yaw driving unit 60 is attached. That is, the spherical surface coil 58 and spherical surface magnet 38 are provided substantially midway between two of the yaw driving units 60.

A yaw auxiliary driving unit 90, which assists the yaw driving unit 60, is constituted by the spherical surface coil 58 and the spherical surface magnet 38.

It is preferable for driving efficiency if the spherical surface coil 58 and the spherical surface magnet 38 have spherical surfaces whose radii are centered in a vicinity of an intersection point between the pitch axis P and the yaw axis Y. However, this is not a limitation.

Although the present embodiment includes the spherical surface coil 58 and the spherical surface magnet 38, surfaces that are curved only in the circumferential direction about the light axis Z may be used instead of spherical surfaces.

Figure 18:
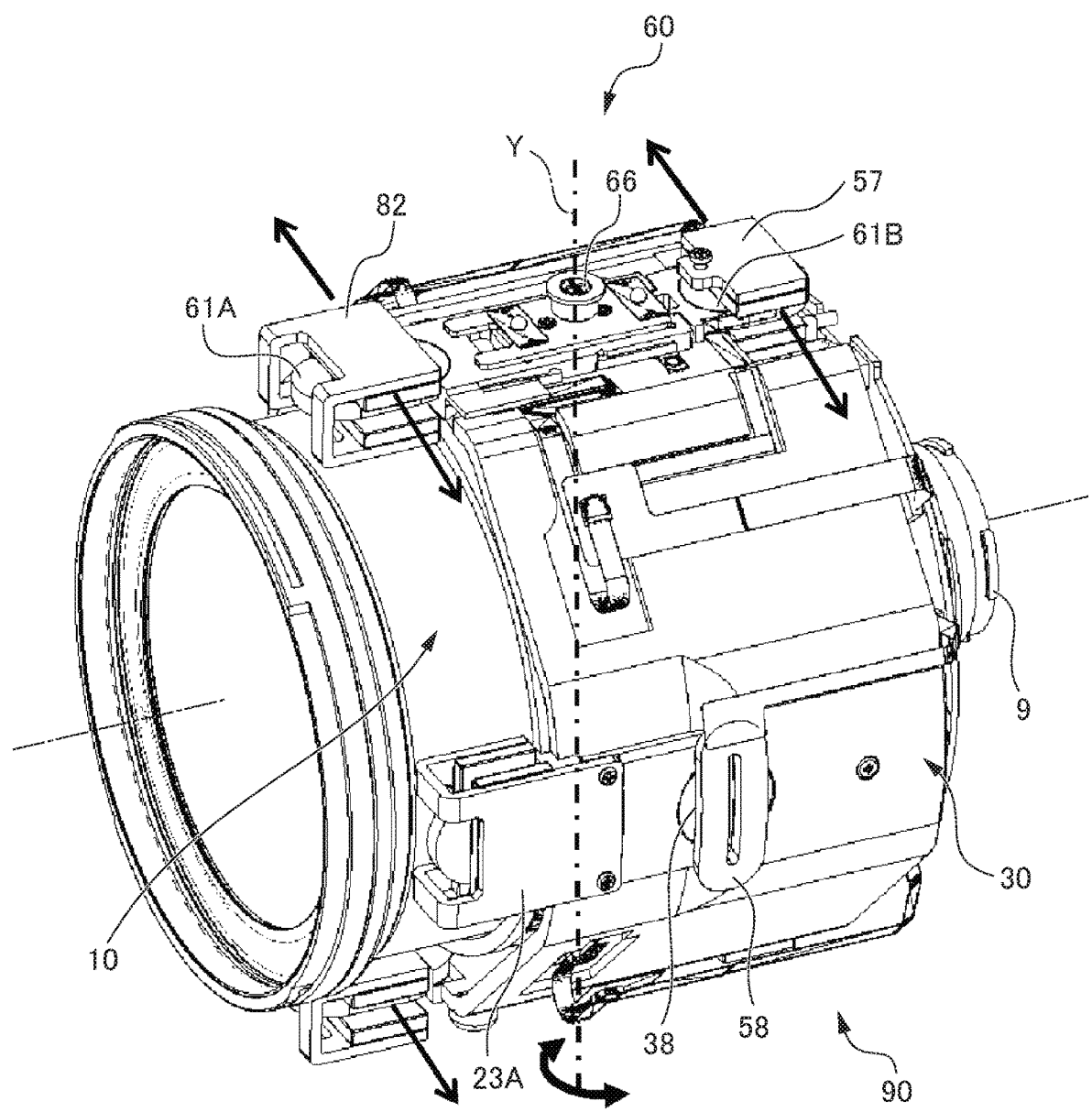
FIG. 18 is a diagram describing driving in the yaw direction.

FIG. 18 is a diagram describing operations of the yaw driving unit 60 and the yaw auxiliary driving unit 90.

As described above, the yaw driving unit 60 is provided with the first casing-driving subject side magnet and yoke 82, the subject side yaw driving coil 61A, the first casing-driving body side magnet and yoke 57 and the body side yaw driving coil 61B.

As described above, the yaw auxiliary driving unit 90 is provided with the spherical surface magnet 38 and the spherical surface coil 58.

When electrical power is supplied to the subject side yaw driving coil 61A and body side yaw driving coil 61B of the yaw driving unit 60, driving force is produced in a direction indicated by the arrows in FIG. 18. Thus, the first casing 30 and second casing 10 are driven in the yaw direction relative to the fixed tube 50.

At this time, if the slider unit 62 is in the extended state having been moved to the subject side, in the state in which the lens barrel 1 is extended, the spacing between the subject side yaw driving coil 61A and the body side yaw driving coil 61B is longer than when the slider unit 62 is in the contracted state.

Because a turning moment about the yaw axle member 66 is greater when the slider unit 62 is extended, if, for example, the same electrical power is supplied, driving of the first casing 30 and the second casing 10 in the yaw direction relative to the fixed tube 50 may be implemented with greater force.

When electrical power is also supplied to the spherical surface coil 58 of the yaw auxiliary driving unit 90, driving in the yaw direction is assisted, making driving in the yaw direction easier.

According to the present embodiment, because the spherical surface coil 58 is included, a relative distance between the spherical surface coil 58 and the spherical surface magnet 38 is constant even when the first casing 30 and second casing 10 rotate about the yaw axis as illustrated in FIG. 18. Thus, driving force may be kept constant and control is facilitated.

In the present embodiment, the spherical surface coil 58 and spherical surface magnet 38 are arranged for relative movement of the fixed tube 50 and the second casing 10, but this is not limiting. A spherical surface coil and magnet may be arranged for driving of the second casing 10 and the first casing 30.

—Elastic Member 89—

Returning to FIG. 12A and FIG. 12B, an elastic member 89 in an annular shape is attached to the inner diameter side of the circular plate member 83 provided at the subject side distal end of the third casing 80.

An outer diameter side of the elastic member 89 is fixed to the circular plate member 83. An inner diameter side of the elastic member 89 extends further to the inner diameter side than an opening portion 83a of the circular plate member 83.

An end portion of the region extending to the inner diameter side contacts the outer periphery face of the second casing 10.

A filter frame 17 is attached to the distal end of the second casing 10. The filter frame 17 has a larger diameter than the second casing 10 and protrudes beyond side faces of the second casing 10.

When the lens barrel 1 is in the retracted state, as illustrated in FIG. 12B, a protruding region of the filter frame 17 presses against the subject side of the region of the elastic member 89 that extends to the inner diameter side.

This pressing blocks, for example, ingression of water, dust and the like between the third casing 80 and the outer tube 85 when the lens barrel 1 is in the retracted state.

Movement of the second casing 10 when not electrified, looseness and suchlike are also suppressed by the pressing of the elastic member 89.

In contrast, when the lens barrel 1 is extended, although an end portion of the region of the elastic member 89 that extends to the inner diameter side contacts the outer periphery face of the second casing 10, this is not a strong pressing state. Therefore, movements of the second casing 10 during zooming, focusing and the like are not impeded.

Now, if the VCM should be turned off while a power supply of the camera body 2 is turned on, the lens barrel 1 side may be provisionally fixed by the elastic member 89 and the imaging element 101 at the camera body 2 side may be properly fixed by a stepper motor or the like.

Further, if the lens barrel 1 side should be completely fixed in the state in which the power supply of the camera body 2 is turned on and the VCM is turned off, a DC motor 201 and worm gear 202 may be provided as in the variant example illustrated in FIG. 19.

FIG. 19 is a diagram illustrating the variant example, in which the support unit 40 (the second casing 10) at the lens barrel 1 side is completely fixed to the fixed tube 50.

FIG. 20A and FIG. 20B are diagrams describing lock states of the support unit 40 (the second casing 10) to the fixed tube 50. FIG. 20A illustrates a locked state and FIG. 20B illustrates an unlocked state.

As illustrated in the drawings, in the variant example the DC motor 201 and worm gear 202 are attached to the fixed tube 50 of the lens barrel 1. The lens side inner mount 9 of the second casing 10 is provided at a tubular member 94. A lock ring 203 is rotatably attached to a periphery of the tubular member 94.

A gear part 204 is formed at a periphery of the lock ring 203. A gear member 205 is disposed between the worm gear 202 and the gear part 204.

During locking, the DC motor 201 drives, rotates the worm gear 202, and rotates the lock ring 203 via the gear member 205 and the gear part 204.

Accordingly, a protrusion 206 provided at the inner periphery side of the lock ring 203 contacts and is arrested by a protrusion 207 provided at the outer periphery side of the tubular member 94 of the lens side inner mount 9 of the second casing 10.

Thus, the support unit 40 (the second casing 10) is fixed.

During unlocking, the DC motor 201 drives in the opposite direction, rotates the worm gear 202, and rotates the lock ring 203 in the opposite direction via the gear member 205 and the gear part 204.

Accordingly, the protrusion 206 provided at the inner periphery side of the lock ring 203 moves into a state of non-contact with the protrusion 207 provided at the outer periphery side of the tubular member 94 of the lens side inner mount 9 of the second casing 10. Thus, the fixing of the support unit 40 (the second casing 10) is released.

—Arrangement of Flexible Printed Circuits—

Figure 21A:
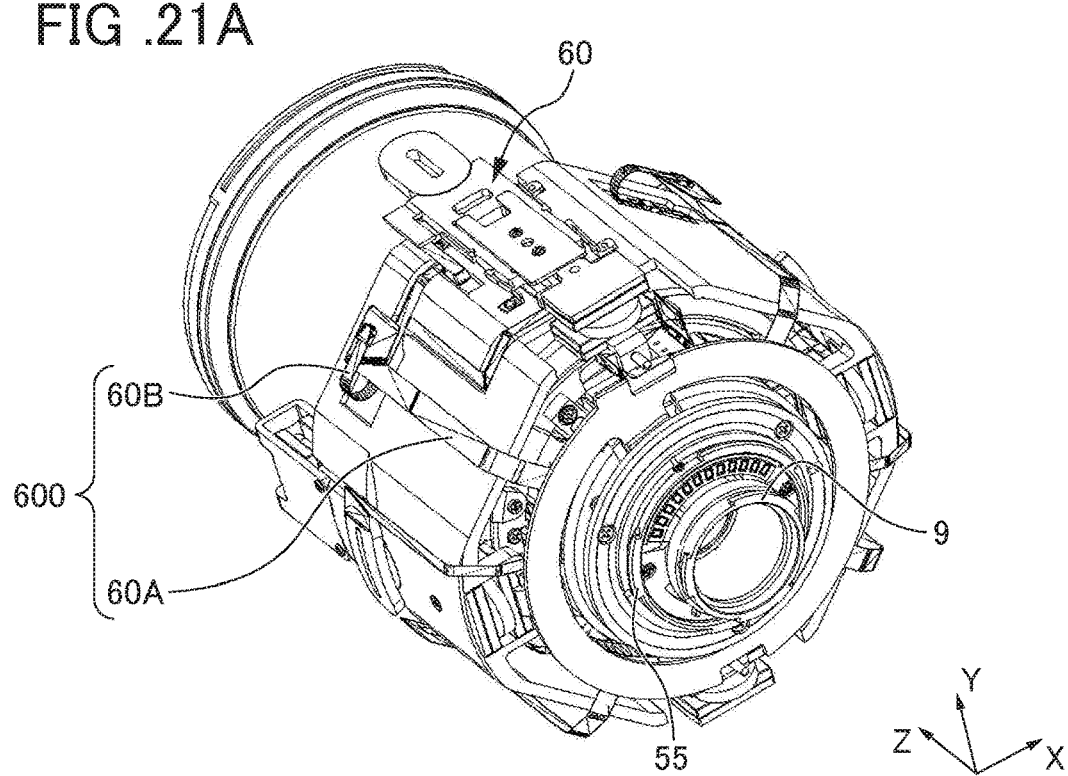
FIG. 21A and FIG. 21B are diagrams describing arrangements of flexible printed circuits that are connected to a pitch driving unit 20, the yaw driving unit 60 and a yaw auxiliary driving unit 90.
Figure 21B:
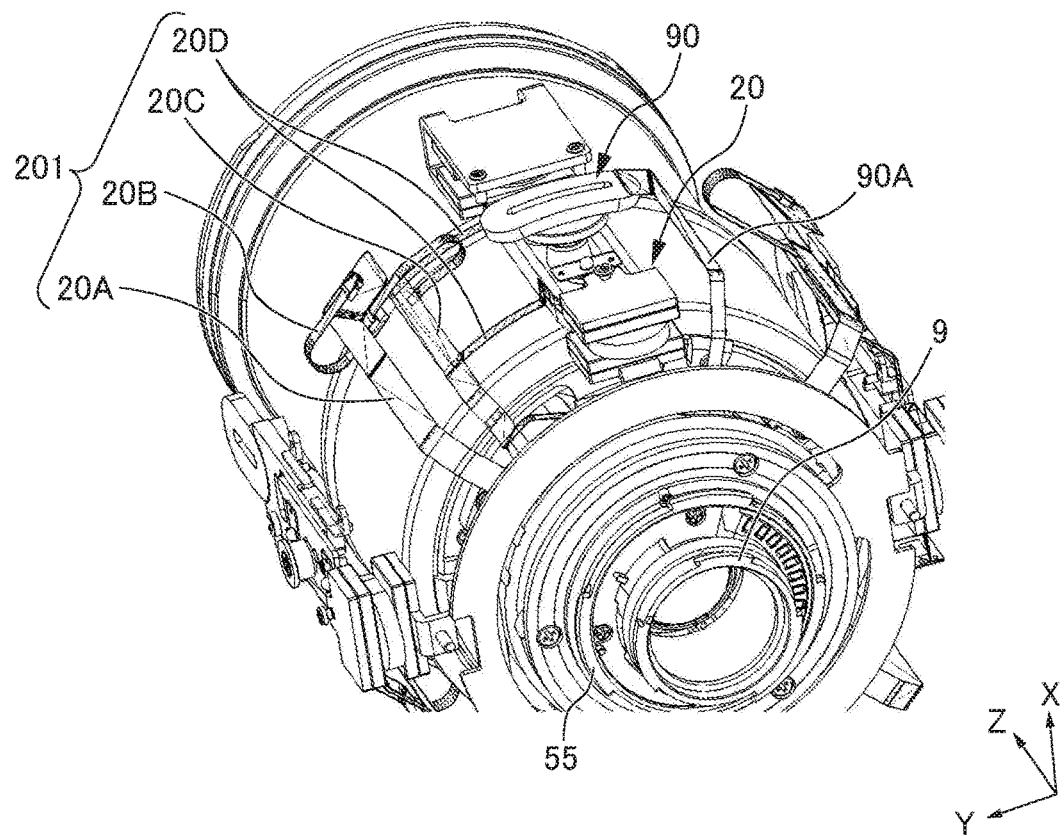

FIG. 21A and FIG. 21B are diagrams describing arrangements of flexible printed circuits (FPC) that are connected to the pitch driving unit 20, the yaw driving unit 60 and the yaw auxiliary driving unit 90.

As illustrated in FIG. 5B, FIG. 21A and FIG. 21B, an FPC 600 that is connected to the yaw driving unit 60 is provided with a light axis direction extension part 60A and a circumferential direction curved part 60B.

The light axis direction extension part 60A extends toward the subject side from the lens side inner mount 9.

The circumferential direction curved part 60B is connected to a subject side end portion of the light axis direction extension part 60A. The circumferential direction curved part 60B extends some way in the circumferential direction to the opposite side from the side thereof at which the yaw driving unit 60 is disposed, then changes direction (is formed into a loop) with a radius of curvature of at least 1.0 mm radius, and extends in the direction toward the yaw driving unit 60.

The FPC 201, which is connected to the pitch driving unit 20, is provided with a light axis direction extension part 20A, a circumferential direction curved part 20B, a light axis direction extension part 20C, and a connecting part 20D.

The light axis direction extension part 20A extends toward the subject side from the lens side inner mount 9.

The circumferential direction curved part 20B is connected to a light axis direction subject side end portion of the light axis direction extension part 20A.

The circumferential direction curved part 20B extends some way in the circumferential direction to the opposite side from the side thereof at which the pitch driving unit 20 is disposed, then changes direction (is formed into a loop) with a radius of curvature of at least 1.0 mm radius, and extends in the direction toward the pitch driving unit 20.

The light axis direction extension part 20C is connected to the circumferential direction curved part 20B, and extends in parallel with the light axis direction extension part 20A at a position that is closer to the pitch driving unit 20 than the light axis direction extension part 20A.

The connecting part 20D extends toward the pitch driving unit 20 from the light axis direction extension part 20C.

An FPC that is connected to the yaw auxiliary driving unit 90 in the present embodiment is provided with a light axis direction extension part 90A that extends toward the subject side from the lens side inner mount 9.

According to the present embodiment, in a diametric direction section (the X-Y plane) as illustrated in FIG. 5B, the FPC 600 is provided with the circumferential direction curved part 60B that includes slack in the circumferential direction. Because of this slack in the circumferential direction, the circumferential direction curved part 60B has a margin allowing movement in the light axis Z direction.

Therefore, movements when the second casing 10 and the first casing 30 move in the yaw direction relative to the fixed tube 50 are not impeded, and there is no problem of excessive force being applied to the FPC 600 and the FPC 600 breaking.

Meanwhile, because the FPC 201 is provided with the circumferential direction curved part 20B that includes slack in the circumferential direction, movements when the second casing 10 moves in the pitch direction relative to the fixed tube 50 and the first casing 30 are not impeded, and there is no problem of excessive force being applied to the FPC 201 and the FPC 201 breaking.

The first casing 30 includes a flat surface that is substantially orthogonal to a diagonal of the substantially octagonal shape. As illustrated in FIG. 5B, the fixed tube 50 also includes a flat surface that is substantially orthogonal to a diagonal of the substantially octagonal shape.

The FPCs 600 and 201 are fastened to these flat surfaces. Therefore, the FPCs 600 and 201 may be more securely fastened than in a structure in which FPCs are fastened to curved surfaces.

FPCs disposed between the first casing 30 and the second casing 10 include slack and FPCs disposed between the first casing 30 and the fixed tube 50 include slack. These respective slacks are in substantially opposite dispositions and orientations with respect to the diagonals.

These slacks are disposed at plural diagonal positions and are disposed to oppose one another across the light axis Z. Therefore, urging forces on the first casing 30 and the second casing 10 from the FPCs 600 and 201 cancel out and it is easier to balance forces.

Note that the arrangements may oppose one another across the X axis or the Y axis.

—Camera Body 2—

Now, the camera body 2 is described.

As illustrated in the system configuration diagram of FIG. 1, the camera body 2 is provided with a body inner shell 110 and a body outer shell 150 (a body fixed unit).

The body inner shell 110 is equipped with the imaging element 101, a body shake detection unit 102, a body rotation detection unit 104, a roll direction anti-vibration system 105, a body side inner mount 109, and a body control unit 103.

The imaging element 101 detects light incident through the image forming optical system (the lens unit L) and converts the light to electronic signals.

The body shake detection unit 102 is a gyro sensor or the like that detects rolling of the camera system 3.

The roll direction anti-vibration system 105, which is not described in detail here, corrects shakes in the roll direction of the camera system 3 by rotating the imaging element 101.

The body rotation detection unit 104 detects rotations of the imaging element 101.

The body control unit 103 receives outputs from the body shake detection unit 102 and outputs from the body rotation detection unit 104, and calculates driving amounts for the roll direction anti-vibration system 105.

The body side inner mount 109 is provided at a subject side end portion of the body inner shell 110 and is provided with a mechanical mount 191, communication contacts 192 and power supply contacts 193.

The body outer shell 150 is provided with a body side outer mount 151, which is a mechanical mount, a display unit 150A, a battery insertion unit 150B, and an operation member 150C. Below, the body side inner mount 109 and the body side outer mount 151 are together referred to where appropriate as a body mount 200.

It is sufficient that the camera body 2 be provided with at least the body side inner mount 109, the imaging element 101 and the body outer shell 150 (body fixed portion). The control member 150C, display unit 150A and the like need not be provided.

Figure 23:
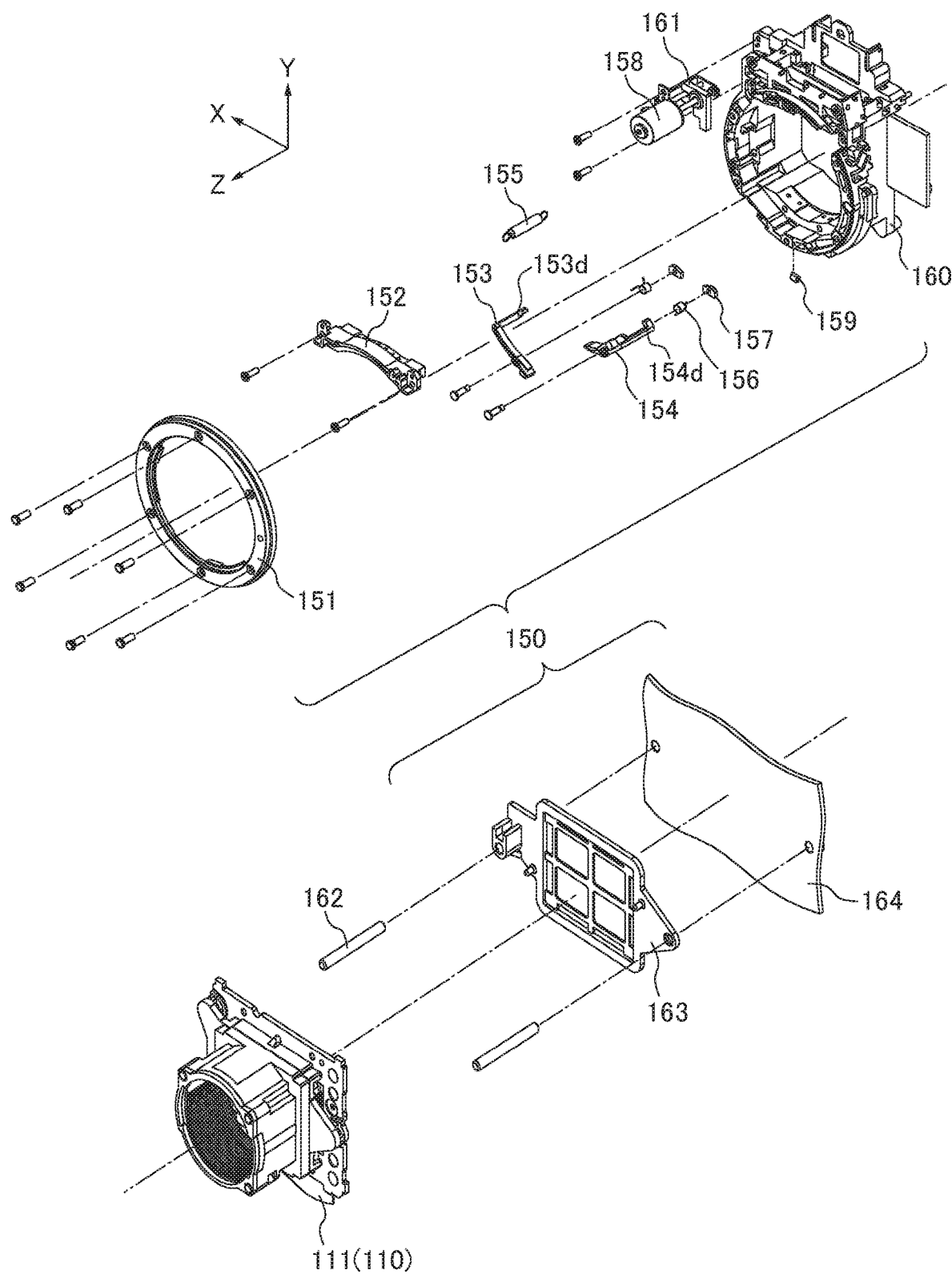
FIG. 23 is an exploded perspective view of peripheral portions of the camera body 2 in FIG. 22A to FIG. 22C.

FIG. 22A to FIG. 22C are views illustrating the interior of the camera body 2 according to the present embodiment. FIG. 22A is a side view, FIG. 22B is a front view, and FIG. 22C is a sectional view. FIG. 22B is a sectional view taken along line Z1-Z1 in FIG. 22C. FIG. 23 is an exploded perspective view of peripheral portions of the camera body 2 illustrated in FIG. 22A to FIG. 22C.

The body outer shell 150 of the camera body 2 is provided with the body side outer mount 151, a contact block 152, a first anchoring lever 153, a second anchoring lever 154, a release plate urging spring 155, an anchoring lever urging spring 156, an attachment nut 157, a stepper motor 158, a photoreflector 159, a housing 160 and a driving nut 161.

The body outer shell 150 of the camera body 2 is further provided with a guide pin 162, the release plate 163 and a fixed plate 164.

The body inner shell 110 of the camera body 2 is provided with an imaging element mounting-enabling block 111.

Figure 24:
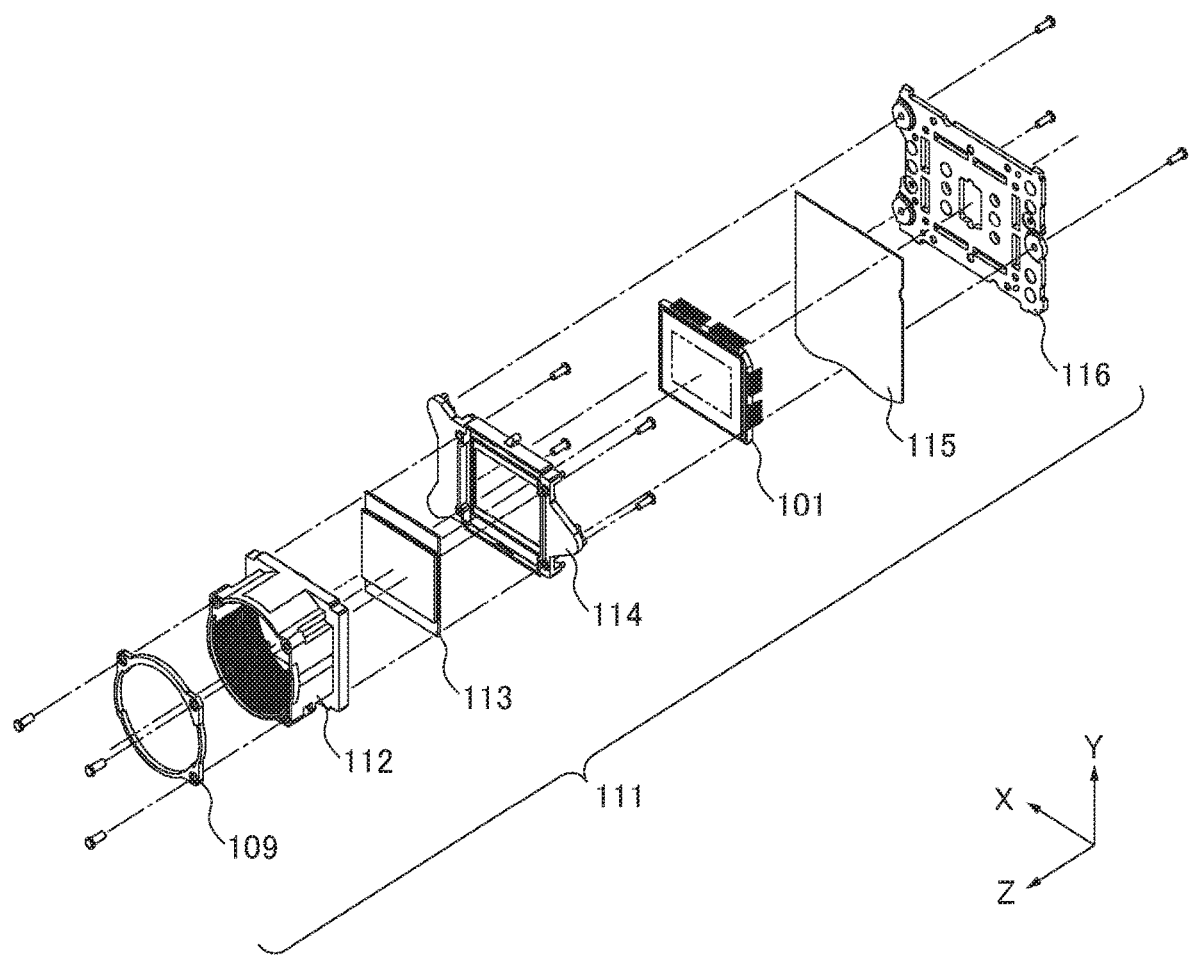
FIG. 24 is a partial exploded perspective view of FIG. 23.

FIG. 24 is a partial exploded perspective view of the imaging element mounting-enabling block 111 in FIG. 23.

As illustrated in FIG. 24, the imaging element mounting-enabling block 111 is provided with the body side inner mount 109, a first holder 112, a lowpass filter 113, a second holder 114, the imaging element 101, an imaging element FPC 115 and an attachment plate 116.

Figure 25A:
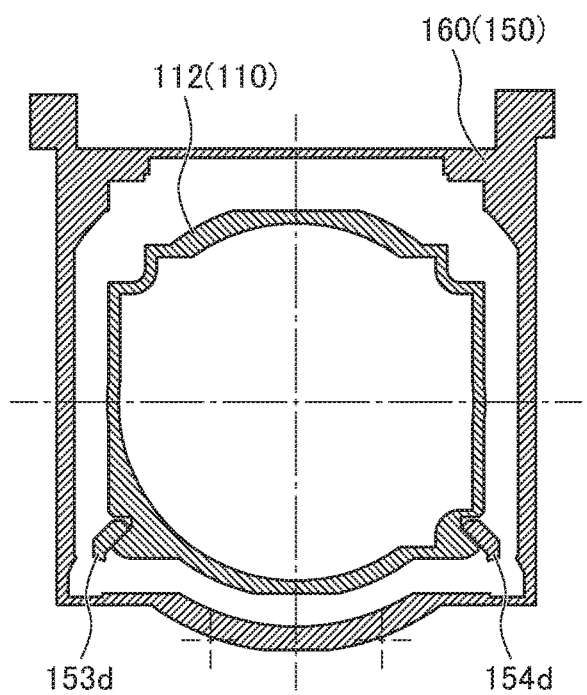
FIG. 25A and FIG. 25B depict a housing 160 of a body outer shell and a first holder 112 of a body inner shell 110.
Figure 25B:
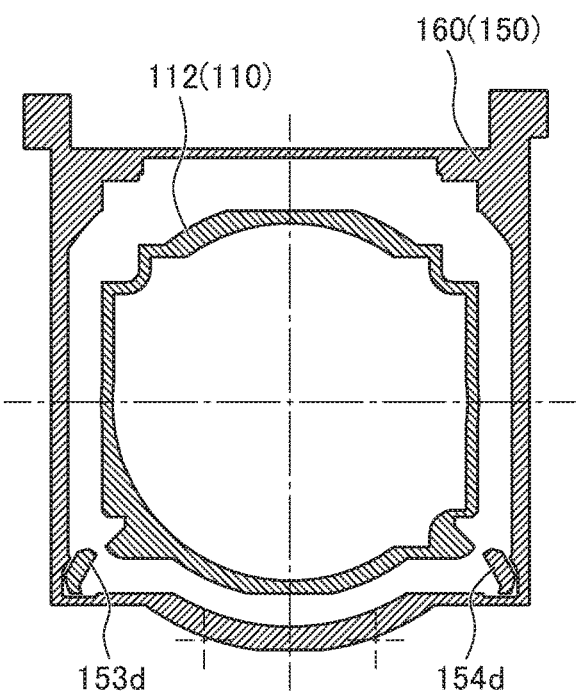

FIG. 25A and FIG. 25B depict the housing 160 of the body outer shell 150 and the first holder 112 of a body inner shell 110. FIG. 25A illustrates a state in which the body inner shell 110 and the body outer shell 150 are locked. FIG. 25B illustrates a state in which the body inner shell 110 and the body outer shell 150 are unlocked.

Figure 26A:
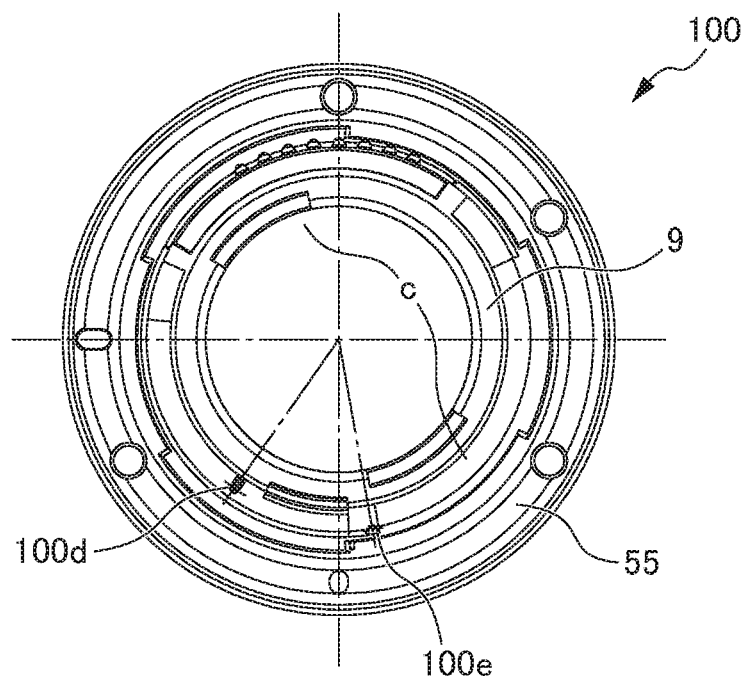
FIG. 26A and FIG. 26B are peripheral views of a lens side mount of the lens barrel 1.
Figure 26B:
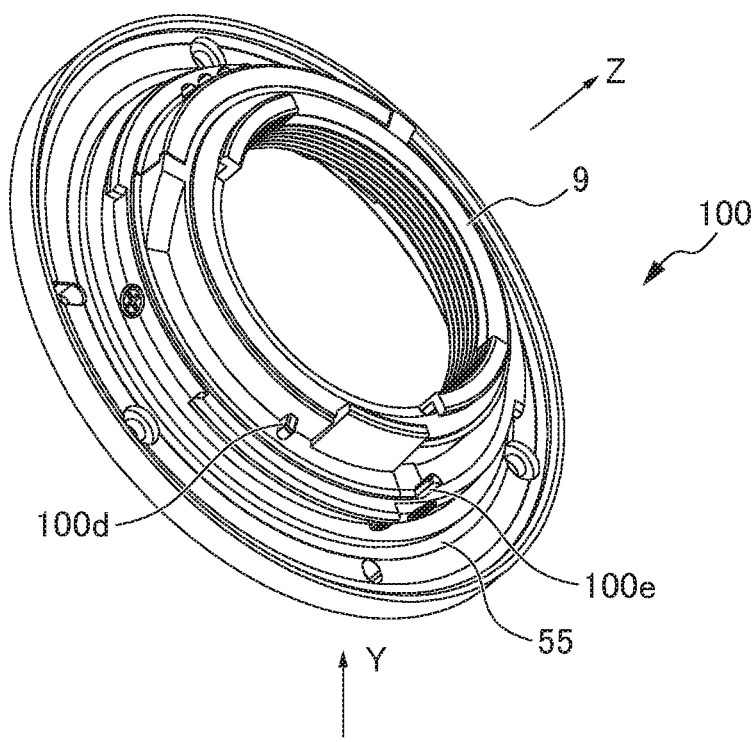

FIG. 26A and FIG. 26B are peripheral views of a lens side mount 100. FIG. 26A is viewed from a side thereof at which the camera body 2 is to be disposed. FIG. 26B is viewed in a diagonal direction from the side at which the camera body 2 is to be disposed. The lens side mount 100 includes the lens side inner mount 9 and the lens side outer mount 55. Two anchoring lever driving pins 100d and 100e are provided at the lens side mount 100.

Figure 27A:
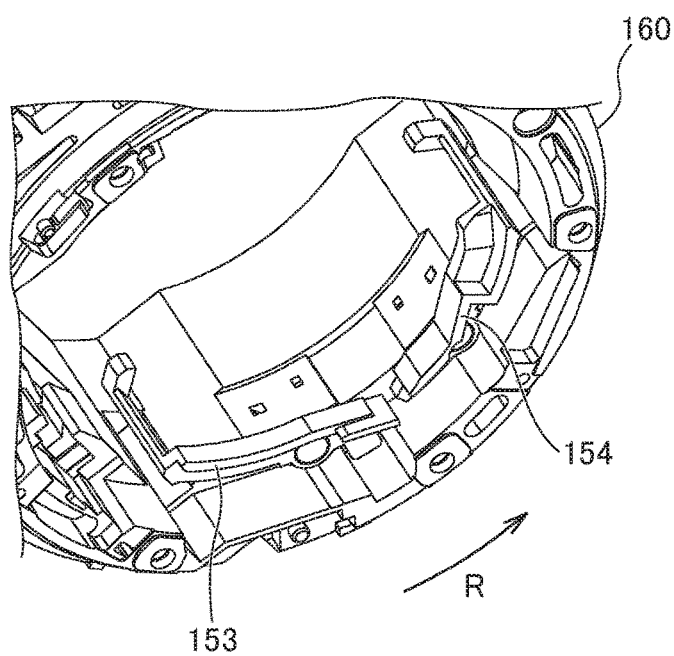
FIG. 27A is a diagram illustrating anchoring levers 153 and 154 in a state in which the anchoring levers 153 and 154 are inside the housing 160.
Figure 27B:
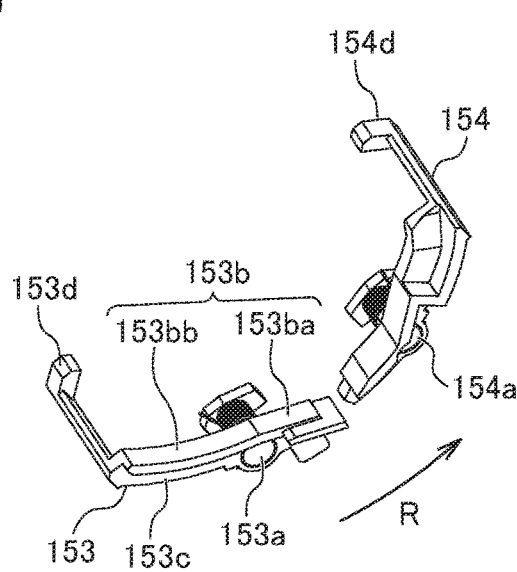
FIG. 27B is a diagram illustrating the anchoring levers 153 and 154 in a state in which the housing 160 is not present.

FIG. 27A is a diagram illustrating the anchoring levers 153 and 154 in a state in which the anchoring levers 153 and 154 are inside the housing 160. FIG. 27B is a diagram illustrating the anchoring levers 153 and 154 in a state in which the housing 160 is not present.

The first anchoring lever 153 is capable of swinging about a fixed shaft 153a.

The first anchoring lever 153 includes a sliding plate part 153b at an inner periphery side thereof. The sliding plate part 153b includes a portion that protrudes to the light axis side relative to an engaging lever main body 153c.

The sliding plate part 153b is a protruding part. The anchoring lever driving pin 100d provided at the lens side mount 100 of the lens barrel 1 moves so as to abut against an outer periphery face of the sliding plate part 153b.

The sliding plate part 153b includes a forward portion 153ba and a rearward portion 153bb with respect to a rotation direction R in which the lens side mount 100 relatively rotates when the lens side mount 100 is being mounted (the counterclockwise direction depicted in FIG. 27A and FIG. 27B). At the forward portion 153ba, a distal end portion relative to a connecting portion with the rearward portion 153bb is curved to the outer side (in the direction of increasing diameter from the light axis).

An arm extending in the −Z direction is provided at an end portion of the rearward portion 153bb of the first anchoring lever 153 (at the rearward side of the rotation direction R). A pawl part 153d is formed at a distal end of this arm.

The second anchoring lever 154 is capable of swinging about a fixed shaft 154a.

The second anchoring lever 154 includes a forward portion 154ba and a rearward portion 154bb with respect to the rotation direction R in which the lens side mount 100 relatively rotates when the lens side mount 100 is being mounted (the counterclockwise direction depicted in FIG. 27A and FIG. 27B). At the forward portion 154ba, a distal end portion relative to a connecting portion with the rearward portion 154*bb* is curved to the inner side (in the direction of decreasing diameter from the light axis).

The anchoring lever driving pin 100*e* provided at the lens side mount 100 of the lens barrel 1 moves so as to abut against inner periphery faces of the rearward portion 154*bb* and forward portion 154*ba*.

An arm extending in the −Z direction is provided at the distal end of the forward portion 154*ba* (at the forward side of the rotation direction R). A pawl part 154*d* is formed at a distal end of this arm.

Figure 28A:
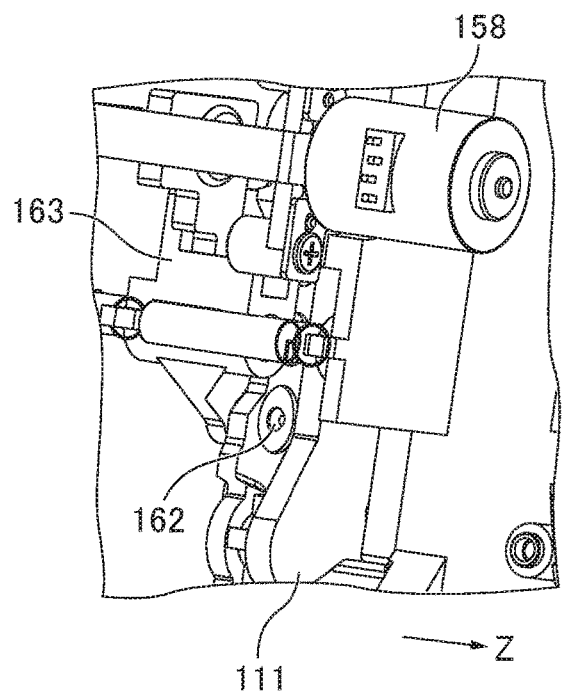
FIG. 28A is a diagram illustrating a relationship between an imaging element mounting-enabling block 111 and a release plate 163 at a release plate initial position, in a state in which the imaging element mounting-enabling block 111 is positioned at the housing 160.
Figure 28B:
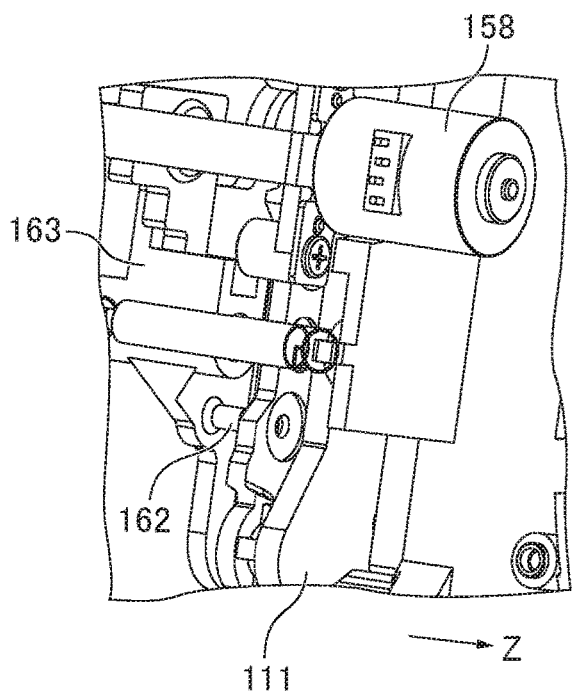
FIG. 28B is a diagram illustrating the relationship between the imaging element mounting-enabling block 111 and the release plate 163 at a release plate release position, in a state in which the positioning of the imaging element mounting-enabling block 111 at the housing 160 is released.
Figure 29A:
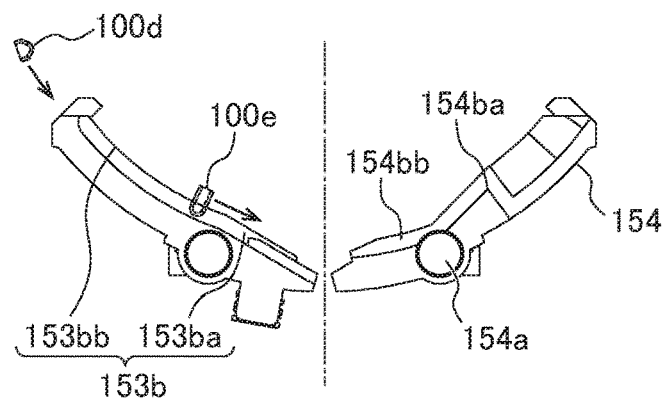
FIG. 29A to FIG. 29E are interlocking operation diagrams of the anchoring levers 153 and 154.
Figure 29B:
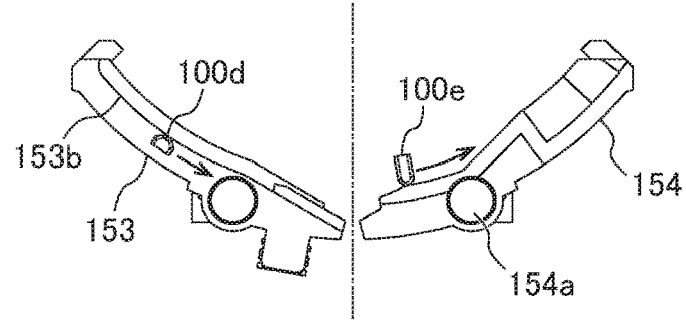
Figure 29C:
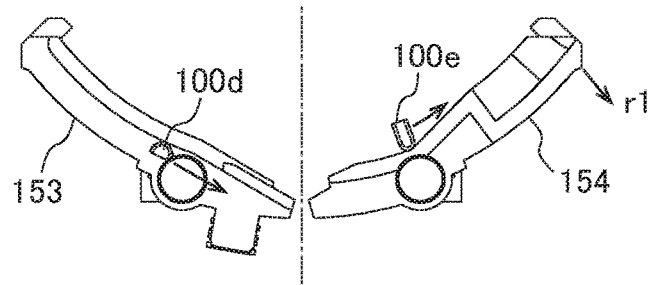
Figure 29D:
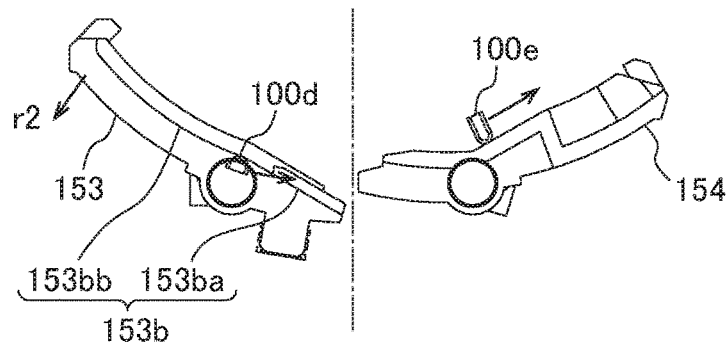
Figure 29E:
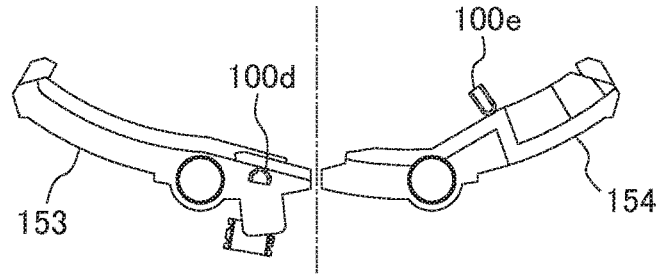

FIG. 28A is a diagram illustrating a relationship between the imaging element mounting-enabling block 111 and the release plate 163 at a release plate initial position, in a state in which the imaging element mounting-enabling block 111 is positioned at the housing 160. FIG. 28B is a diagram illustrating the relationship between the imaging element mounting-enabling block 111 and the release plate 163 at a release plate release position, in a state in which the positioning of the imaging element mounting-enabling block 111 at the housing 160 is released.

FIG. 29A to FIG. 29E are interlocking operation diagrams of the anchoring levers 153 and second anchoring lever 154 when the lens side mount 100 is being joined to the body mount 200.

(a) Step 1

In a state in which the lens side mount 100 and the body mount 200 are not yet joined, the anchoring lever driving pin 100*d* is disposed away from the two anchoring levers 153 and 154.

The anchoring lever driving pin 100*e* is disposed away from the second anchoring lever 154, at the same position in the circumferential direction as the sliding plate part 153*b* of the first anchoring lever 153 but not touching the sliding plate part 153*b*.

(b) Step 2

The lens side mount 100 is rotated to 35° from the state of Step 1.

The anchoring lever driving pin 100*e* touches the inner face of the second anchoring lever 154 and moves along the inner face. An abutting portion of the anchoring lever driving pin 100*e* against the inner face of the second anchoring lever 154 stays at the same distance from the light axis Z, and the second anchoring lever 154 does not move.

The anchoring lever driving pin 100*d* touches the outer face of the sliding plate part 153*b* of the first anchoring lever 153 and moves along the outer face. An abutting portion of the anchoring lever driving pin 100*d* against the outer face of the sliding plate part 153*b* stays at the same distance from the light axis Z. Therefore, the first anchoring lever 153 does not swing (c) Step 3

The lens side mount 100 is rotated to 45° from the state of Step 1.

The anchoring lever driving pin 100*e* starts to touch the inner face of the forward portion 154*ba* of the second anchoring lever 154. Because the distal end portion of the forward portion 154*ba* relative to the connecting portion with the rearward portion 154*bb* is curved to the inner side (the direction of decreasing diameter from the light axis), and the anchoring lever driving pin 100*e* moves at a constant distance from the light axis Z, the anchoring lever driving pin 100*e* pushes the forward portion 154*ba* of the second anchoring lever 154 to the outer side.

As a result, the second anchoring lever 154 turns in the clockwise direction in the drawings about the fixed shaft 154*a* (arrow r1).

The pawl part 154*d* moves outward; the pawl part 154*d* moves away from the first holder 112 as illustrated in FIG. 25B.

At this time, the anchoring lever driving pin 100*d* is touching the outer face of the sliding plate part 153*b* of the first anchoring lever 153, but because the outer face is at a constant diameter from the light axis Z, the first anchoring lever 153 does not swing (d) Step 4

The lens side mount 100 is rotated to 50° from the state of Step 1.

Because the anchoring lever driving pin 100*e* is pushing the forward portion 154*ba* of the second anchoring lever 154 to the outer side, the pawl part 154*d* moves outward and the state in which the pawl part 154*d* is distant from the first holder 112 as illustrated in FIG. 25B is maintained.

At this time, the anchoring lever driving pin 100*d* starts to touch against the outer face of the forward portion 153*ba* of the sliding plate part 153*b*.

Because the distal end portion of the forward portion 153*ba* relative to the connecting portion with the rearward portion 153*bb* is curved to the outer side (the direction of increasing diameter from the light axis), the anchoring lever driving pin 100*d* pushes the outer face of the forward portion 154*ba* of the first anchoring lever 15 to the inner side.

As a result, the first anchoring lever 153 turns in the counterclockwise direction in the drawings about the fixed shaft 154*a* (arrow r2).

(e) Step 5

The lens side mount 100 is rotated to 60° from the state of Step 1.

Because the anchoring lever driving pin 100*e* is pushing the forward portion 154*ba* of the second anchoring lever 154 to the outer side, the pawl part 154*d* moves outward and the state in which the pawl part 154*d* is distant from the first holder 112 as illustrated in FIG. 25B is maintained.

Because the anchoring lever driving pin 100*d* is pushing the forward portion 153*ba* of the first anchoring lever 153 to the inner side, the pawl part 153*d* moves outward and the state in which the pawl part 153*d* is distant from the first holder 112 as illustrated in FIG. 25B is maintained.

When the second pin disengages, the photoreflector responds. Triggered by the response of the photoreflector, the stepper motor 158 illustrated in FIG. 28A and FIG. 28B starts driving, the release plate 163 illustrated in FIG. 28A and FIG. 28B is withdrawn, and the body inner shell 110 and body outer shell 150 are separated.

According to the present embodiment, a lens barrel may be provided that is removeably attachable to an image pickup unit, and that includes: the fixed tube 50 that is fixed to the body outer shell 150 enclosing the imaging element 101; the lens unit L that forms a subject image on the imaging element 101; and the support unit 40 that supports at least a portion of the lenses of the lens unit L. The support unit 40 is removeably attachable to the imaging element 101 and is relatively moveable by rotation with respect to the fixed tube 50 about at least two axes that are substantially orthogonal to the light axis of the lens unit L.

The imaging element 101 is in a fixed state with respect to the body outer shell 150 when the lens barrel 1 is not mounted. When the lens barrel 1 is mounted, the imaging element 101 is in an unfixed state with respect to the body outer shell 150, which is referred to as a detached state.

According to the present embodiment, an anchoring structure between the body inner shell 110 and the body outer shell 150 is constituted in both a thrust direction and radial directions. In a previous lens attachment rotation operation, mechanical anchoring between the body inner shell 110 and the body outer shell 150 would be released in steps.

The body inner shell 110 is connected with the second casing 10 of the lens barrel 1, and the body outer shell 150 is connected with the fixed tube 50 of the lens barrel 1. The body inner shell 110 can be rotated together with the second casing 10 of the lens barrel 1 about the pitch axis P and about the yaw axis Y of the second casing 10 with respect to the body outer shell 150 and the fixed tube 50 of the lens barrel 1.

Types of shake differ between video imaging and still imaging. Moreover, angles of shake increase over a long imaging duration. Accordingly, a widening of shake correction angles that can be corrected is called for. According to the present embodiment, a lens barrel that is removeably attachable to an image pickup unit and that is capable of correcting large shakes may be provided.

If an anchoring operation and an anchoring release operation were performed as single operations, the completely unanchored imaging element mounting-enabling block 111 would have to be fixed at both sides at the same time and would be hard to fix.

In contrast, according to the present embodiment, the anchoring operation between the body inner shell 110 and the body outer shell 150 and the anchoring release operation are assuredly in steps, with two or more successive operations. Thus, fixing is easier.

The camera body 2 according to the embodiment is provided with the body side inner mount 109 and the body side outer mount 151. However, even if a lens barrel that is not provided with a lens side inner mount is to be attached, the lens side mount thereof can be removeably attached to the body side outer mount 151. Therefore, a lens barrel that is not provided with a lens side inner mount may be mounted.

The anchoring structure between the body side inner mount 109 (the body inner shell 110) and the body side outer mount 151 (the body outer shell 150, which is a body fixed unit) is not particularly limited. As an alternative to mechanical anchoring as in the present embodiment, structures that anchor with electromagnetic force are possible.

In the example described above, a case is described in which the body inner shell 110 and the body outer shell 150 are locked physically (mechanically). In the above descriptions, the pawl parts 153*d* and 154*d* are provided at the body outer shell 150. However, a mechanism in which the pawl parts 153*d* and 154*d* are provided at the body inner shell 110 and the locking is conducted from the body inner shell 110 is possible. A mechanism in which the body outer shell 150 and the body inner shell 110 are both provided with the pawl parts 153*d* and 154*d* and the locking is conducted from both sides is also possible.

Moreover, structures are not limited to physical (mechanical) locking. For example, the body inner shell 110 may be locked using electromagnetic force. In this case, the body inner shell 110 may be retained (locked) by electromagnetic force with the body inner shell 110 having free play from the body outer shell 150, and the body inner shell 110 may be adhered and locked to a portion of the body outer shell 150 by electromagnetic force.

The locked state referred to herein is not limited to a state in which the body inner shell 110 and the body outer shell 150 are relatively immovable. To be specific, it is sufficient if a movement range of the body inner shell 110 is limited to an extent such that the body inner shell 110 does not touch the body outer shell 150. When the lens barrel is being mounted, it is sufficient if positions of the body inner shell 110 relative to the body outer shell 150 are limited to a range in which the lens barrel can be mounted to the camera body easily. The movement range of the body inner shell 110 relative to the body outer shell 150 can be switched between the locked state and the unlocked state. To be specific, if the movement range of the body inner shell 110 in the unlocked state is a first range, the movement range of the body inner shell 110 in the locked state is limited to a second range that is smaller than the first range. The second range is a range that is encompassed by the first range.

In the example described above, a case is described in which a manual rotation operation by a user when mounting the lens barrel 1 to the camera body 2 is utilized as a drive source for unlocking the body inner shell 110 from the body outer shell 150. This is not limiting; for example, unlocking may be triggered by a connection between the body side inner mount 109 and the lens side inner mount 9 being electronically detected. In this case, an electronic actuator is utilized as a drive source for locking the body inner shell 110 and the body outer shell 150. Alternatively, an urging force from a spring or the like is utilized as a drive source for locking the body inner shell 110 and the body outer shell 150.

As described above, the lens barrel 1 is equipped with the shift direction anti-vibration system 4 including the anti-vibration optical system LB that moves in the X and Y directions (the shift directions) (shake correction operations by the shift direction anti-vibration system 4 are referred to herein as lens shift shake correction). The lens barrel 1 may also provided shake correction operations that move the anti-vibration optical system LB in a tilt direction (referred to herein as lens tilt shake correction).

As shake correction operations using the pitch driving unit 20 and the yaw driving unit 60, the lens barrel 1 and camera body 2 according to the present embodiment are equipped with shake correction operations that drive the imaging element 101 of the body inner shell 110 of the camera body 2 and the lens unit L of the second casing 10 of the lens barrel 1 integrally (referred to herein as integral driving shake correction). In the integral driving shake correction, the body inner shell 110 and the lens inner shell operate interlockingly. That is, the body inner shell 110 is driven to operate interlockingly with driving of the lens inner shell by the pitch driving unit 20 and yaw driving unit 60 provided at the lens barrel.

Furthermore, the camera body 2 according to the present embodiment is equipped with the roll direction anti-vibration system 105 that rotates the imaging element 101 (referred to herein as imaging element roll shake correction).

Shake correction operations that operate to shift the imaging element 101 may also be provided (referred to herein as imaging element shift shake correction). Shake correction operations that operate the imaging element 101 in the tilt direction may be provided too (referred to herein as imaging element tilt shake correction).

In the example described above, a case is described in which the body inner shell 110 and the body outer shell 150 are unlocked interlockingly with a manual rotation operation by a user when mounting the lens barrel 1 to the camera body 2. That is, an example is described in which the movement range of the body inner shell 110 is the first range when the lens barrel 1 is mounted to the camera body 2 (when the lens inner shell and the body inner shell 110 have been connected). However, this is not limiting; for example, the locking may be unlocked in accordance with an imaging mode selected by a photographer. The camera may judge a present imaging environment (imaging conditions) and unlock the locking automatically. The photographer may instruct unlocking by operations to input details of shake correction to be implemented or the like, using a mode dial, a mode button, a touch panel, another operation input member or the like. The locking may be unlocked and the movement range of the body inner shell 110 may be switched from the second range (which is smaller than the first range) to the first range.

For example, as an example of unlocking in accordance with an imaging mode, the body inner shell 110 and the body outer shell 150 need not be unlocked and integral driving shake correction need not be implemented when the camera is in a still imaging mode. At this time, it is sufficient to implement lens shift shake correction, lens tilt shake correction, imaging element roll shake correction, imaging element shift shake correction and imaging element tilt shake correction or the like. When in the still imaging mode, because there is a high likelihood of small shakes from shutter shock (shake that occurs when the user presses the shutter button) and the like, lens shift shake correction and the like are likely to be suitable for small shake corrections. When the camera is in a video imaging mode, the body inner shell 110 and the body outer shell 150 may be unlocked and integral driving shake correction may be implemented. At this time, lens shift shake correction, lens tilt shake correction, imaging element shift shake correction, imaging element roll shake correction and imaging element tilt shake correction may be implemented or not implemented. When in the video imaging mode, there is a high likelihood of large shakes occurring when the camera is imaging while moving. Accordingly, implementing integral driving shake correction is likely to be more capable of correcting the large shakes. A higher level of shake correction may be achieved by implementing lens shift shake correction, lens tilt shake correction, imaging element roll shake correction, imaging element shift shake correction and imaging element tilt shake correction or the like simultaneously. Thus, the movement range of the body inner shell 110 may be switched in accordance with imaging modes.

The body inner shell 110 and the body outer shell 150 may be kept locked together at non-imaging times (when there is no power source applied, when the camera is in a playback mode, when the lens barrel is in the collapsed state and the like) even if the lens barrel is mounted to the camera body. This is because integral driving shake correction is not implemented at non-imaging times.

As an example of unlocking in accordance with the imaging environment (imaging conditions), unlocking in accordance with specified shutter speeds can be considered. For example, the locking between the body inner shell 110 and the body outer shell 150 may be unlocked and integral driving shake correction implemented when the shutter speed is specified to be longer than a predetermined duration.

When panning is to be performed, the locking may be unlocked when, for example, the camera is held in the normal position and panning in the horizontal direction is performed. Just one kind of integral driving shake correction may be implemented, such as implementing driving of the pitch driving unit 20 but not driving of the yaw driving unit 60, or the like. Driving of the yaw driving unit 60 and driving of the pitch driving unit 20 may be implemented with weightings. Determinations as to whether panning is being performed and of the direction of panning may be carried out automatically by the camera body 2, or may be selectively instructed by a user. Determinations may be made automatically by providing various sensors such as an acceleration sensor and the like.

Using detection values obtained from widely known sensors provided at the camera body 2 and the lens barrel 1, such as acceleration sensors, gyro sensors, distance sensors and the like, a control unit may make comprehensive determinations, determine which kinds of shake correction operations to implement, and implement switching. For example, when a sensor provided at the camera body 2 or the lens barrel 1 detects shake smaller than a predetermined value, integral driving shake correction may be implemented without unlocking the body inner shell 110 from the body outer shell 150. At this time, other kinds of shake correction may also be implemented. When the sensor detects shake larger than the predetermined value, the body inner shell 110 and the body outer shell 150 may be unlocked and integral driving shake correction may be implemented.

Thus, the movement range of the body inner shell 110 may be switched in accordance with the imaging environment (imaging conditions).

The invention is not limited to structures in which locking and unlocking of the body inner shell 110 and the body outer shell 150 is based on attachment or removal of the lens barrel 1 or the various examples described above. For example, a manual operation member (switch) for locking and unlocking the body inner shell 110 and the body outer shell 150 may be provided at the camera body 2. Locking operations and unlocking operations may be implemented using driving force from this manual operation member in accordance with manual operations by a user. That is, locking operations and unlocking operations may be implemented by the user moving the manual operation member provided at the camera body 2.

Further, an unlocking button may be displayed at a display unit equipped with a touch panel, and the locking may be unlocked when a touch of the unlocking button is detected.

It is acceptable if an actuator based on user operation as described above operates to unlock the locking. Thus, the movement range of the body inner shell 110 may be switched on the basis of user operations.

A manual operation member (switch) may be provided at the lens barrel.

As described above, whether or not to unlock the locking of the body inner shell 110 to the body outer shell 150 may be determined in accordance with various conditions. When integral driving shake correction is not to be implemented, locking between the body inner shell 110 and body outer shell 150 of the camera body 2 is executed, and when integral driving shake correction is to be implemented, the locking between the body inner shell 110 and the body outer shell 150 is unlocked. Whether or not to unlock the locking between the body inner shell 110 and the body outer shell 150 may be determined by whether or not the user intends to implement integral driving shake correction. The locked state and unlocked state may be switched between in accordance with various conditions as described above.

Further yet, the body inner shell 110 and body outer shell 150 may be locked by a cap that is mounted to the body mount when no lens is mounted.

Lens shift shake correction, lens tilt shake correction, integral driving shake correction, imaging element roll shake correction, imaging element shift shake correction and imaging element tilt shake correction may be combined as appropriate. That is, one type or plural types of shake correction may be selectively combined, or all may be driven at the same time. The kinds of shake correction to be implemented may be switched on the basis of an imaging mode selected by a photographer. The camera may judge a present imaging environment (imaging conditions) and switch the shake correction automatically. A photographer may instruct the details of the shake correction to be implemented by an input operation using a mode dial, a mode button, a touch panel or another control input member, or the like.

For example, as an example of switching in accordance with the imaging mode, when the camera is in the still imaging mode, any of lens shift shake correction, lens tilt shake correction, imaging element shift shake correction, imaging element roll shake correction and imaging element tilt shake correction may be implemented but integral driving shake correction not implemented. As described above, the other kinds of shake correction are likely to be appropriate when the camera is in the still imaging mode. When the camera is in the video imaging mode, integral driving shake correction may be implemented and the other kinds of shake correction not implemented. As described above, integral driving shake correction is likely to be capable of correcting large shakes when the camera in the video imaging mode.

Using detection values obtained from widely known sensors provided at the camera body 2 and the lens barrel 1, such as acceleration sensors, gyro sensors, distance sensors and the like, the control unit may make comprehensive determinations, determine which kinds of shake correction operations to implement, and implement switching. For example, when a sensor provided at the camera body 2 or the lens barrel 1 detects shake smaller than a predetermined value, lens shift shake correction, lens tilt shake correction, imaging element shift shake correction, imaging element roll shake correction and imaging element tilt shake correction may be implemented. When the sensor detects shake larger than the predetermined value, integral driving shake correction may be implemented.

As a further example of switching in accordance with the imaging environment (imaging conditions), switching in accordance with specified shutter speeds can be considered. For example, the camera may switch to implementing integral driving shake correction when the shutter speed is specified to be longer than a predetermined duration.

When panning is to be performed, for example, when the camera is held in the normal position and panning in the horizontal direction is performed, just one kind of integral driving shake correction may be implemented, such as implementing driving of the pitch driving unit 20 but not driving of the yaw driving unit 60, or the like. Driving of the yaw driving unit 60 and driving of the pitch driving unit 20 may be implemented with weightings. Determinations as to whether panning is being performed and of the direction of panning may be carried out automatically by the camera body 2, or may be selectively instructed by a user. Determinations may be made automatically by providing various sensors such as an acceleration sensor and the like.

These descriptions focus on locking between the body inner shell 110 and the body outer shell 150, but this is not limiting. The lens inner shell may be locked to the lens outer shell. For example, the lens inner shell may be locked to the lens outer shell when switching from integral driving shake correction to lens shift shake correction. Accordingly, the locking may be closer to the center of gravity and the locking is stable.

Second Embodiment

Figure 31:
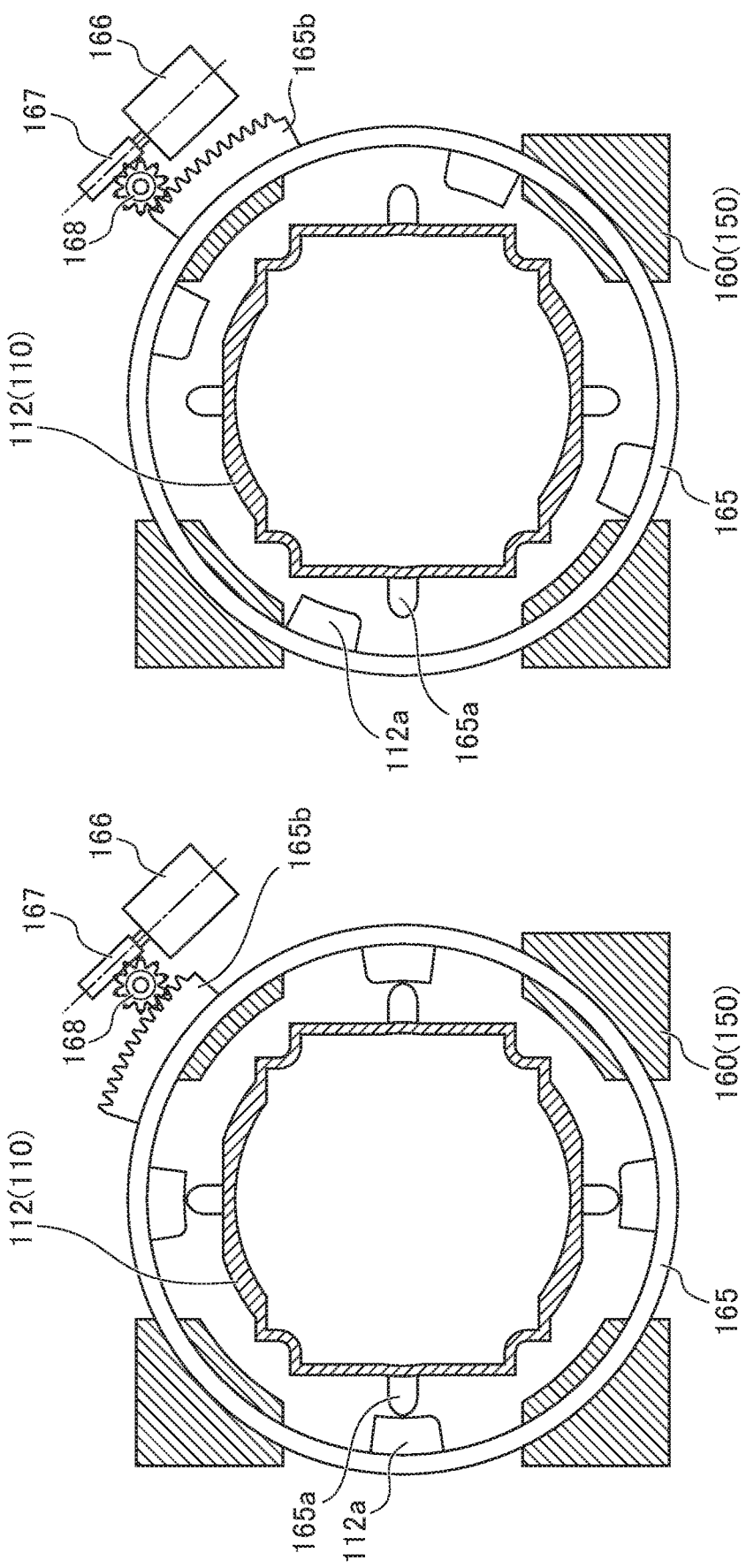
FIG. 31A and FIG. 31B are diagrams illustrating a second embodiment of the camera body 2.

FIG. 31A and FIG. 31B are diagrams illustrating a second embodiment of the camera body 2.

A mode of locking of the first holder 112 of the body inner shell 110 differs from the first embodiment. Otherwise, the camera body 2 according to the second embodiment is similar to the camera body 2 according to the first embodiment. Accordingly, portions that achieve the same functions as in the first embodiment described above are assigned the same reference numerals and duplicative descriptions are omitted as appropriate.

FIG. 31A illustrates a state in which the body inner shell 110 and body outer shell 150 are locked, and FIG. 31B illustrates a state in which the body inner shell 110 and body outer shell 150 are unlocked.

In the second embodiment as illustrated in FIG. 31A and FIG. 31B, a DC motor 166 is attached to the body outer shell 150 or a member that is fixed to the body outer shell 150. The DC motor 166 includes a worm gear 167 at an output shaft thereof.

A lock ring 165 is rotatably attached to the housing 160 of the body outer shell 150.

A gear portion 165b is provided at a portion of the outer periphery of the lock ring 165. A gear member 168 is disposed between the worm gear 167 and the gear portion 165b.

When the body inner shell 110 is being locked, the DC motor 166 is driven, the worm gear 167 is rotated, and the lock ring 165 is rotated via the gear member 168 and the gear portion 165b.

Accordingly, a protruding part 165a provided at the inner periphery side of the lock ring 165 contacts and is arrested by a protrusion 112a provided at the outer periphery side of the first holder 112 of the body inner shell 110.

Thus, the first holder 112 of the body inner shell 110 is fixed.

Hence, the body inner shell 110 and body outer shell 150 are connected.

When the body inner shell 110 is being unlocked, the DC motor 166 drives in the opposite direction to during the locking operation, and the worm gear 167 is rotated in the opposite direction to during the lock operation. As a result, the lock ring 165 is rotated in the opposite direction via the gear member 168 and the gear portion 165b.

Accordingly, the protruding part 165a provided at the inner periphery side of the lock ring 165 goes into a state of non-contact with the protrusion 112a provided at the outer periphery side of the first holder 112 of the body inner shell 110, and the fixing of the first holder 112 of the body inner shell 110 is released. Hence, the connection between the body inner shell 110 and the body outer shell 150 is released.

A spur gear may be used instead of the worm gear 167. Widely known technologies may be employed provided driving force can be assured. A piezoelectric element may be used to assure driving force.

Thus, because connecting parts that connect the body inner shell 110 with the body outer shell 150 are included, the movement range of the body inner shell 110 may be switched between the first range (a movement range when the body inner shell 110 is unlocked) and the second range (a movement range when the body inner shell 110 is locked). The connecting parts referred to here may be arbitrary combinations of the worm gear 167, the DC motor 166, the lock ring 165 and the gear member 168; other structures may also be combined.

Third Embodiment

Figure 32:
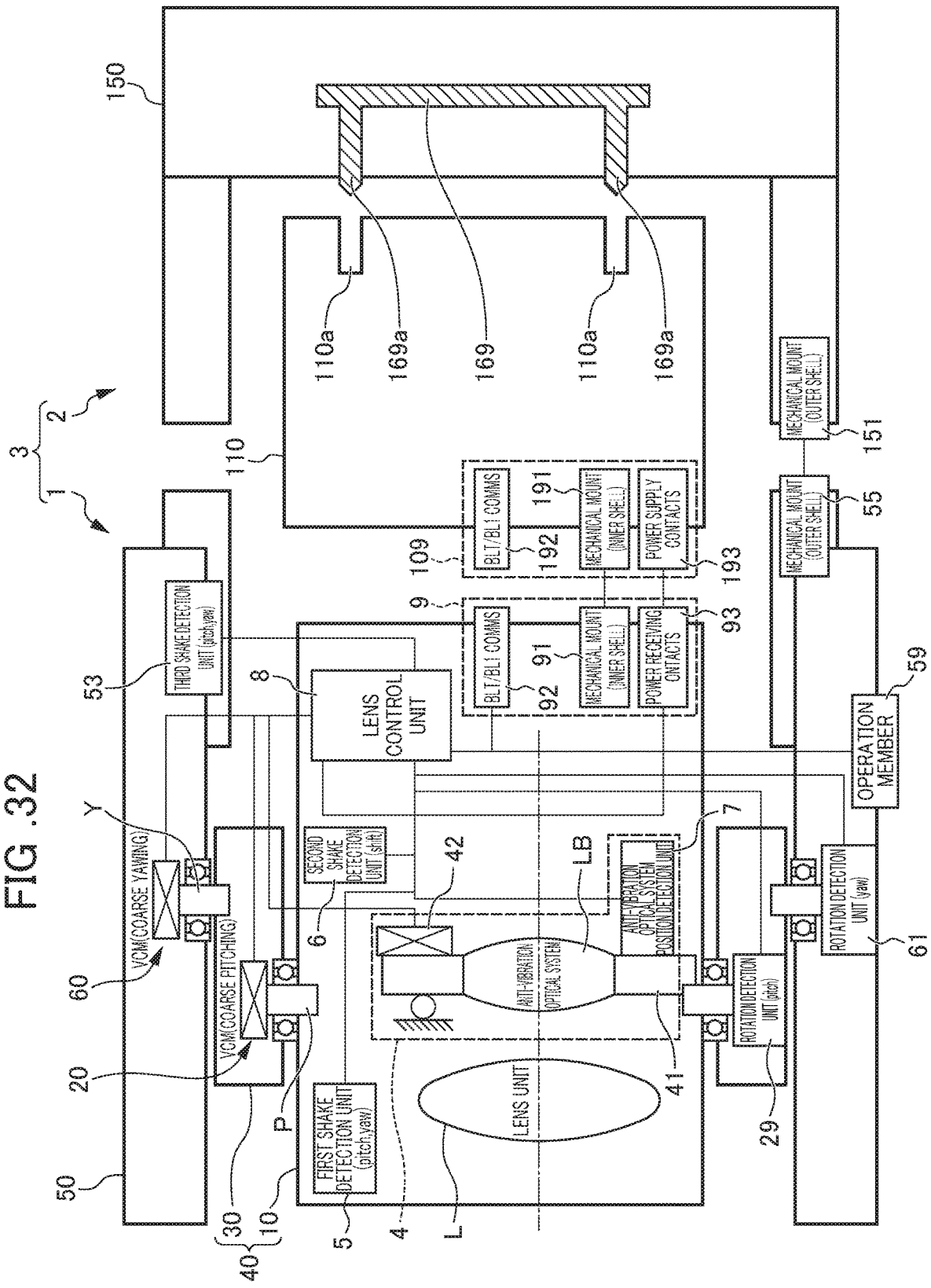
FIG. 32 is a diagram illustrating an unlocked state of the camera body 2 according to a third embodiment.

FIG. 32 is a diagram illustrating an unlocked state of the camera body 2 according to a third embodiment.

Figure 33:
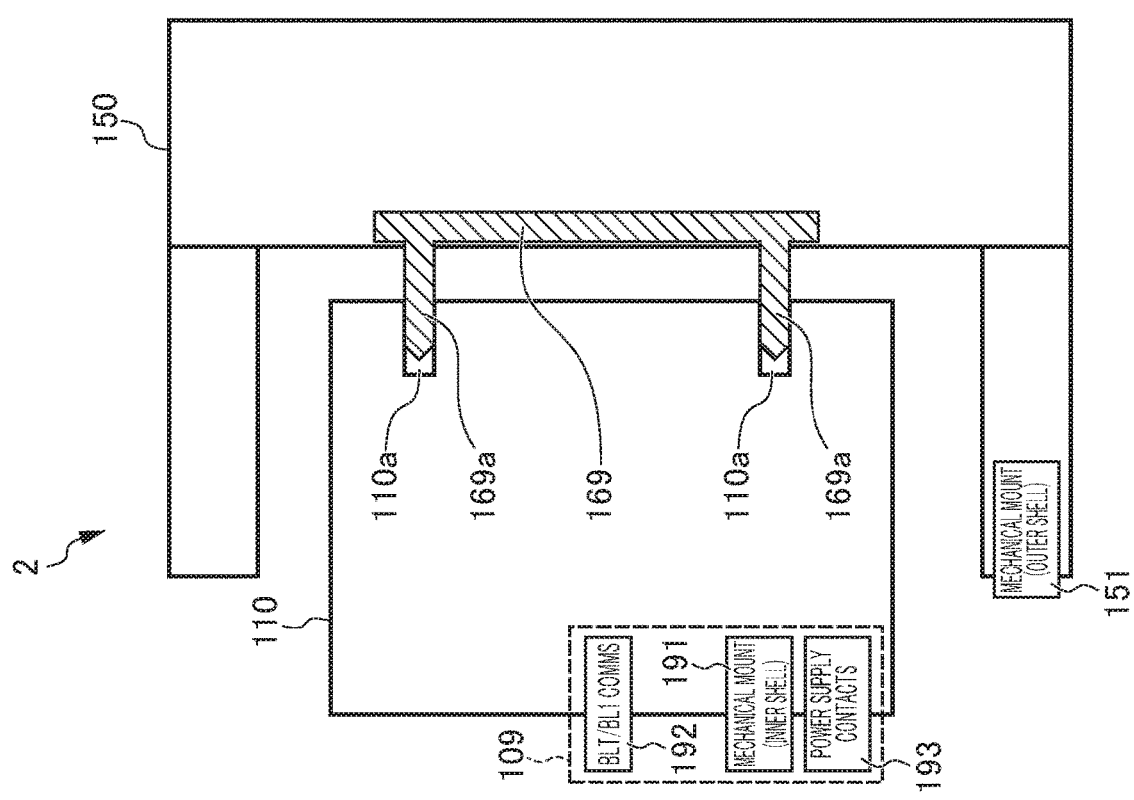
FIG. 33 is a diagram illustrating a locked state of the camera body 2 according to the third embodiment.

FIG. 33 is a diagram illustrating a locked state of the camera body 2 according to the third embodiment.

A mode of locking of the body inner shell 110 differs from the first embodiment. Otherwise, the camera body 2 according to the third embodiment is similar to the camera body 2 according to the first embodiment. Accordingly, portions that achieve the same functions as in the first embodiment described above are assigned the same reference numerals and duplicative descriptions are omitted as appropriate.

In the camera body 2 according to the third embodiment, plural hole portions 110*a* are provided in the body inner shell 110. The hole portions 110*a* are depicted as having bottoms in the drawings, but may be penetrating holes. A lock member 169 is provided at the body outer shell 150. Plural insertion parts 169*a* that can be inserted into the hole portions 110*a* are provided at the lock member 169. The lock member 169 can be driven by an actuator, which is not illustrated in the drawings, to insert the insertion parts 169*a* into the hole portions 110*a* and put the body inner shell 110 into a locked state (FIG. 33), or withdraw the insertion parts 169*a* from the hole portions 110*a* and put the body inner shell 110 into an unlocked state (FIG. 32). Thus, because connecting parts that connect the body inner shell 110 with the body outer shell 150 are included, the movement range of the body inner shell 110 may be switched between the first range (a movement range when the body inner shell 110 is unlocked) and the second range (a movement range when the body inner shell 110 is locked). The connecting parts referred to here may be arbitrary combinations of the lock member 169 and the actuator; other structures may also be combined. The actuator that drives the lock member 169 may employ, for example, an electric actuator, or may employ an actuator that obtains driving force from a manual rotation operation when the lens barrel 1 is being mounted (a manual operation interlocking mechanism).

Fourth Embodiment

The camera body 2 according to a fourth embodiment is provided with an elastic member between the body inner shell 110 and the body outer shell 150. The elastic member may be a member featuring elastic force such as a spring, a rubber, a gel, a pad or the like. For example, springs are connected between the body inner shell 110 and the body outer shell 150. During integral driving shake correction, the body inner shell 110 is driven interlockingly with driving of the lens inner shell by the pitch driving unit 20 and yaw driving unit 60 provided at the lens barrel. That is, the body inner shell is driven by driving force of the pitch driving unit 20 and yaw driving unit 60. When integral driving shake correction is not being implemented, the body inner shell is supported at the body outer shell by the springs.

Therefore, effects similar to the locked state and unlocked state as described above in the first to third embodiments may be provided.

According to the first to fourth embodiments described above, when the lens barrel 1 is being mounted or when integral driving shake correction is to be implemented, the camera body 2 puts the body inner shell 110 into the unlocked state (the state in which the movement range of the body inner shell 110 is the first range). As a result, the body inner shell 110 of the camera body 2 and the lens inner shell (the second casing 10) of the lens barrel 1 may be driven interlockingly, the lens and the imaging element may be driven integrally, and shake correction may be performed. When the lens and the imaging element are driven integrally and shake correction is performed, larger shakes may be corrected than with lens shift correction, imaging element shift correction and the like.

When the camera body 2 is being removed from the lens barrel 1 or when integral driving shake correction is not to be implemented, the camera body 2 puts the body inner shell 110 into the locked state (the state in which the movement range of the body inner shell 110 is the second range that is smaller than the first range). As a result, contact between the body inner shell 110 and the body outer shell 150 may be prevented. Because contact between the body inner shell 110 and the body outer shell 150 is prevented, faults caused by contact between the two may be prevented. Thus, shock resistance is improved. Moreover, the position of the body inner shell 110 relative to the body outer shell 150 may assuredly be at a particular position. When the position of the body inner shell 110 relative to the body outer shell 150 is assured of being at a particular position, the lens barrel 1 may be easily mounted to the camera body 2.

A detection unit that detects shake of the lens barrel or camera body described above may be provided at any of the lens inner shell, the lens outer shell, the body inner shell 110 or the body outer shell 150.

Variant Examples

The embodiments described above are not limiting. Numerous modifications and improvements may be embodied as described below and are encompassed by the technical scope of the present invention.

For example, the present embodiments describe examples in which the lens side inner mount 9 is provided with communication contacts and power supply contacts, and the body side inner mount 109 that is connected thereto is provided with communication contacts and receiving supply contacts. However, this is not limiting.

Figure 30:
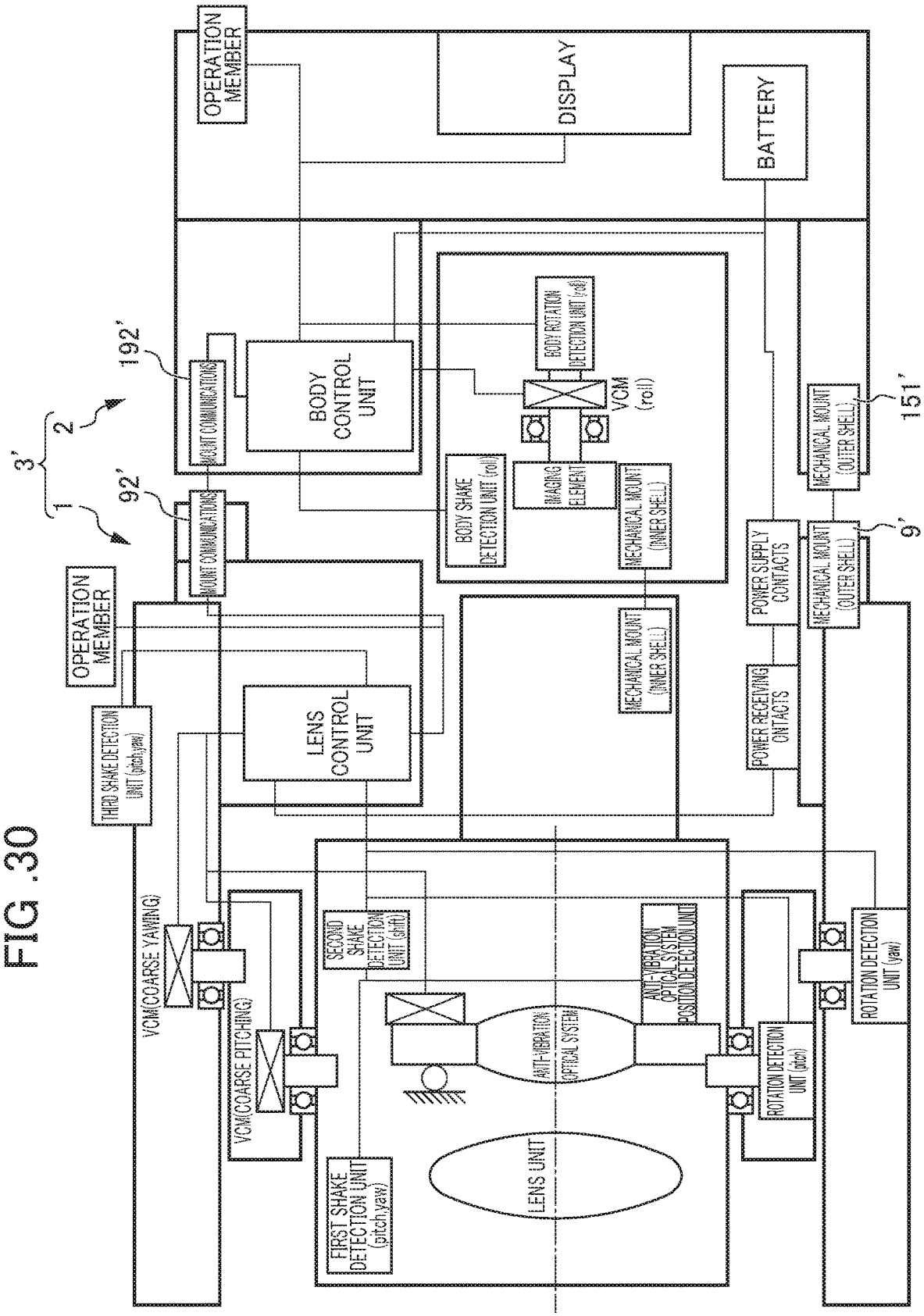
FIG. 30 is a system schematic diagram of a camera system 3' equipped with a lens barrel 1' and camera body 2' according to a variant example.

FIG. 30 is a system schematic diagram of a camera system 3' equipped with a lens barrel 1' and camera body 2' according to a variant example.

As illustrated in FIG. 30, a lens side inner mount 9' is provided with communication contacts 92' and power receiving contacts 93', and a body side outer mount 151' that is connected thereto is provided with communication contacts 192' and power supply contacts 193'.

In the present embodiments, the image forming optical system (the lens unit L) and the imaging element 101 are made integral and are rotated about the pitch axis P and the yaw axis Y, the image forming optical system also moves in the X and Y directions, and the imaging element 101 moves in the roll direction. However, this is not limiting.

For example, a portion of the image forming optical system (the lens unit L) may be made integral with the imaging element 101 and rotated about the the pitch axis P and the yaw axis Y.

The imaging element 101 alone may be rotated about the pitch axis P and the yaw axis Y.

The lens barrel 1 may rotate about the pitch axis P and the yaw axis Y, and the imaging element 101 may move in the X direction and the Y direction.

The lens barrel 1 may rotate about the pitch axis P and the yaw axis Y, and the imaging element 101 may move in the X direction, the Y direction and the roll direction.

When plural members are being driven, coarse and fine movements, shake frequencies and the like may be assigned to the members.

These assignments may be such that low frequencies are eliminated by powerful actuators at the outer side, and high frequencies are moved by lightweight actuators at the inner side.

In the present embodiments, the structure of the lens barrel 1 is described as being equipped with the pitch driving unit 20 that drives the second casing 10 in the pitch direction and the yaw driving unit 60 that drives the first casing 30 and the second casing 10 in the yaw direction.

However, although the lens barrel 1 according to the present embodiments is provided with the pitch driving unit 20 that drives the second casing 10 in the pitch direction and the yaw driving unit 60 that drives the first casing 30 and the second casing 10 in the yaw direction, this is not limiting; these driving units may be provided at the camera body 2 side.

In the embodiments described above, an example of the camera body 2 is described that is equipped with the mechanism that locks the body inner shell 110 to the body outer shell 150. This is not limiting. For example, a structure is possible in which a mechanism that locks the body inner shell 110 to the body outer shell 150 is not provided at the camera body 2. In this case, if unmodified, there is a risk that the position of the body inner shell 110 in a state in which the lens barrel 1 is not attached to the camera body 2 may be inconsistent. Therefore, in this case, a retaining portion for retaining the position of the body inner shell 110 at a predetermined position may be provided at a cap member (a body cap) that is mounted to the camera body 2 that is not equipped with the locking mechanism, which cap member covers a mount aperture portion. Similarly, the lens inner shell and the lens outer shell may be locked by a lens cap.

The embodiments and variant examples may be used in suitable combinations; detailed descriptions thereof are not given here. The present invention is not limited by the embodiments described above.

EXPLANATION OF REFERENCE NUMERALS

1: lens barrel, 2: camera body, 3: camera system, 9: lens side inner mount, 10: second casing, 15: anchoring lever, 20: pitch driving unit, 21: pitch driving coil-retaining unit, 22A: pitch driving coil, 22B: pitch driving coil, 24: pitch axle member, 25: pitch bearing, 29: pitch direction rotation detection unit, 30: first casing, 33: plate spring part, 33*b*: pawl part, 37: first casing bearing, 38: spherical surface magnet, 50: fixed tube, 52: spherical surface magnet, 53: third shake detection unit, 54: push button-guiding long hole, 55: lens side outer mount, 58: spherical surface coil, 60: yaw driving unit, 61A: subject side yaw driving coil, 61B: body side yaw driving coil, 62: slider unit, 62B: outer side face, 62C: pawl-engaging recess part, 62D: push button-engaging recess part, 62F: sliding side face, 63: yaw driving coil retaining unit, 63A: coil attachment part, 63B: fixed part, 63E: yaw bearing, 64: press plate, 66: yaw axle member, 70: push button, 72: press part, 73: spring part, 74: engaging part, 80: third casing, 82: first casing-driving subject side magnet and yoke, 89: elastic member, 90: yaw auxiliary driving unit, 90A: light axis direction extension part, 100: lens side mount, 100*d*: anchoring lever driving pin, 100*e*: anchoring lever driving pin, 101: imaging element, 102: body shake detection unit, 109: body side inner mount, 110: body inner shell, 111: imaging element mounting-enabling block, 112: first holder, 113: lowpass filter, 114: second holder, 116: attachment plate, 150: body outer shell, 151: body side outer mount, 152: contact block, 153: first anchoring lever, 153*a*: fixed shaft, 153*b*: sliding plate part, 153*c*: engaging lever main body, 153*d*: pawl part, 154: second anchoring lever, 154*a*: fixed shaft, 155: release plate urging spring, 156: anchoring lever urging spring, 158: stepper motor, 159: photoreflector, 160: housing, 161: driving nut, 162: guide pin, 163: release plate, 164: fixed plate, 191: mechanical mount, 192: communication contacts, 193: power supply contacts, 200: body mount, 202: worm gear, 203: lock ring

What is claimed is:

1. A camera body to which a lens barrel is removeably attachable, the camera body comprising:
    a first casing that includes a first connecting part that is to be connected with a first tube of the lens barrel;
    a second casing that includes an imaging element and a second connecting part that is to be connected with a second tube of the lens barrel; and
    a switching unit that switches a movement range of the second casing relative to the first casing between a first range state and a second range state.

2. The camera body according to claim 1, wherein the second range is a range that is encompassed by the first range.

3. The camera body according to claim 1, wherein the second casing is interlocked with driving of the second tube via the second connecting part.

4. The camera body according to claim 1 wherein, when the second tube and second casing are not connected via the second connecting part, the switching unit sets the movement range to the second range.

5. The camera body according to claim 1 wherein, when the second tube and second casing are connected via the second connecting part, the switching unit sets the movement range to the first range.

6. The camera body according to claim 1, wherein the switching unit switches between the first range and the second range on the basis of at least one of a specified mode or an imaging condition.

7. The camera body according to claim 1, wherein the switching unit switches between the first range and the second range on the basis of a movement amount of the second tube or second casing that is detected by a detection unit.

8. The camera body according to claim 1, wherein the switching unit switches between the first range and the second range on the basis of a user operation.

9. The camera body according to claim 1, wherein the switching unit includes a casing connecting part that connects the first casing with the second casing, and the switching unit sets the movement range to the second range by connecting the first casing with the second casing.

10. A lens barrel including a mounting unit that is removeably attachable to an image pickup unit, the lens barrel comprising:
    an image forming optical system that forms a subject image for the image pickup unit;
    a support unit that supports at least a portion of the image forming optical system; and
    a fixed unit that is disposed at an outer side of the support unit and is fixed to the mounting unit,
    wherein the support unit is relatively moveable by rotation together with the image pickup unit with respect to the fixed unit.

11. The lens barrel according to claim 10,
wherein the support unit comprises:
a first casing of which at least a portion is disposed at the inner side of the fixed unit, the first casing rotating about a first axis; and
a second casing of which at least a portion is disposed at the inner side of the first casing, the second casing rotating about a second axis that is orthogonal to the first axis.

12. The lens barrel according to claim 11, further comprising:
a first driving unit that drives to rotate the first casing about the first axis; and
a second driving unit that drives to rotate the second casing about the second axis.

13. The lens barrel according to claim 12, wherein
the first driving unit includes a first coil and a first magnet,
one of the first coil and the first magnet is disposed at the fixed unit and the other is disposed at the first casing, the other of the first coil and the first magnet opposing the one,
the second driving unit includes a second coil and a second magnet, and
one of the second coil and the second magnet is disposed at the first casing and the other is disposed at the second casing, the other of the second coil and the second magnet opposing the one.

14. The lens barrel according to claim 13, wherein
signal lines connected to the first coil and the second coil are disposed with slack in a circumferential direction of the lens barrel.

15. The lens barrel according to claim 13, wherein:
the second casing is extensible and retractable in the light axis direction;
one of the first driving unit provided at the first casing swings about the first axis; and
a distance of the one from the first axis is alterable in association with extension and retraction of the second casing in the light axis direction.

16. The lens barrel according to claim 12, wherein
the first driving unit includes a third coil and a third magnet,
one of the third coil and the third magnet is disposed at the fixed unit and the other is disposed at the first casing, the other of the third coil and the third magnet opposing the one, and
respective opposing surfaces of the third coil and the third magnet include substantially spherical surface shapes.

17. The lens barrel according to claim 16, wherein
a center of spheres of the respective substantially spherical shapes of the opposing surfaces of the third coil and the third magnet is located in a vicinity of an intersection point of the first axis and the light axis.

18. The lens barrel according to claim 11, further comprising:
a first transmission part that transmits driving force that drives to rotate the first casing; and
a second transmission part that transmits driving force that drives to rotate the second casing.

19. The lens barrel according to claim 11, further comprising
a third casing disposed at the outer periphery side of the second casing, wherein:
at least a portion of the second casing projects further toward a subject side than the subject side of the third casing, and the second casing is extensible and retractable in the light axis direction;
an elastic member is attached to an end portion at the subject side of the third casing, the elastic member extending to an inner diameter side along an inner periphery of the third casing;
a projecting part is provided at an end portion at the subject side of the second casing, the projecting part projecting to the outer diameter side along an outer periphery of the second casing;
in a retracted state in which the second casing is contracted, the projecting part seals a gap between the third casing and the second casing by contacting and pressing against the elastic member; and
when the second casing is not in the retracted state, the elastic member is not in contact with the projecting part.

20. The lens barrel according to claim 11, wherein the second casing includes a third driving unit that moves at least a portion of the image forming optical system in a plane that passes through a constant point on the light axis and is orthogonal to the light axis.

21. The lens barrel according to claim 10, wherein
a shake detection unit that detects shake of the lens barrel is provided at at least one of the fixed unit and the support unit.

22. The lens barrel according to claim 21, wherein
the shake detection unit is disposed on a central axis of the relative movement of the support unit and the fixed unit.

23. The lens barrel according to claim 10, further comprising a fixing structure that fixes the support unit at the fixed unit.

24. The lens barrel according to claim 10, further comprising
a detection unit that detects a driving amount of the support unit.

25. A camera body comprising: an inner mounting unit to which at least a portion of a lens barrel is removeably attachable, the lens barrel including an image forming optical system;
an image pickup unit that images a subject image formed by the image forming optical system; and
a body fixed unit disposed at an outer side of the image pickup unit,
wherein the image pickup unit is relatively moveable together with the inner mounting unit with respect to the body fixed unit about at least two axes that are substantially orthogonal to a light axis of the image forming optical system.

* * * * *